United States Patent [19]

Nishimura et al.

[11] Patent Number: 4,782,006
[45] Date of Patent: Nov. 1, 1988

[54] OPTICAL RECORDING EMPLOYING DIACETYLENE COMPOUND AND DYE TO FORM AND VISUALIZE A LATENT IMAGE

[75] Inventors: Yukuo Nishimura, Sagamihara; Ken Eguchi, Atsugi; Kunihiro Sakai, Yamato; Haruki Kawada; Hiroshi Matsuda, both of Atsugi; Takashi Nakagiri, Tokyo; Toshihiko Miyazaki; Yoshinori Tomida, both of Atsugi; Toshiaki Kimura, Sagamihara; Kenji Saito, Tokyo, all of Japan

[73] Assignee: Canon Kabushiki Kaisha, Tokyo, Japan

[21] Appl. No.: 940,532

[22] Filed: Dec. 10, 1986

[30] Foreign Application Priority Data

Dec. 16, 1985 [JP] Japan ................ 60-282214
Dec. 16, 1985 [JP] Japan ................ 60-282215
Jan. 28, 1986 [JP] Japan ................ 61-14708
Jan. 28, 1986 [JP] Japan ................ 61-14711
Jan. 29, 1986 [JP] Japan ................ 61-15855
Jan. 29, 1986 [JP] Japan ................ 61-15856
Jan. 30, 1986 [JP] Japan ................ 61-16877
Jan. 30, 1986 [JP] Japan ................ 61-16878
Jan. 31, 1986 [JP] Japan ................ 61-17993
Jan. 31, 1986 [JP] Japan ................ 61-17994

[51] Int. Cl.$^4$ .................. G03C 5/00; G03C 5/16
[52] U.S. Cl. ................... 430/292; 430/945; 430/944; 430/495; 430/335; 430/336; 430/293; 430/328; 430/330; 430/351; 430/394; 430/926

[58] Field of Search ........... 430/945, 944, 495, 335, 430/336, 292, 293, 328, 330, 351, 394, 926

[56] References Cited

U.S. PATENT DOCUMENTS

| | | | |
|---|---|---|---|
| 3,772,028 | 11/1973 | Fico et al. | 430/495 |
| 3,836,368 | 9/1974 | Jun et al. | 430/270 |
| 4,215,208 | 7/1980 | Yee et al. | 526/285 |
| 4,439,514 | 3/1984 | Garito | 430/495 |
| 4,536,450 | 8/1985 | Garito | 428/411.1 |
| 4,562,141 | 12/1985 | Tieke | 430/281 |
| 4,678,736 | 7/1987 | Hanamura et al. | 430/945 |

Primary Examiner—Paul R. Michl
Assistant Examiner—Cynthia Hamilton
Attorney, Agent, or Firm—Fitzpatrick, Cella, Harper & Scinto

[57] ABSTRACT

An optical recording method comprises the steps of:

(A) irradiating a radiation corresponding to a recording information on an optical recording medium having a recording layer containing a diacetylene derivative and at least one selected from the group (hereinafter called the group B) consisting of azulenium salt compounds, pyrylium dyes, diene compounds, croconic methine dyes and polymethine compounds, thereby forming a latent image; and (B) irradiating a radiation on the recording medium having said latent image formed thereon to thereby visualizing said latent image.

26 Claims, 1 Drawing Sheet

OPTICAL RECORDING EMPLOYING DIACETYLENE COMPOUND AND DYE TO FORM AND VISUALIZE A LATENT IMAGE

BACKGROUND OF THE INVENTION

1. Field of the Invention

This invention relates to an optical recording method onto an optical recording medium containing a diacetylene derivative compound, particularly to an optical recording method employing an IR-ray laser of 800–900 nm as the optical writing means.

2. Description of the Related Art

Recently, optical discs are of primary interest among office automations. Since optical discs are capable of recording and storing a large amount of documents and literatures in one disc, documents in an office can be pigeonholed or managed with good efficiency. Various recording media have been investigated for such an optical disc, and those utilizing organic materials are attracting attention because of low price and easiness in manufacture.

As such an organic material for recording medium, a diacetylene derivative compound has been known and a recording technique employing said compound for a laser recording medium by utilizing the thermal color change property of said compound is disclosed in Japanese Laid-open Patent Application No. 14780/1981. However, in this specification, there is no description about what kind of laser has been employed or has to be used, except that there is a mere description that recording was performed by use of a laser.

The present inventors have investigated about laser recording of the diacetylene derivative compound by use of various kinds of laser and consequently confirmed that, while thermal color change recording may be feasible by use of a large scale and high output laser such as argon laser, etc., no laser recording is practiceable when a semiconductor laser of small model and relatively low output (wavelength: 800 to 850 nm) is used. However, a practical recording medium of an optical disc, etc. is desired to have a capability of optical writing with a semiconductor laser of small model and low output.

Further, the recording layer of the related art comprising the diacetylene derivative compound as described above is formed by use of fine crystalline powder of the diacetylene derivative compound, and hence the molecules of the diacetylene derivative compound are randomly oriented within the recording layer, whereby light transmittance or reflectivity may differ and the degree of the chemical reactions may vary depending on such a molecular orientation. Thus, it is not always suitable for high density recording.

SUMMARY OF THE INVENTION

The present invention has been accomplished for solving the problems of the related art as described above, and an object of the present invention is to provide an optical recording method capable of optical writing with a small scale and light weight semiconductor laser and capable of first recording a recording information as the latent image onto a recording medium and thereafter reading the recording information by visualization of the latent image freely if desired.

Another object of the present invention is to provide an optical recording method which enables high speed recording at high density, high sensitivity and high resolution.

Still another object of the present invention is to provide an optical recording method which can give optically recorded images having excellent stability and high quality.

According to one aspect of the present invention, there is provided an optical recording method comprising the steps of:

(A) irradiating with radiation corresponding to a recording information on an optical recording medium having a recording layer containing at least one selected from the group consisting of azulenium salt compounds, pyrylium dyes, diene compounds, croconic methine dyes or polymethine compounds (hereinafter called the group B) and a diacetylene derivative compound to thereby form a latent image; and (B) irradiating with radiation on the recording medium having said latent image formed thereon to thereby visualizing said latent image.

According to another aspect of the present invention, there is provided an optical recording method comprising the steps of:

(A) irradiating with a radiation corresponding to a recording information on an optical recording medium having a recording layer containing a diacetylene derivative compound and at least one selected from the group (hereinafter referred to as the group B) consisting of azulenium salt compounds, pyrylium dyes, diene compounds, croconic methine dyes and polymethine compounds thereby forming a latent image;

(B) irradiating with radiation on the recording medium having said latent image formed thereon to thereby visualizing said latent image; and (C) further heating said recording medium to thereby visualize said latent image.

DETAILED DESCRIPTION OF THE PREFERRED EMBODIMENTS

Figure 1A:
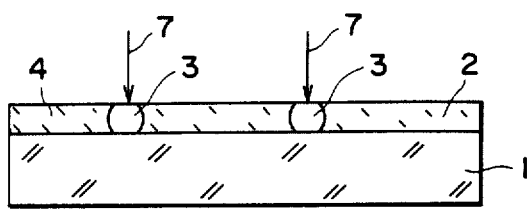
FIGS. 1A, 1B, FIGS. 2A, 2B are schematic sectional views showing an embodiment of an optical recording medium to be used for the method of the present invention and an optical recording process.

The optical recording method of the present invention is a method comprising the steps of (A) irradiating with radiation corresponding to a recording information on an optical recording medium having a recording layer containing a diacetylene derivative compound and at least one selected from the group (hereinafter called the group B) consisting of azulenium salt compounds, pyrylium dyes, diene compounds, croconic methine dyes and polymethine compounds, thereby forming a latent image and (B) irradiating with radiation on the recording medium having said latent image formed thereon the thereby visualizing said latent image.

The diacetylene derivative compound (hereinafter referred to as DA compound) contained in the optical recording medium which is used in the method of the present invention may include the compounds represented by the following formula:

 [0]

wherein R and R' each are a polar group; a saturated aliphatic group such as alkyl, cyclohexyl, etc. which may be substituted by a polar group; an olefinic hydrocarbon group such as vinyl, propenyl, etc. which may be substituted by a polar group; or an aromatic hydrocarbon group such as phenyl, naphthyl, alkylphenyl, etc. which may be substituted by a polar group where examples of the polar groups include carboxyl or a metal- or amine salt thereof, a sulfonic acid group or a metal- or amine salt thereof, sulfonamido, amido, amino, imino, hydroxyl oxyamino, a diazonium group, a guanidine group, a hydradine group, a phosphoric acid group, a silicic acid group, an aluminic acid group, a nitrile group, a thioalcohol group, nitro, halogen, etc.: and a polymer thereof.

When a recording layer is made of a monomolecular film or a monomolecular built-up film, the DA compound used as hereinafter described is a compound capable of 1,4-addition polymerization reaction between the C≡C—C≡C functional groups in the adjacent molecules and may typically include the compounds represented by the formula:

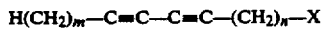

wherein X is a hydrophilic group as a hydrophilic site of the above formula. Examples of X include, for example, carboxyl, amino, hydroxyl, a nitrile group, a thioalcohol group, imino, a sulfonic acid group, a sulfinyl group or a metal- or amine salt thereof. A alkyl group as a hydrophobic site represented by the formula: $H(CH_2)_m-$ is preferably a $C_{1-30}$ linear alkyl group, and m+n is preferably an integer of 1 to 30.

On the other hand, the azulenium salt compounds (hereinafter called briefly AZ compounds) are compounds having absorption spectral peaks in the wavelength region of 750 nm or longer and generate heat by infrared light of such wavelength, as represented by the following general formula (1):

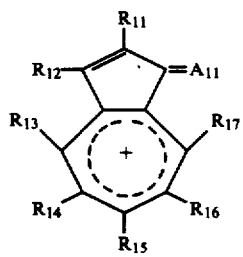

wherein $R_{11}$-$R_{17}$ each represent a hydrogen atom, a halogen atom or a monovalent organic residue and $A_{11}$ represents a bivalent organic residue which is bonded through a double bond.

The above AZ compounds including the above formula (1) can be classified broadly into the three kinds as shown below.

(1-1)

(1-2)

(1-3)

In the compounds shown by the formulae (1-1) to (1-3), each of $R^{11}$ to $R^{17}$ represents a hydrogen atom, a halogen atom or a monovalent organic radical.

Examples of the monovalent organic radical may include alkyl, alkoxy, substituted or unsubstituted aryl, acyl-substituted or unsubstituted amino, nitro, hydroxy, carboxy, cyano or substituted or unsubstituted arylazo radicals.

$A_{11}$ represents a divalent organic radical bonded through a double bond as shown in the following specific examples.

$Z_{11}^{\ominus}$ represents an anionic radical such as perchlorate, fluoroborate, p-toluenesulfonate, periodide, chloride, bromide or iodide.

Specific examples of the AZ compounds to be used in the present invention are set forth below.

(1-1-1)

(1-1-2)

-continued
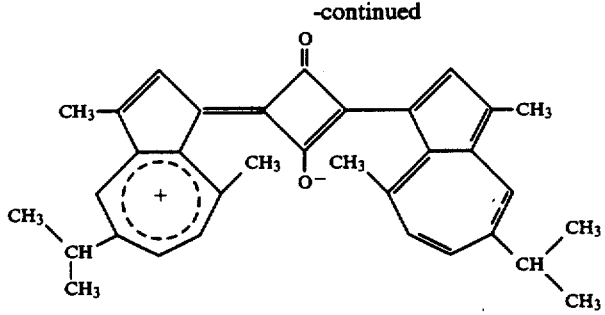 (1-1-3)
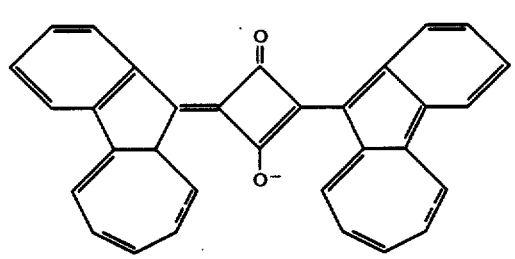 (1-1-4)
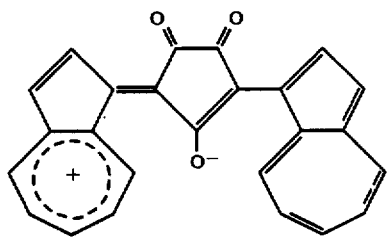 (1-1-5)
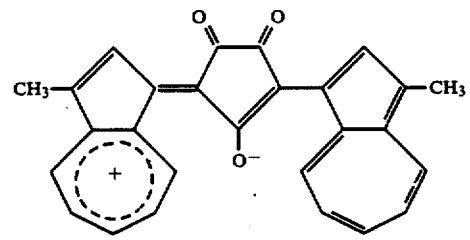 (1-1-6)
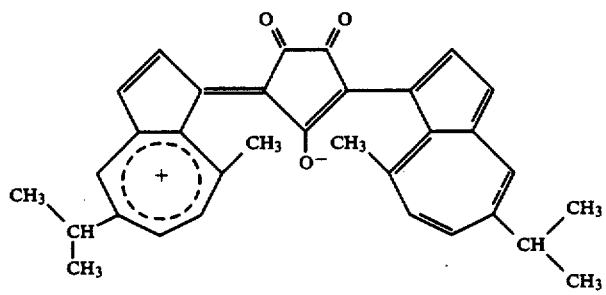 (1-1-7)
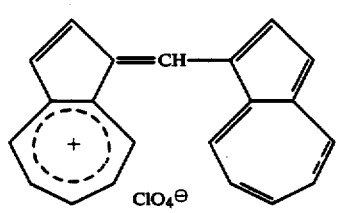 (1-1-8)
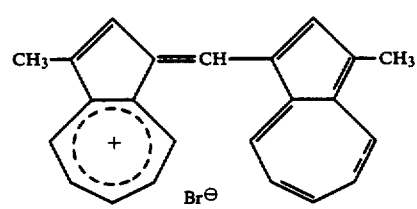 (1-1-9)
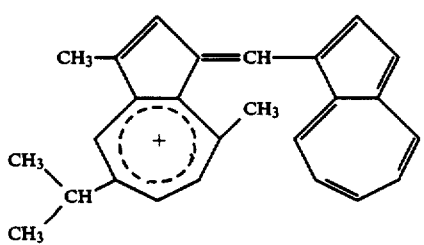 (1-1-10)
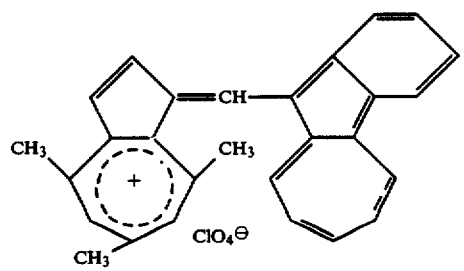 (1-1-11)

-continued

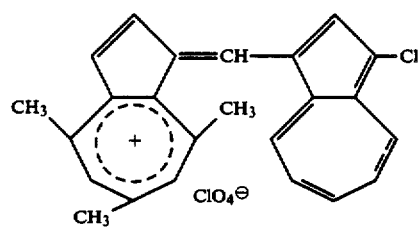 (1-1-12)

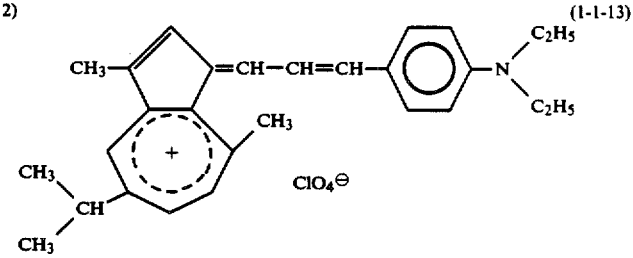 (1-1-13)

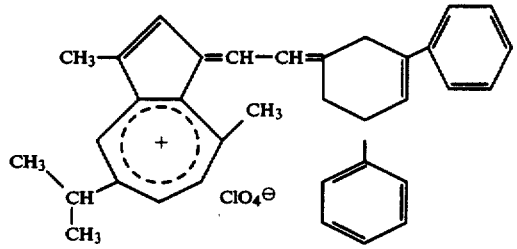 (1-1-14)

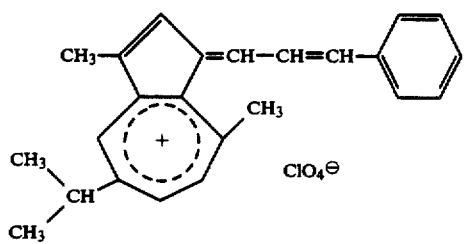 (1-1-15)

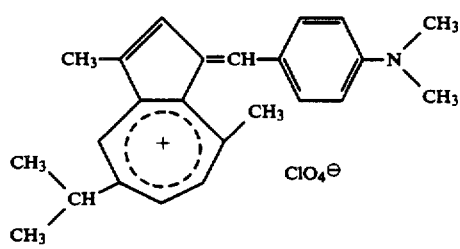 (1-1-16)

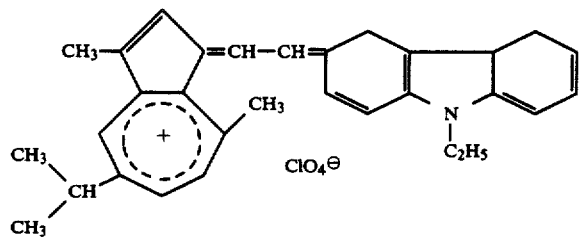 (1-1-17)

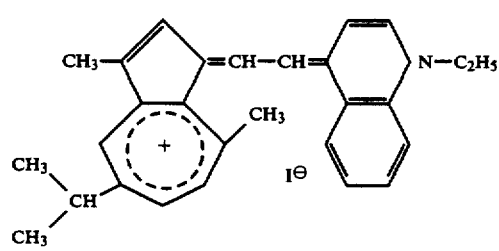 (1-1-18)

The pyrylium dyes, thiopyrylium dyes and selenapyrylium dyes (hereinafter called briefly pyrylium dyes) are compounds represented by the following basic structure, having absorption peaks at 780–900 nm, which can generate heat by infrared rays of such wavelength:

Basic structure:

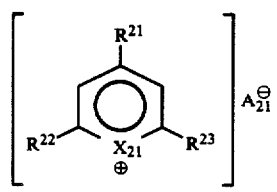

wherein $X_{21}$ represents an oxygen atom, a sulfur atom or selenium atom, $R^{21}$, $R^{22}$ and $R^{23}$ represent various organic radicals and $A_{21}$ represents an anion. Typical examples of the pyrylium dyes are represented by the following formulae (2-1) to (2-3):

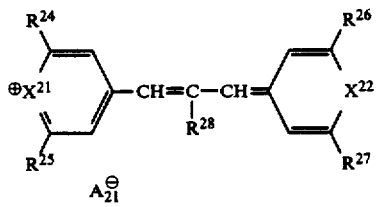

Formula (2-1)

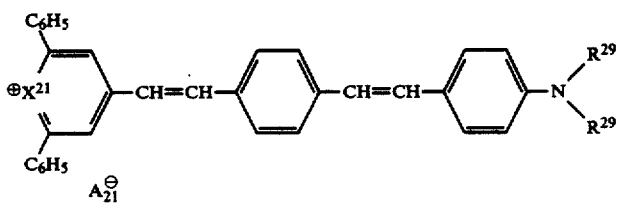

Formula (2-2)

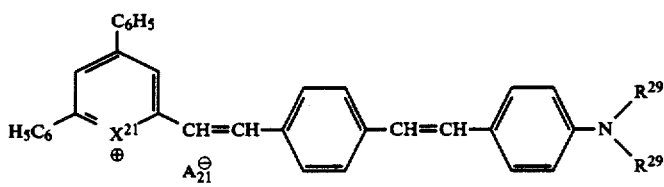

Formula (2-3)

wherein $R^{24}$, $R^{25}$, $R^{26}$ and $R^{27}$ represent substituted or unsubstituted aryl radicals such as phenyl, tolyl, xylyl, chlorophenyl, methoxyphenyl and the like or substituted or unsubstituted heterocyclic radicals such as 2-pyridyl, 3-pyridyl, 2-furyl, 2-thienyl, 2-thiazolyl, 3-carbazolyl, 2-quinolyl, 3-quinolyl, 2-imidazolyl, 2-lepidyl, 3-methoxy-2-pyridyl, 6-methyl-2-pyridyl, 4,5-dimethyl-2-thiazolyl, 4,5-diphenyl-2-thiazolyl, 4-phenyl-2-thiazolyl, 9-ethyl-3-carbazolyl, and the like where at least one of $R^{24}$, $R^{25}$, $R^{26}$ and $R^{27}$ represent a substituted or unsubstituted heterocyclic radical; $R^{28}$ represents a hydrogen atom, alkyl such as methyl, ethyl, propyl, butyl, etc., or a substituted or unsubstituted aryl radical such as phenyl, tolyl, xylyl, chlorophenyl, methoxyphenyl, etc.; $R^{29}$ represents methyl or ethyl; $X^{21}$ and $X^{22}$ represent a hydrogen atom, a sulfur atom or a selenium atom; $A_{21}$ represents an anion such as a chloride ion, a bromide ion, an iodide ion, a perchlorate ion, a benzenesulfonate ion, a p-toluenesulfonate ion, a methylsulfate ion, an ethylsulfate ion, a propylsulfate ion, etc.

Specific examples of these pyrylium dyes are set forth below. For the purpose of convenience, anions were represented all by a perchlorate ion.

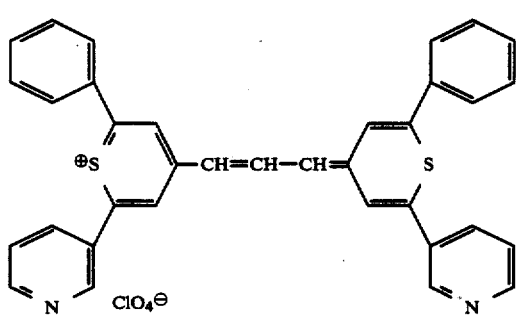

(2-1-1)

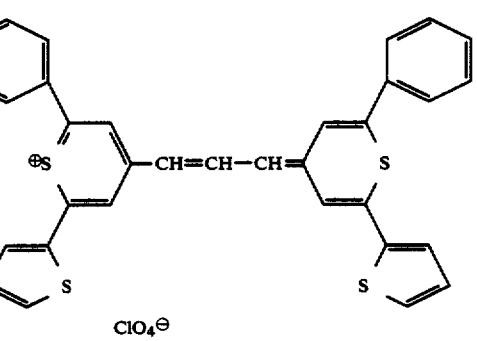

(2-1-2)

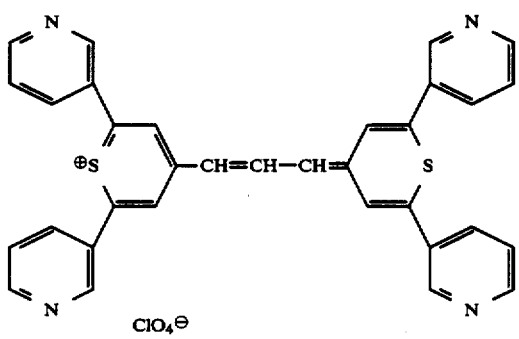

(2-1-3)

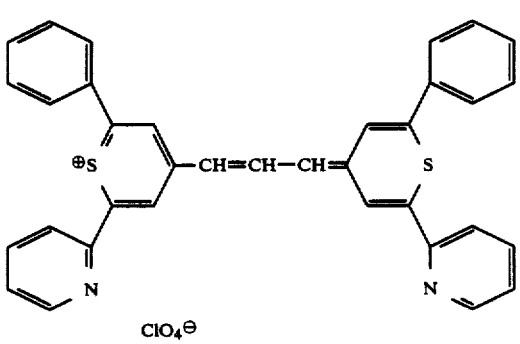

(2-1-4)

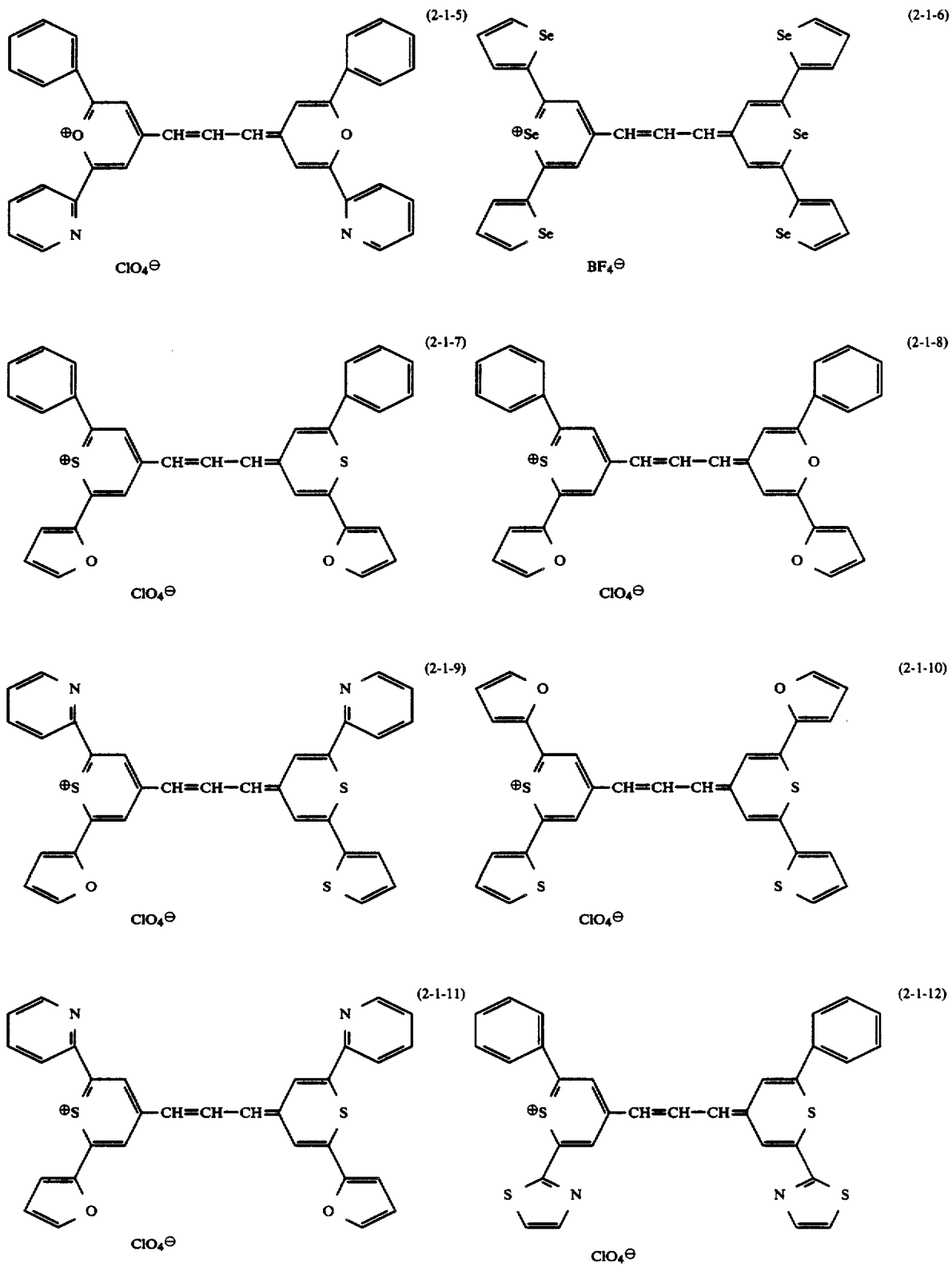

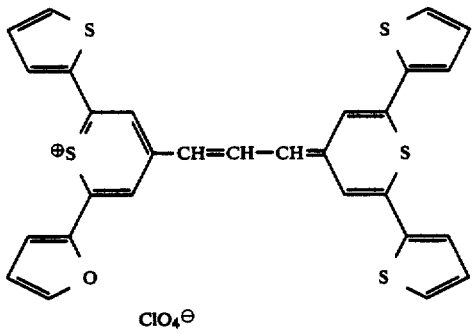
(2-1-13)

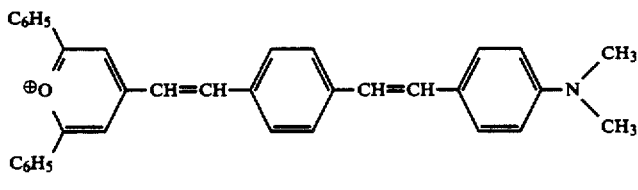
(2-1-14)

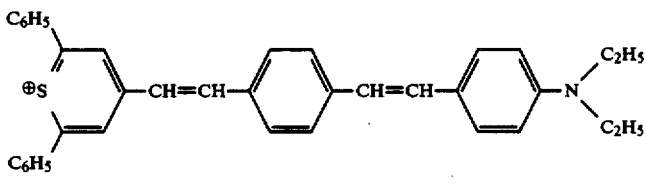
(2-1-15)

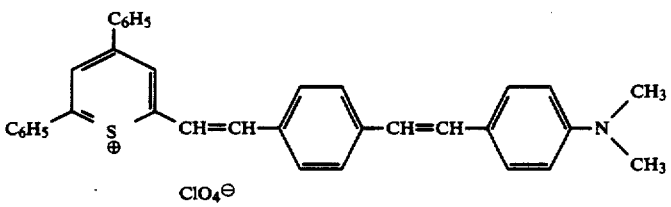
(2-1-16)

The above diene compound salts to be used in the present invention are compounds having absorption peaks in the wavelength region of 750 nm or longer which can generate heat by infrared ray of such wavelength, as represented by the following formula (3-1) or (3-2):

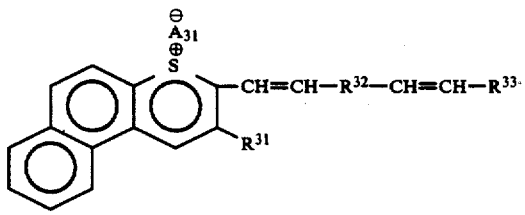
(3-1)

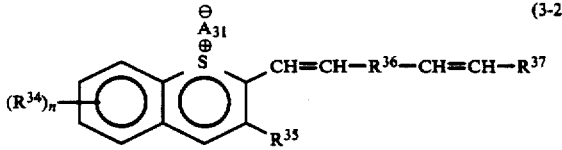
(3-2)

Describing in more detail about the diene compound salts, in the formulae (3-1) and (3-2), $R^{31}$ represents an alkyl radical such as methyl, ethyl, propyl, isopropyl, butyl, hexyl, etc., or a phenyl radical or a styryl radical which may have a substituent where examples of the substituent may include an alkoxy radical such as methoxy, ethoxy, butoxy, etc.; a halogen atom such as chlorine, bromine, iodine, etc.; an alkyl radical such as methyl, ethyl, propyl, isopropyl, etc.; and a nitro radical. $R^{32}$ and $R^{36}$ each represent an arylene radical which may have a substituent and form a conjugated double bond system with the two —CH=CH— groups adjacent thereto such as p-phenylene, 1,4-naphthylene, etc. where examples of the substituent may include a halogen atom such as chlorine, bromine, iodine, etc.; an alkyl radical such as methyl, ethyl, etc.; and an alkoxy radical such as methoxy, ethoxy, etc. $R^{33}$ and $R^{37}$ each represent a phenyl radical or a naphthyl radical which may have a substituent. Examples of the substituent may include a substituted amino radical such as dimethylamino, diethylamino, dipropylamino, dibutylamino, diphenylamino, phenylamino, phenylbenzylamino, phenylethylamino, etc.; a cyclic amino radical such as morpholino, piperidinyl, pyrrolidino, etc.; and an alkoxy radical such as methoxy, ethoxy, butoxy, etc. $R^{34}$ represents an alkoxy radical such as methoxy, ethoxy, butoxy, etc. $R^{35}$ represents an alkyl radical such as methyl, ethyl, propyl, butyl, hexyl, etc.

$A_{31}{}^\ominus$ represents an anion, including for example:
$BF_4{}^\ominus$, $ClO_4{}^\ominus$, $CF_3COO^\ominus$, $PF_6{}^\ominus$, $Cl^\ominus$, $Br^\ominus$, $I^\ominus$, $ClSO_3{}^\ominus$, $CH_3SO_3{}^\ominus$, $C_2H_5SO_3{}^\ominus$, $C_3H_7SO_3{}^\ominus$, $C_4H_9SO_3{}^\ominus$, $C_5H_{11}SO_3{}^\ominus$, $C_6H_{13}SO_3{}^\ominus$, $CH_3CHClSO_3{}^\ominus$, $ClCH_2CH_2SO_3{}^\ominus$,

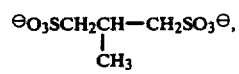, $ICH_2SO_3{}^\ominus$, 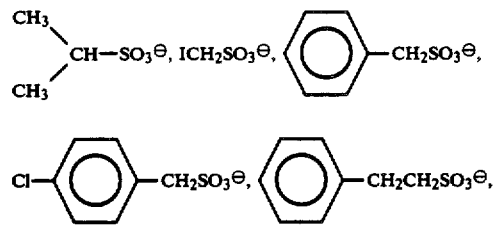

$\ominus O_3SCH_2SO_3{}^\ominus$, $\ominus O_3SCH_2CH_2SO_3{}^\ominus$,

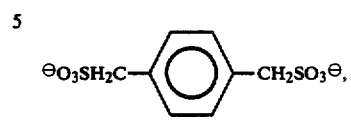

$\ominus O_3SCH_2CH_2CH_2SO_3{}^\ominus$,
$\ominus O_3SCH_2CH_2CH_2CH_2CH_2CH_2SO_3{}^\ominus$, $\ominus O_3SCH_2CH_2-O-CH_2CH_2SO_3{}^\ominus$,

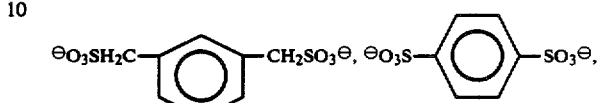

Specific examples of the diene compounds are shown below.

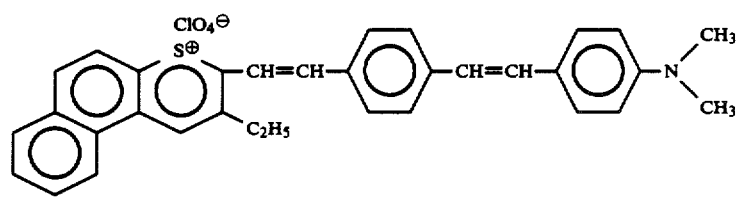

(3-1-1)

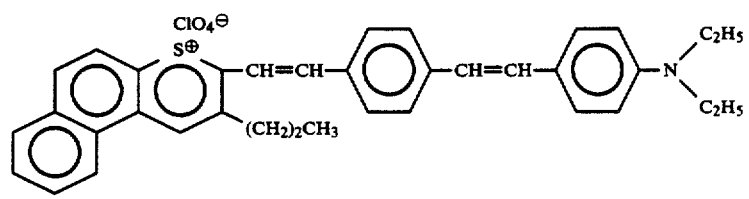

(3-1-2)

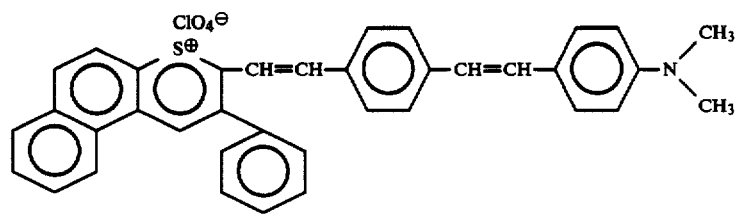

(3-1-3)

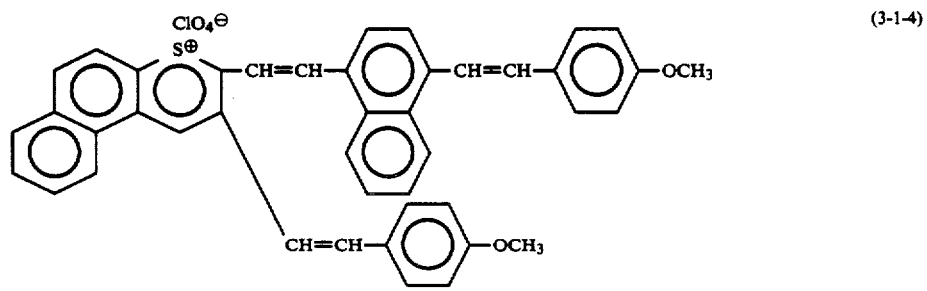

(3-1-4)

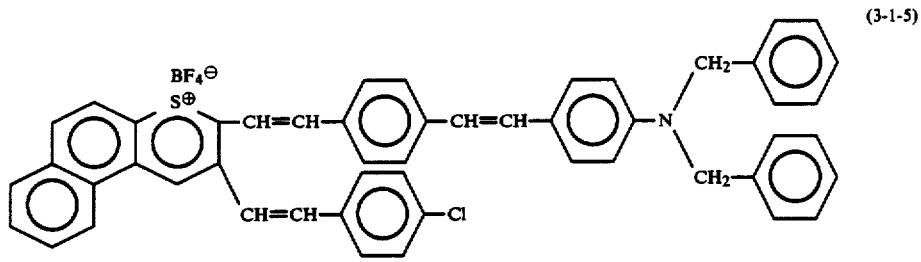
(3-1-5)
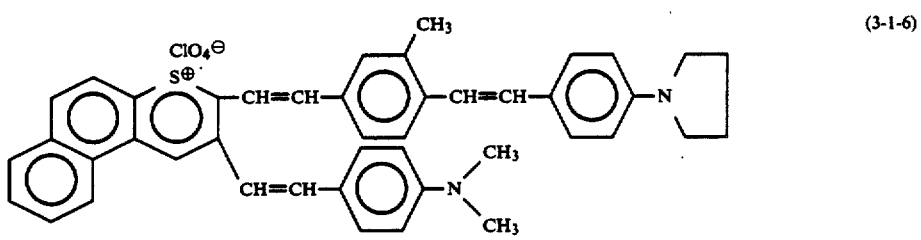
(3-1-6)
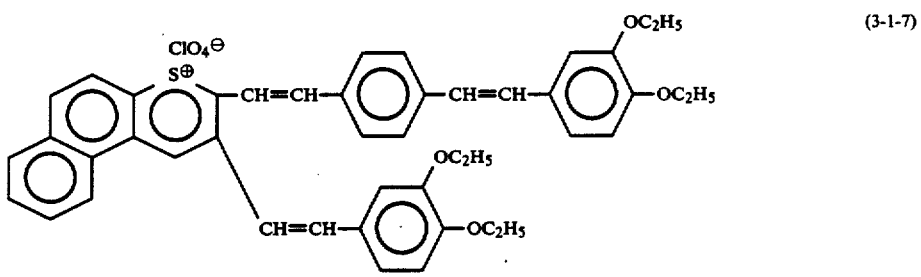
(3-1-7)
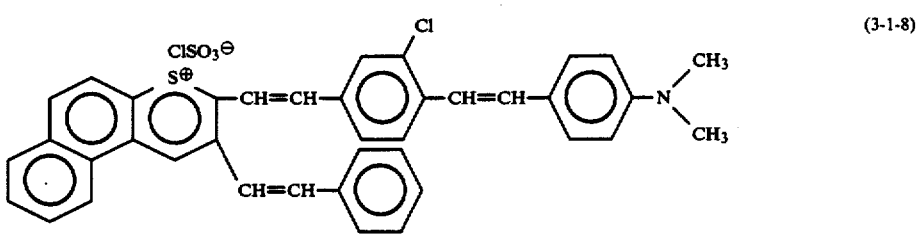
(3-1-8)
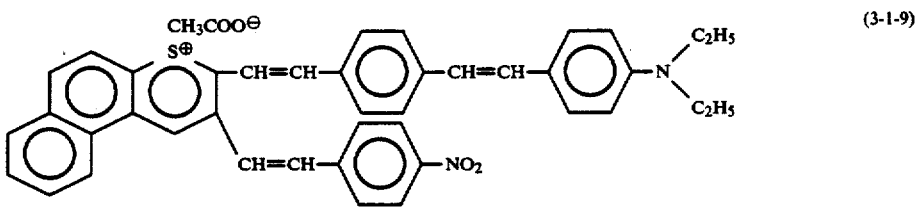
(3-1-9)
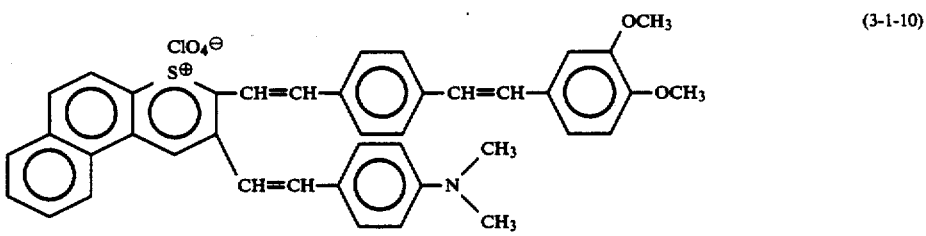
(3-1-10)
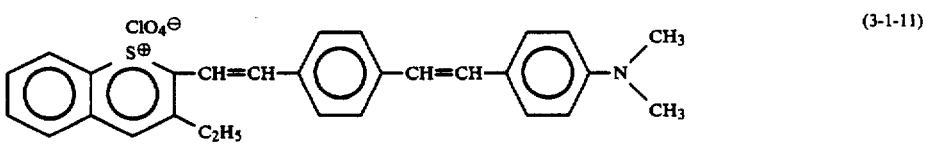
(3-1-11)

-continued
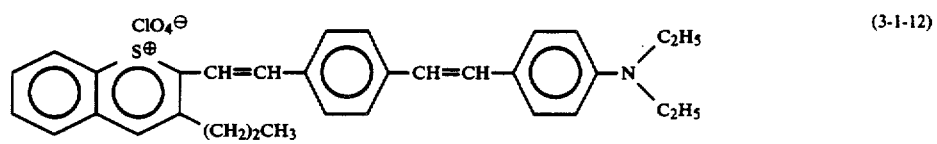 (3-1-12)
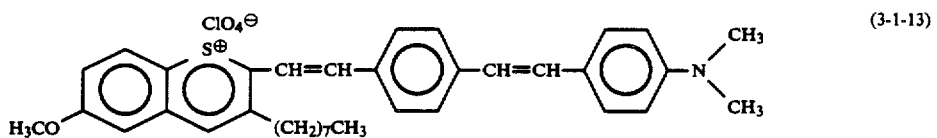 (3-1-13)
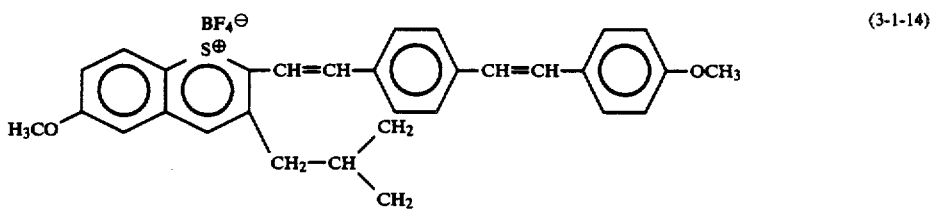 (3-1-14)
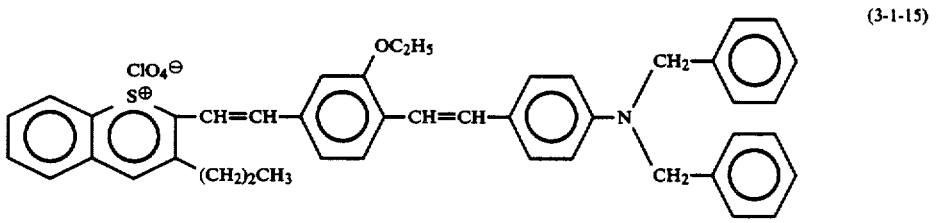 (3-1-15)
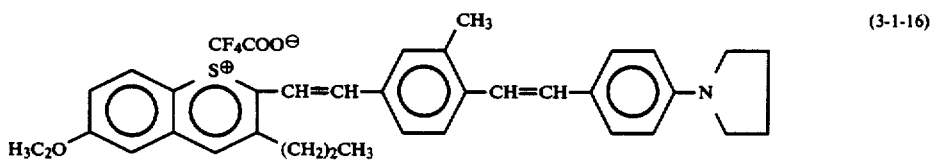 (3-1-16)
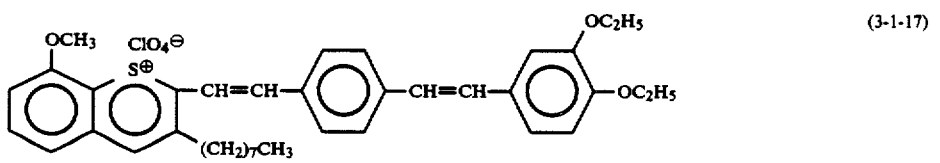 (3-1-17)
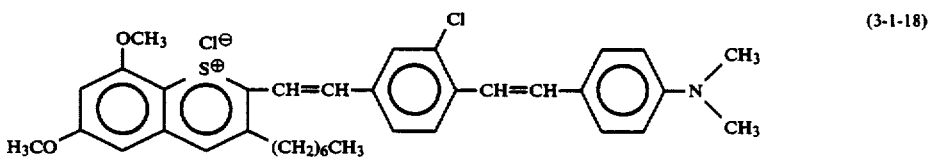 (3-1-18)
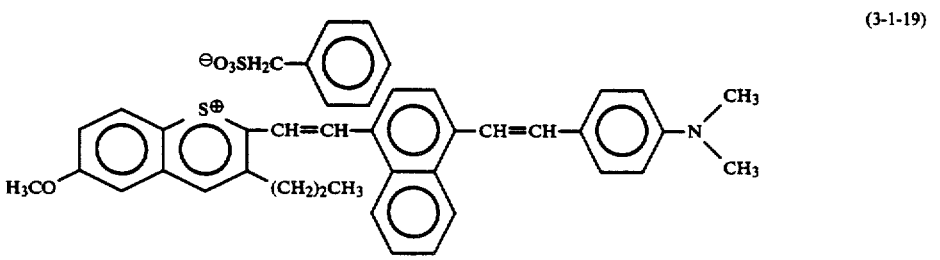 (3-1-19)

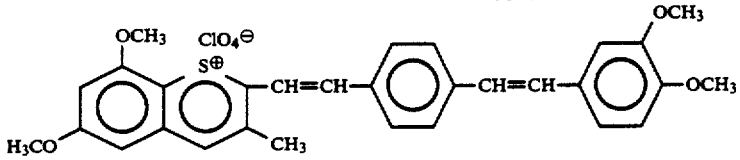

(3-1-20)

The above croconic methine dyes to be used in the present invention are compounds having the following basic structure (including intramolecular salts), having absorption peaks at 800 to 900 nm, which can generate heat by infrared ray of such wavelength:

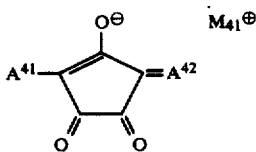

wherein $M_{41}^{\oplus}$ is hereinafter described, and $A^{41}$ and $A^{42}$ are a substituent containing an aromatic ring and/or a heterocyclic ring.

Typical examples of the croconic methine dyes may include the dyes represented by the following formulae (4-1) to (4-2).

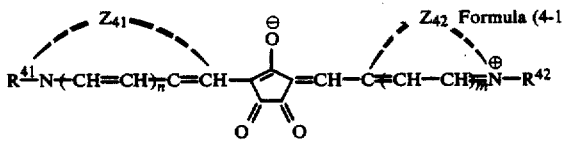

Formula (4-1)

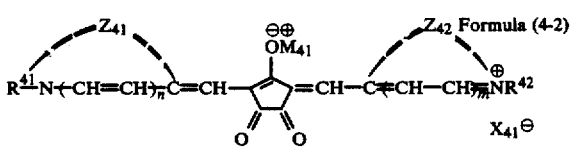

Formula (4-2)

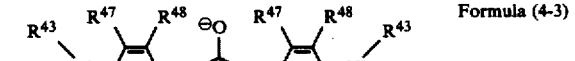

Formula (4-3)

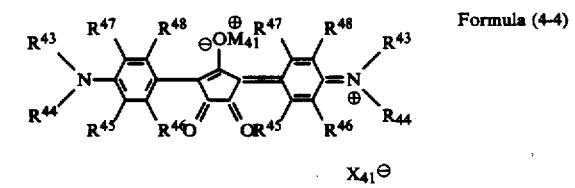

Formula (4-4)

In the formulae (4-1), (4-2), $R^{41}$ and $R^{42}$ each represent an alkyl radical (e.g., methyl, ethyl, n-propyl, isopropyl, n-butyl, sec-butyl, isobutyl, t-butyl, n-amyl, t-amyl, n-hexyl, n-octyl, t-octyl etc.), a substituted alkyl [e.g., 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfatopropyl, 4-sulfatobutyl, N-(methylsulfonyl)-carbamylmethyl, 3-(acetylsulfamyl)propyl, 4-(acetylsulfamyl)butyl, etc.], a cyclic alkyl radical (e.g., cyclohexyl, etc.), an allyl group, and an aralkyl radical (e.g., benzyl, phenethyl, α-naphthylmethyl, β-naphthylmethyl, etc.), a substituted aralkyl radical (e.g., carboxybenzyl, sulfobenzyl, hydroxybenzyl, etc.) an aryl radical (e.g., phenyl, etc.) or a substituted aryl radical (e.g. carboxyphenyl, sulfophenyl, hydroxyphenyl, etc.). Particularly, in the present invention, of these organic radicals, hydrophobic ones are preferred.

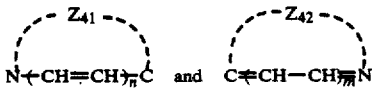

each represent a group of non-metallic atoms necessary for completing a substituted or unsubstituted heterocyclic ring such as a nucleus of thiazole series [e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole, etc.], a nucleus of benzothiazole series (e.g., benzothiazole, 5-chlorobenzothiazole, 5-methylbenzothiazole, 6-methylbenzothiazole, 5,6-dimethylbenzothiazole, 5-bromobenzothiazole, 5-phenylbenzothiazole, 5-methoxybenzothiazole, 6-methoxybenzothiazole, 5,6-dimethoxybenzothiazole, 5,6-dioxymethylenebenzothiazole, 5-hydroxybenzothiazole, 6-hydroxybenzothiazole, 4,5,6,7-tetrahydrobenzothiazole, etc.), a nucleus of naphthothiazole series (e.g., naphtho[2,1-d]thiazole, naphtho[1,2-d]thiazole, 5-methoxynaphtho[1,2-d]thiazole, 5-ethoxynaphtho[1,2-d]thiazole, 8-methoxynaphtho[2,1-d]thiazole, 7-methoxynaphtho[2,1-d]thiazole, etc.), a nucleus of thionaphtene[7,6-d]thiazole series (e.g., 7-methoxythionaphthene[7,6-d]thiazole), a nucleus of oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole), a nucleus of benzoxazole series (e.g., benzoxazole, 5-chlorobenzoxazole, 5-methylbenzoxazole, 5-phenylbenzoxazole, 6-methylbenzoxazole, 5,6-dimethylbenzoxazole, 5-methoxybenzoxazole, 6-methoxybenzoxazole, 5-hydroxybenzoxazole, 6-hydroxybenzoxazole, etc.), a nucleus of naphthoxazole series (e.g., naphtho[2,1-d]oxazole, naphtho[1,2-d]oxazole, etc.), a nucleus of selenazole series (e.g., 4-methylselenazole, 4-phenylselenazole, etc.), a nucleus of benzoselenazole series (e.g., benzoselenazole, 5-chlorobenzoselenazole, 5-methylbenzoselenazole, 5,6-dimethylbenzoselenazole, 5-methoxybenzoselenazole, 5-methyl-6-methoxybenzoselenazole, 5,6-dioxymethylenebenzoselenazole, 5-hydroxybenzoselenazole, 4,5,6,7-tetrahydrobenzoselenazole, etc.), a nucleus of naphthoselenazole series (e.g., naphtho[2,1-d]selenazole, naphtho[1,2-d]selenazole), a nucleus of thiazoline series (e.g., thiazoline, 4-methylthiazoline, 4-hydroxymethyl-4-methylthiazoline, 4,4-bis-hydroxymethylthiazoline, etc.), a nucleus of oxazoline series (e.g., oxazoline), a nucleus of selenazoline series (e.g., selenazoline), a nucleus of 2-quinoline series (e.g., quinoline, 6-methylquinoline, 6-chloroquinoline, 6-methoxyquinoline, 6-ethoxyquinoline, 6-hydroxyquinoline), a nucleus of 4-quinoline series (e.g., quinoline, 6-methoxyquinoline, 7-methylquinoline, 8-methylquinoline), a nucleus of 1-isoquinoline series (e.g., isoquinoline, 3,4-dihydroisoquinoline), a nucleus of 3-isoquinoline series (e.g., isoquinoline), nucleus of 3,3-dialkylindolenine series (e.g., 3,3-dimethylindolenine, 3,3-dimethyl-5-chloroindolenine, 3,3-trimethylindolenine, 3,3,7-trimethylindolenine), a nucleus of pyridine series (e.g., pyridine, 5-methylpyridine), or a nucleus of benzimidazole series (e.g., 1-ethyl-5,6-dichlorobenzimidazole, 1-hydroxyethyl-5,6-dichlorobenzimidazole, 1-ethyl-5-chlorobenzimidazole, 1-ethyl-5,6-dibromobenzimidazole, 1-ethyl-5-phenylbenzimidazole, 1-ethyl-5-fluorobenzimidazole, 1-ethyl-5-cyanobenzimidazole, 1-($\beta$-acetoxyethyl)-5-cyanobenzimidazole, 1-ethyl-5-chloro-6-cyanobenzimidazole, 1-ethyl-5-fluoro-6-cyanobenzimidazole, 1-ethyl-5-acetylbenzimidazole, 1-ethyl-5-ethoxycarbonylbenzimidazole, 1-ethyl-5-sulfamylbenzimidazole, 1-ethyl-5-N-ethylsulfamylbenzimidazole, 1-ethyl-5,6-difluorobenzimidazole, 1-ethyl-5,6-dicyanobenzimidazole, 1-ethyl-5-ethylsulfonylbnzimidazole, 1-ethyl-5-methylsulfonylbenzimidazole, 1-ethyl-5-trifluoromethylbenzimidazole, 1-ethyl-5-trifluoromethylsulfonylbenzimidazole, 1-ethyl-5-trifluoromethylsulfinylbenzimidazole, etc.).

$X_{41}^{\ominus}$ represents an anion such as ions of chloride, bromide, iodide, perchlorate, benzenesulfonate, p-toluenesulfonate, methylsulfate, ethylsulfate, propylsulfate, etc., with the proviso that no $X_{41}^{\ominus}$ exists when $R^{41}$ and/or $R^{42}$ itself contains an anion group such as $-SO_3^{\ominus}$, $-OSO_3^{\ominus}$, $-COO^{\ominus}$, $SO_2^{\ominus}NH-$, $-SO_2-N^{\ominus}-CO-$, and $-SO_2-N^{\ominus}-SO_2-$. $M_{41}^{\oplus}$ represents a cation such as proton, sodium-, ammonium-, potassium-, pyridium cation, etc. n and m are 0 or 1.

In the formulae (4-3), (4-4), $R^{43}$ and $R^{44}$ each represent an alkyl radical such as methyl, ethyl, propyl, butyl, etc. $R^{43}$ and $R^{44}$ can also form a ring such as morpholino, piperidinyl, pyrrolidino, etc., together with a nitrogen atom. $R^{45}$, $R^{46}$, $R^{47}$ and $R^{48}$ each represent a hydrogen atom, an alkyl radical (methyl, ethyl, propyl, butyl, etc.) an alkoxy, radical (methoxy, ethoxy, propoxy, butoxy, etc.) or a hydroxy radical. Also, $R^{45}$ and $R^{46}$ can be bonded to each ether to form a benzene ring, and further $R^{45}$ and $R^{46}$, and $R^{47}$ and $R^{48}$ may be bonded to each other, respectively, to form a benzene ring.

In the following, typical examples of the croconic methine dyes to be used in the present invention are enumerated. For the purpose of convenience, they are represented by betaine structures of the formula (4-1) or (4-3). However, in preparation of these dyes, mixtures of dyes in the betaine form or salt form are obtained, and therefore they are generally used as mixtures.

Typical examples of the formulae (4-1) and (4-2)

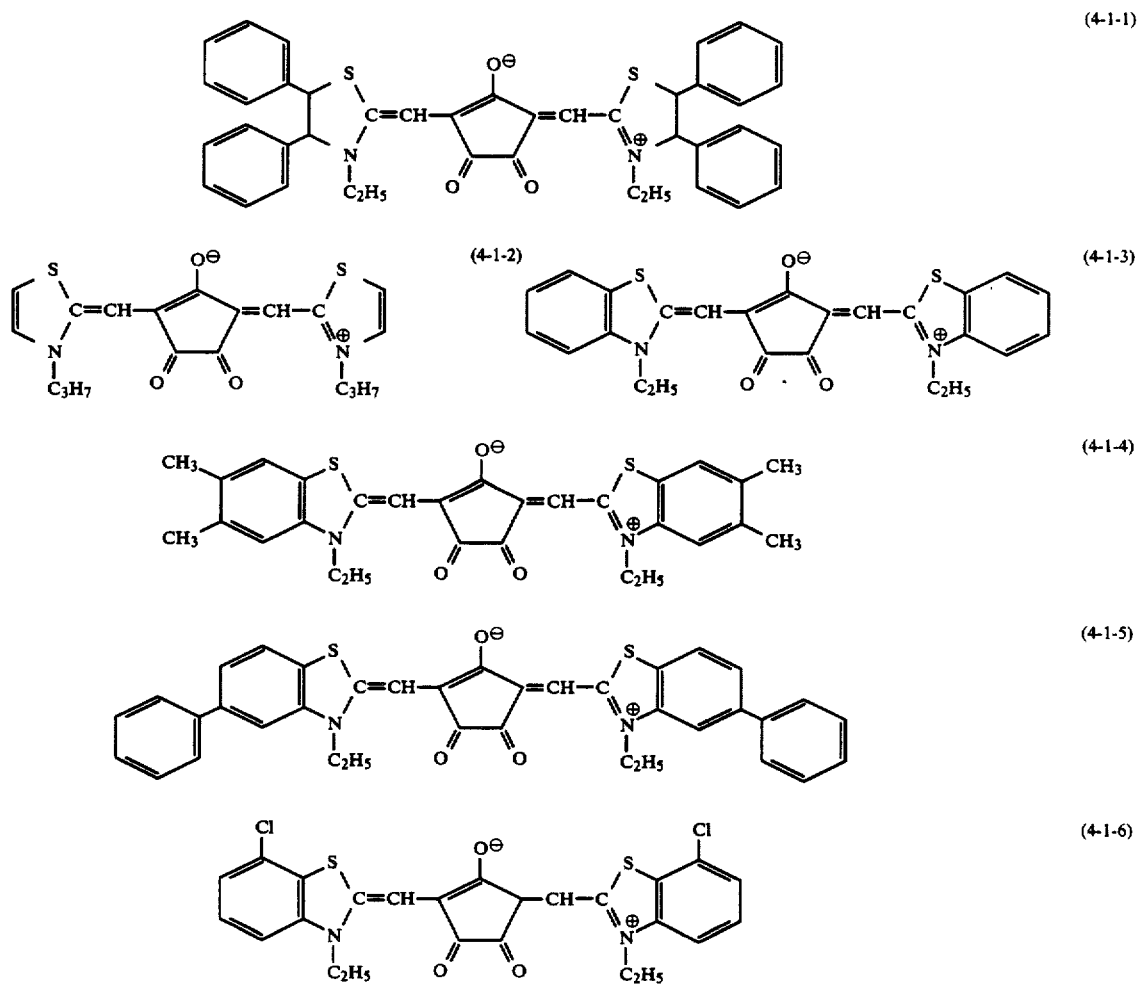

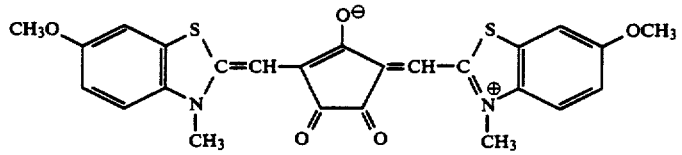
(4-1-7)
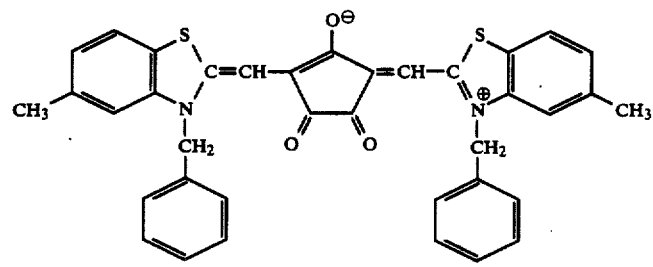
(4-1-8)
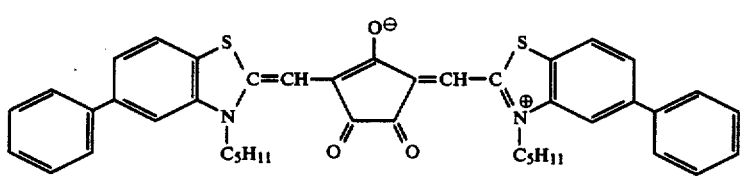
(4-1-9)
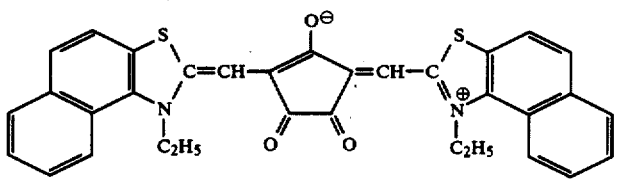
(4-1-10)
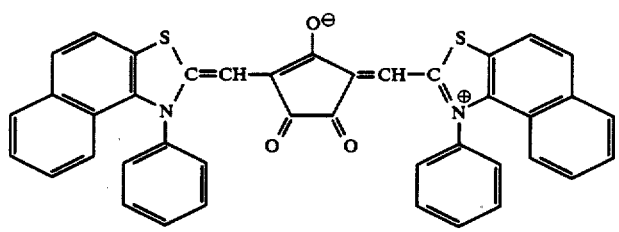
(4-1-11)
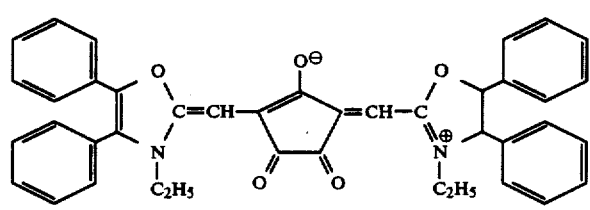
(4-1-12)
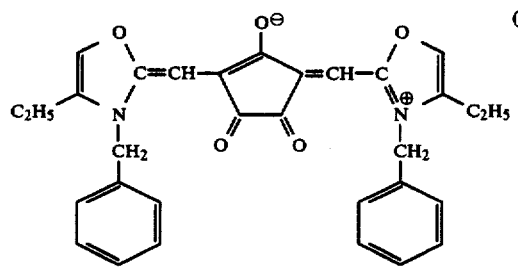
(4-1-13)
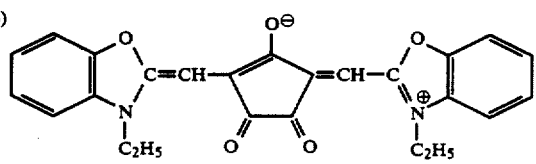
(4-1-14)

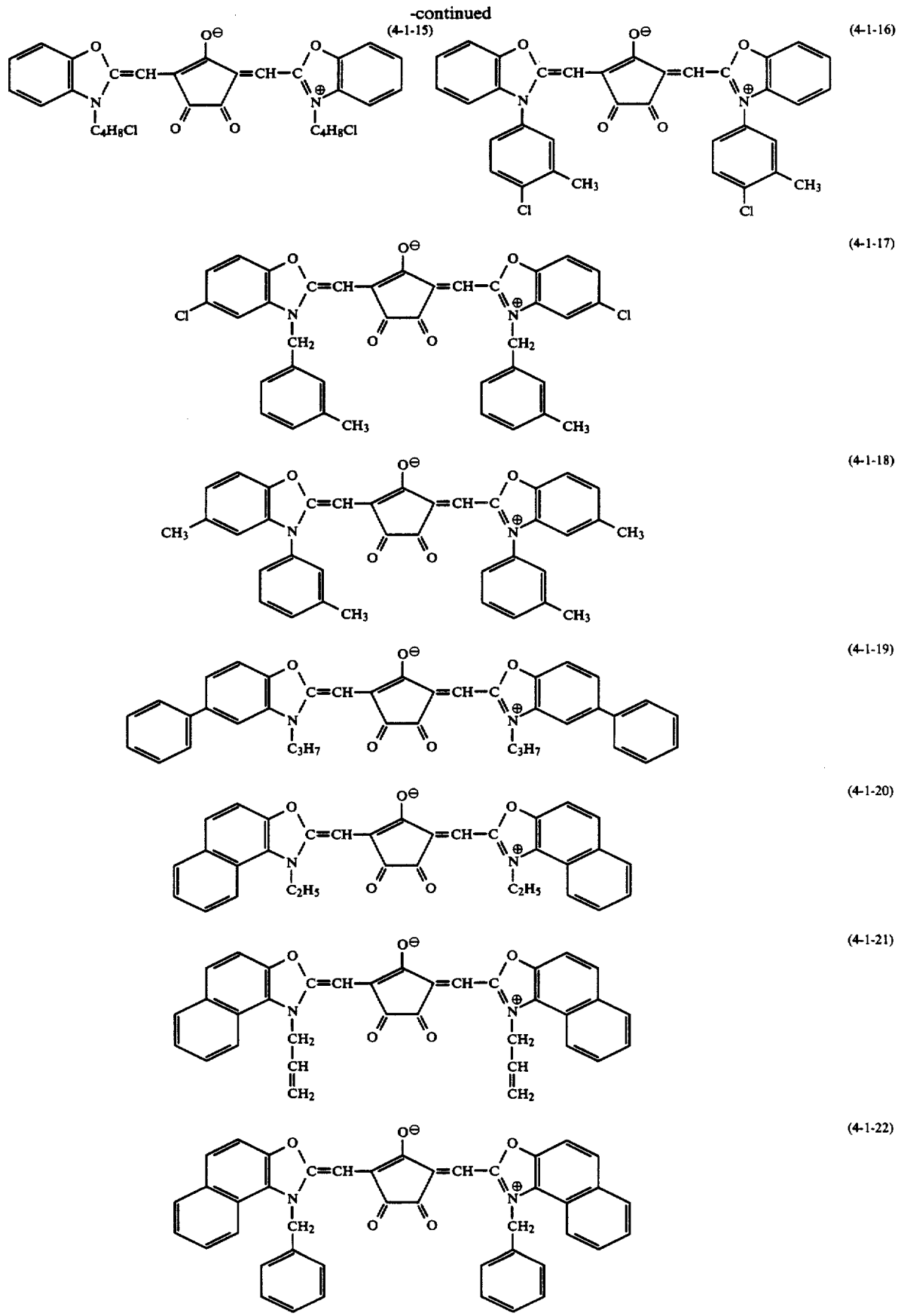

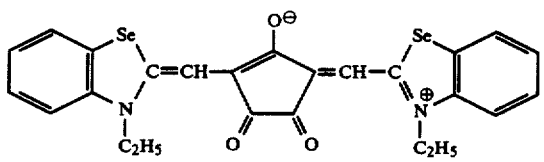
(4-1-23)
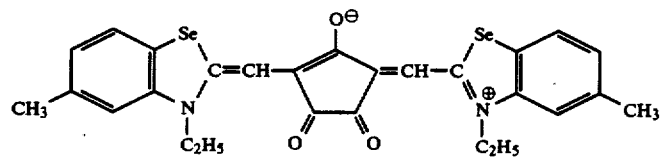
(4-1-24)
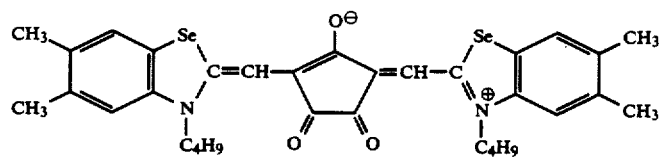
(4-1-25)
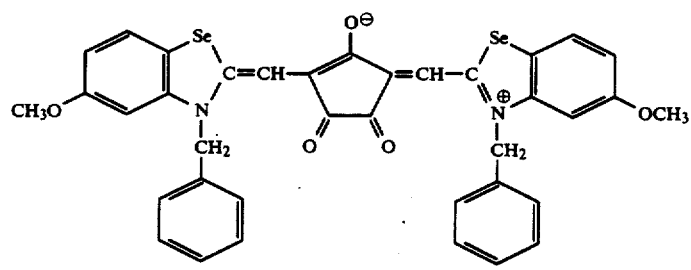
(4-1-26)
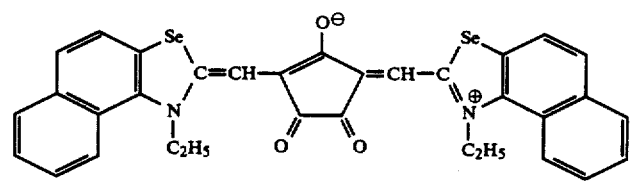
(4-1-27)
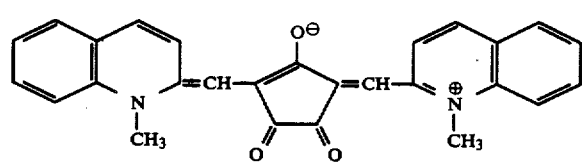
(4-1-28)
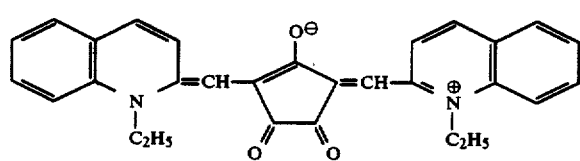
(4-1-29)
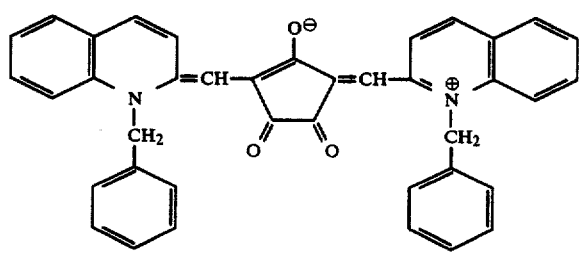
(4-1-30)

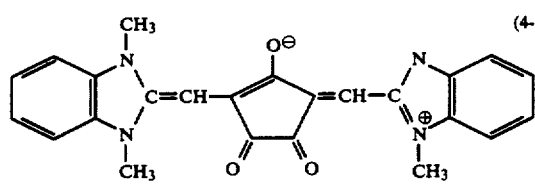
(4-1-31)
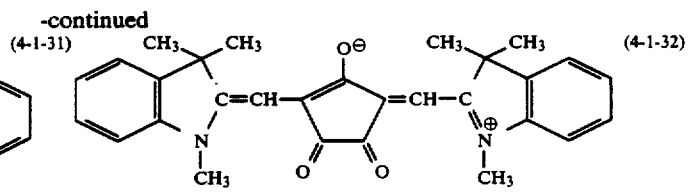
(4-1-32)
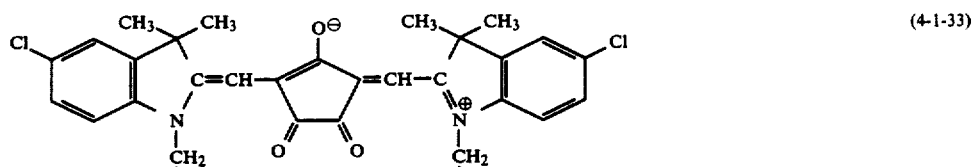
(4-1-33)
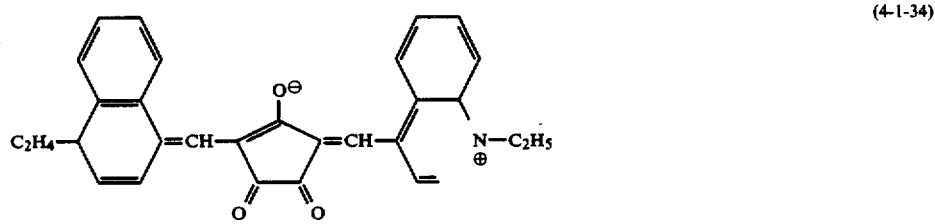
(4-1-34)
Typical examples of the formulae (4-3) and (4-4):
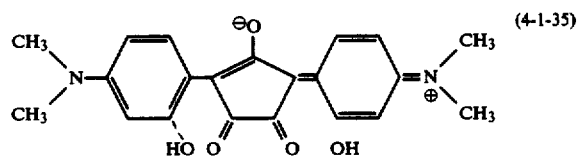
(4-1-35)
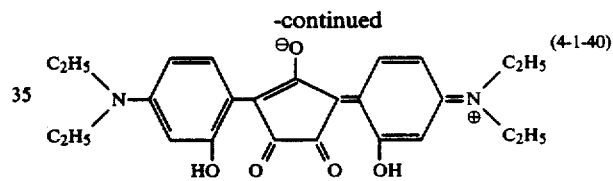
(4-1-40)
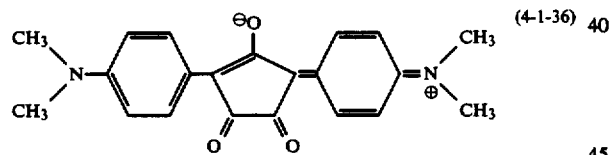
(4-1-36)
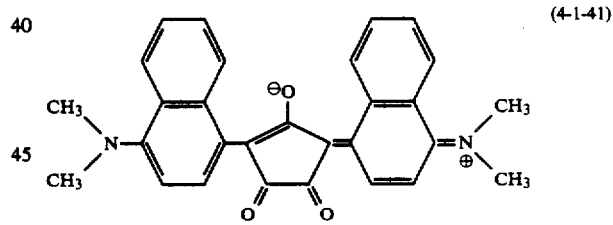
(4-1-41)
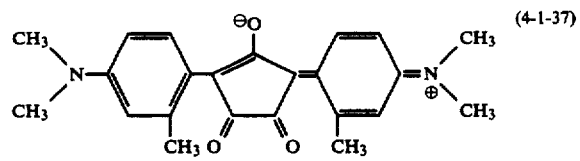
(4-1-37)
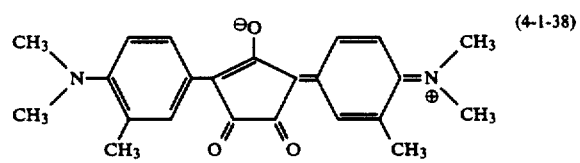
(4-1-38)
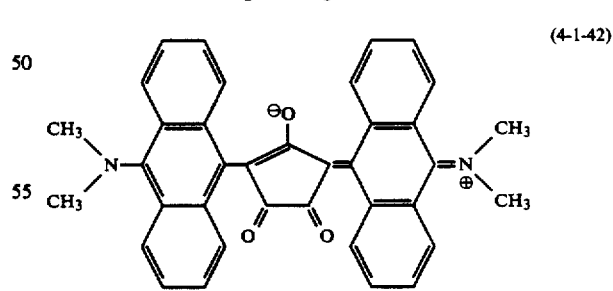
(4-1-42)
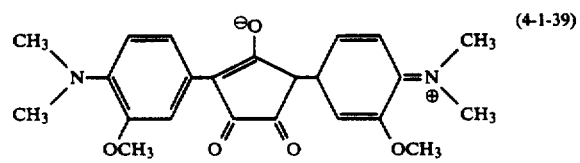
(4-1-39)
The above polymethine compounds to be used in the present invention are compounds having absorption peaks in the wavelength region of 800 nm or longer which can generate heat by infrared rays of such wavelength, as represented by the following formula (5-1) or (5-2):

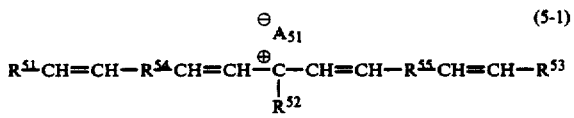 (5-1)

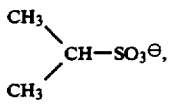

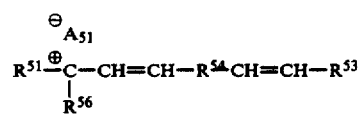 (5-2)

Describing in more detail about the polymethine compounds, in the formulae (5-1) and (5-2), $R^{51}$, $R^{52}$ and $R^{53}$ each independently represent an aryl radical such as phenyl, naphthyl, etc., which may have a substituent where examples of such a substituent may include a substituted amino radical such as dimethylamino, diethylamino, dipropylamino, dibutylamino, diphenylamino, phenylbenzylamino, phenylethylamino, etc., a cyclic amino radical such as morpholino, piperidinyl, pyrrolidino, etc., and an alkoxy radical such as methoxy, ethoxy, butoxy, etc. $R^{54}$ and $R^{55}$ each represent an arylene radical which may have a substituent and can form a conjugated double bond system with two —CH=CH— radicals adjacent thereo such as p-phenylene, 1,4-naphthylene, etc. where examples of such a substituent may include a halogen atom such as chlorine, bromine, iodine, etc., an alkyl group such as methyl, ethyl, etc., and an alkoxy radical such as methoxy, ethoxy, etc. $R^{56}$ represents hydrogen or an aryl radical such as phenyl, naphthyl, etc., which may be substituted. Examples of such a substituent may include those as exemplified for $R^{51}$ to $R^{53}$. $A_{51}{}^{\ominus}$ represents an anion radical, for example, $BF_4{}^{\ominus}$, $ClO_4{}^{\ominus}$, $CF_3COO^{\ominus}$, $PF_6{}^{\ominus}$, a halogen atom such as $Cl^{\ominus}$, $Br^{\ominus}$ and $I^{\ominus}$, $ClSO_3{}^{\ominus}$ alkyl sulfonate compounds such as $CH_3SO_3{}^{\ominus}$, $C_2H_5SO_3{}^{\ominus}$, $C_3H_7SO_3{}^{\ominus}$, $C_4H_9SO_3{}^{\ominus}$, $C_5H_{11}SO_3{}^{\ominus}$, $C_6H_{13}SO_3{}^{\ominus}$, $CH_3CHClSO_3{}^{\ominus}$, $ClCH_2CH_2SO_3{}^{\ominus}$,

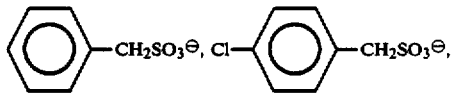

$ICH_2SO_3{}^{\ominus}$, benzenesulfonate compounds such as

alkyldisulfonate compounds such as $^{\ominus}O_3SCH_2SO_3{}^{\ominus}$, $^{\ominus}O_3SCH_2CH_2SO_3{}^{\ominus}$, $^{\ominus}O_3S(CH_2)_6SO_3{}^{\ominus}$, $^{\ominus}O_3SCH_2CH_2-O-CH_2CH_2SO_3{}^{\ominus}$, benzenedisulfonate compounds such as

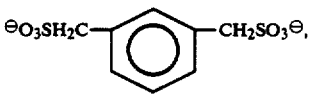

Specific examples of the polymethine compounds are shown below.

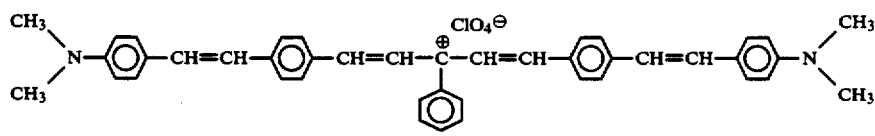 (5-1-1)

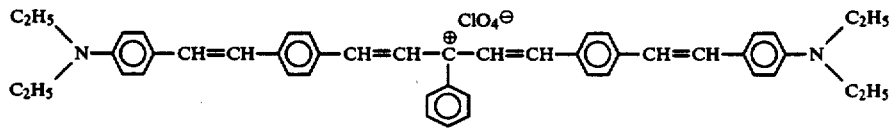 (5-1-2)

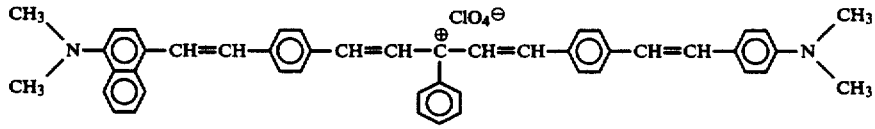 (5-1-3)

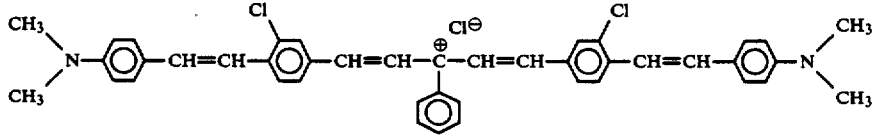 (5-1-4)

-continued
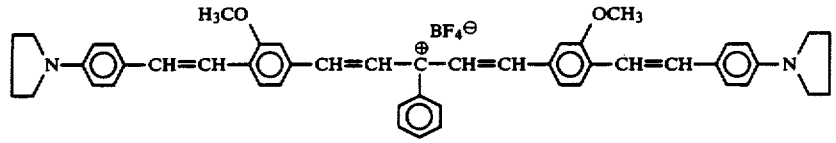
(5-1-5)
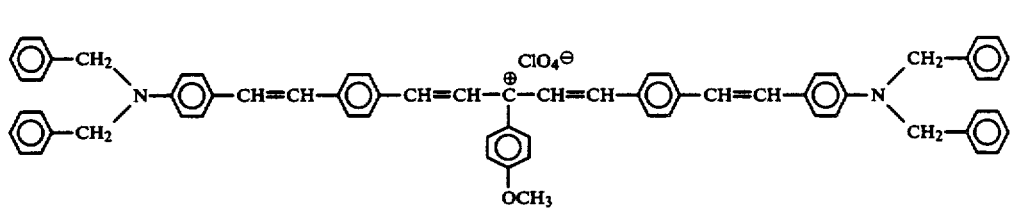
(5-1-6)
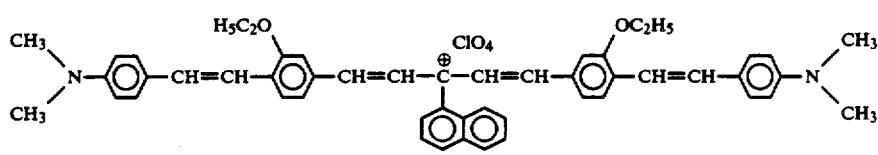
(5-1-7)
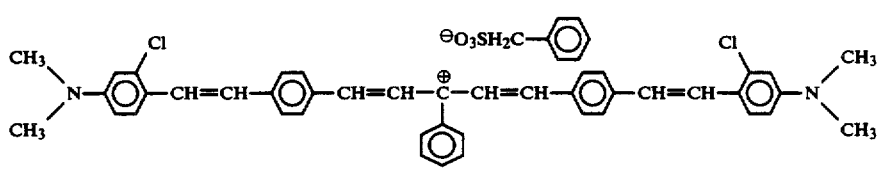
(5-1-8)
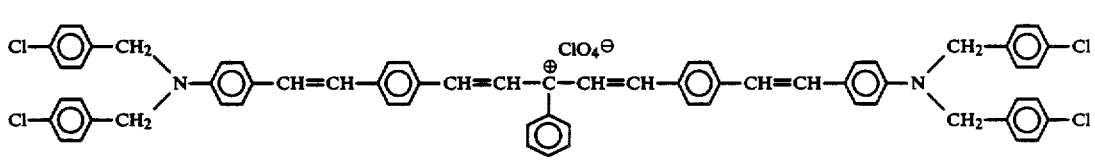
(5-1-9)
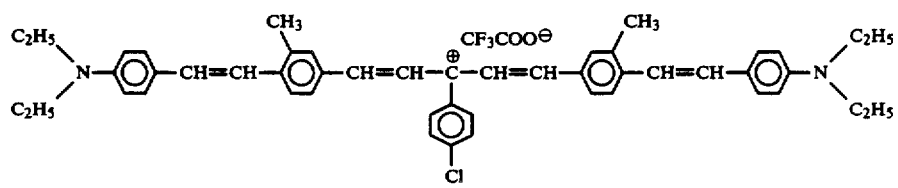
(5-1-10)
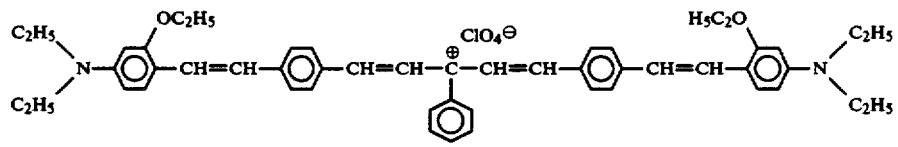
(5-1-11)
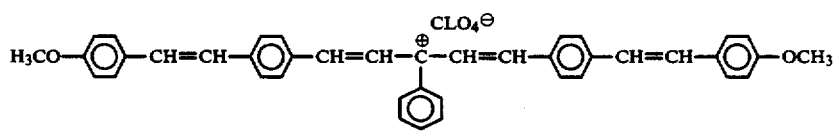
(5-1-12)
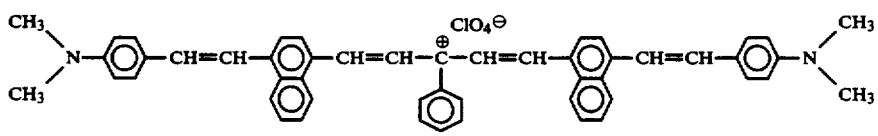
(5-1-13)
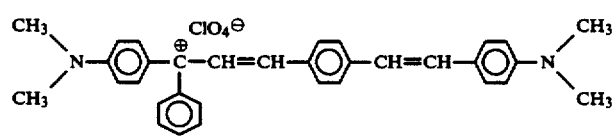
(5-1-14)

-continued
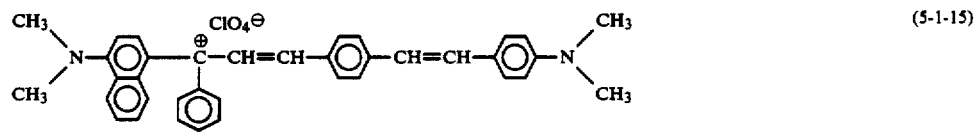 (5-1-15)
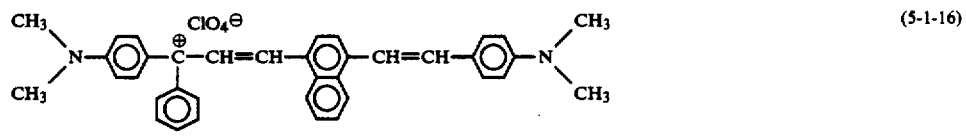 (5-1-16)
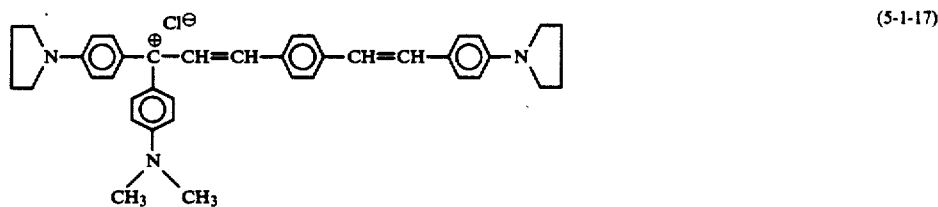 (5-1-17)
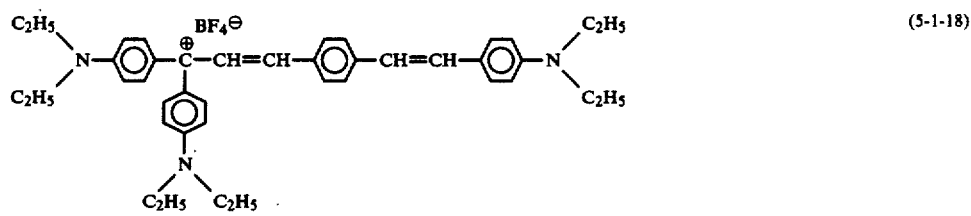 (5-1-18)
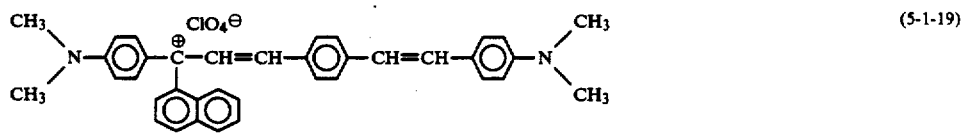 (5-1-19)
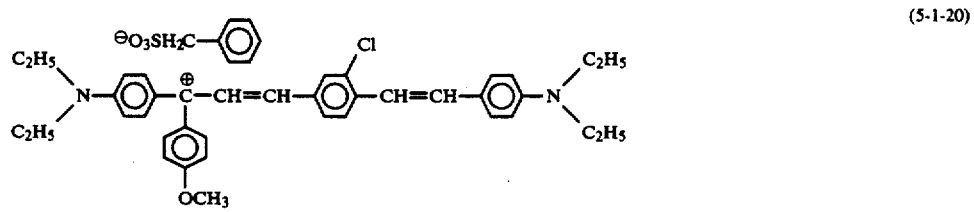 (5-1-20)
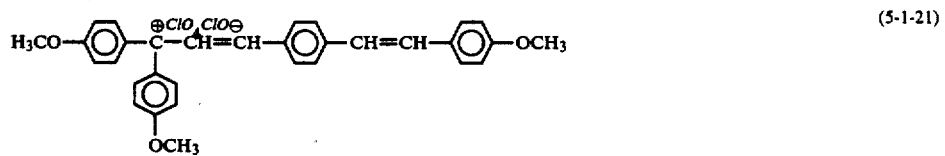 (5-1-21)
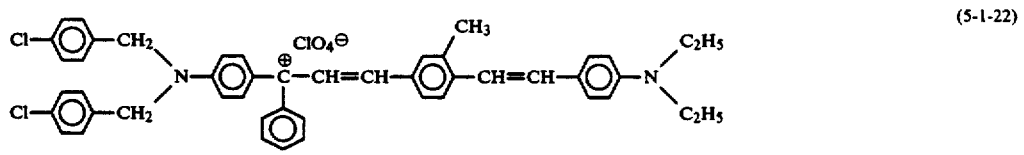 (5-1-22)
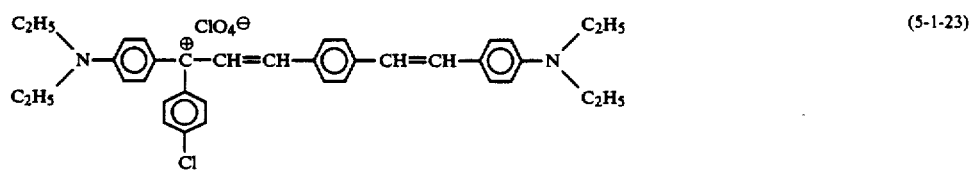 (5-1-23)

-continued
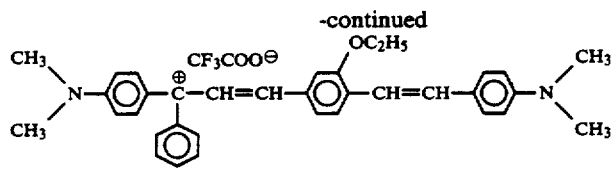 (5-1-24)
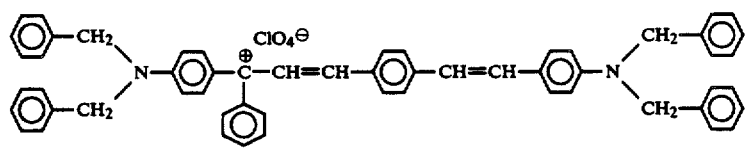 (5-1-25)
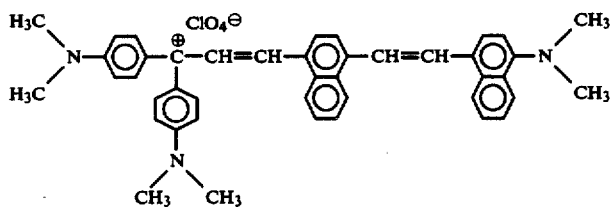 (5-1-26)
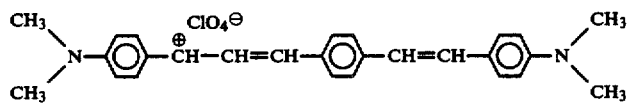 (5-1-27)
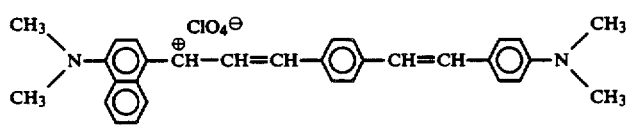 (5-1-28)
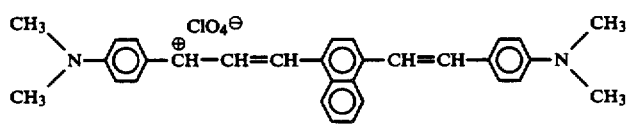 (5-1-29)
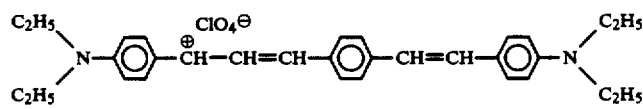 (5-1-30)
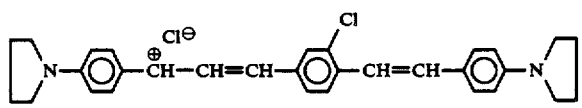 (5-1-31)
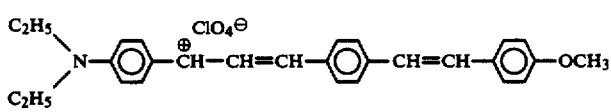 (5-1-32)
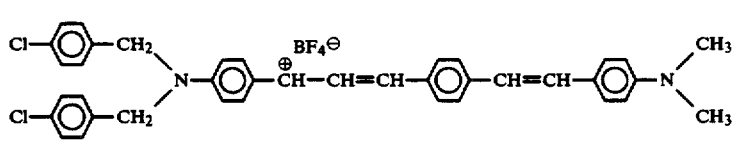 (5-1-33)
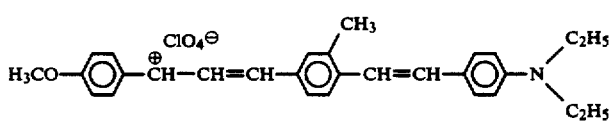 (5-1-34)
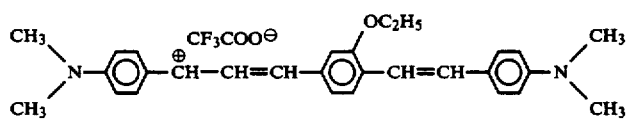 (5-1-35)

(5-1-36)

$$\underset{\underset{CH_2-\langle O \rangle}{CH_2-\langle O \rangle}}{\langle O \rangle}N-\langle O \rangle-\overset{\oplus}{CH}-CH=CH-\langle O \rangle-CH=CH-\langle O \rangle-N\underset{CH_3-\langle O \rangle}{\overset{CH_3-\langle O \rangle}{}} \quad {}^{\ominus}O_3SH_2C-\langle O \rangle$$

The optical recording medium to be used in the present invention contains the above DA compound and at least one selected from the group (hereinafter called the group B) consisting of the AZ compounds, pyrylium dyes, diene compounds salts, croconic methine dyes and polymethine compounds, and may take a constitution of the one layer mixed system, the two layer separated system or the multi-layer laminated system, if desired.

The one layer mixed system refers to the constitution comprising a mixed layer of the DA compound and at least one compound selected from the group B, the two layer separated system refers to the constitution comprising separately one layer containing the DA compound and the other layer containing the compound selected from the group B, the layers being laminated on one another, and further the multi-layer laminated system refers to the constitution comprising one or more layers containing, for example, the DA compound and one or more layers containing the compound selected from the group B, the layers being laminated in desired layer number and order on a substrate.

Figure 1B:
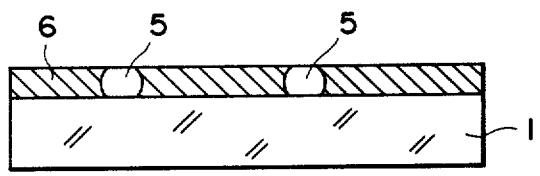
Figure 2A:
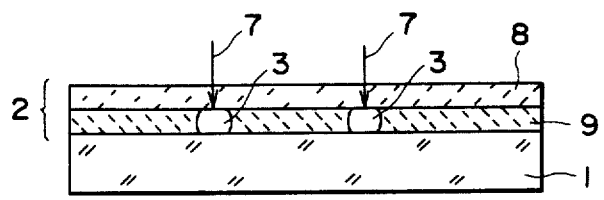
Figure 2B:
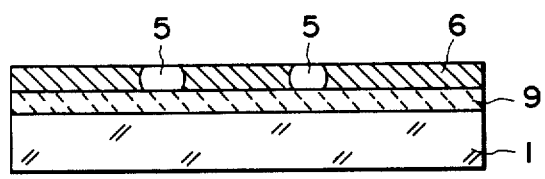

Typical constitutions of the optical recording medium to be used in the present invention are shown in FIGS. 1A, 1B and FIGS. 2A and 2B. FIGS. 1A and 1B show the constitution having a one layer mixed system wherein a recording layer 2 is provided on a substrate 1, and FIGS. 2A and 2B show the constitution having a two layer separated system wherein a recording layer 2 provided on the substrate 1 comprises a first layer 8 containing the DA compound and a second layer 9 containing the compound selected from the group B.

As the substrate 1 of the optical recording medium to be used in the present invention, there may be employed various supporting materials such as glass, a plastic plate made of e.g., acrylic resins, etc., a plastic film made of polyesters, etc., paper, metal and others. When recording is practiced by irradiating radiation from the substrate side, a substrate capable of transmitting radiation of a specific wavelength for recording is used.

The layer containing the DA compound and at least one compound selected from the group B formed on the substrate 1 may be formed by coating or as a monomolecular film or a built-up monomolecular film.

For formation of recording layer as a monomolecular film or monomolecular built-up film, for example, the Langmuir-Blodgett method (hereinafter abbreviated as LB method) developed by I. Langmuir et al may be used.

The LB method is a method in which a monomolecular film or a film having monomolecular layers built-up is prepared by utilizing the phenomenon that, in a molecular with a structure having a hydrophilic moiety and a hydrophobic moiety in the molecule, when the balance between the both (amphilphilic balance) is adequately maintained, the molecular becomes a monomolecular layer on the surface with the hydrophilic moiety directed downward. The monomolecular layer on the water surface has the characteristics of the two-dimensional system. When the molecules are scattered sparsely, the following formula of the two-dimensional ideal gas can be applied between the surface area per one molecule and the surface pressure $\pi$:

$$\pi A = kT,$$

thus becoming "gas film", wherein k is the Boltzmann's constant and T is an absolute temperature. When A is made sufficiently small, intermolecular interactions are strengthened, whereby the molecules become "condensed film (or solid film)" of a two-dimensional solid. The condensed films can be transferred one layer by one layer onto the surface of a substrate such as glass.

For constituting a mixed monomolecular film or mixed monomolecular built-up films comprising two or more compounds, at least one of the two or more compounds should simultaneously have hydrophilic site and hydrophobic site therein, and it is not necessarily required that all the compounds should simultaneously have hydrophilic site and hydrophobic site therein. That is, provided that amphiphilic balance is maintained in at least one compound, a monomolecular layer can be formed on the water surface and the other compound can be sandwiched between the amphiphilic compounds, whereby a monomolecular layer having molecular orderliness can be consequently formed.

By use of this method, a mixed monomolecular film of the DA compound and the compound selected from the group B or a built-up film thereof, from which the recording layer of the present invention is constituted, can be prepared, for example, as follows.

First, the DA compound and the compound selected from the group B are dissolved in a solvent such as chloroform, and the resulting solution is spread on an aqueous phase to form a spreading layer in which these compounds are spread in a film. Next, a partitioning plate (or a buoy) is provided to prevent too broad expansion of the spreading layer through free diffusion on the aqueous phase whereby the area of the spreading layer is restricted to control the coalesced state of these compounds and obtain a surface pressure $\pi$ in proportion to the coalesced state. By moving this partitioning plate to reduce the spreading area, the coalesced state of the film substance can be controlled, whereby the surface pressure can be gradually elevated to be set at a surface pressure $\pi$ suitable for preparation of built-up films. At the surface pressure constantly maintained, by moving vertically up and down a clean substrate gently, a mixed monomolecular film of the DA compound and the compound selected from the group B is transferred onto the substrate. A mixed monomolecular film can be thus produced, and a built-up film of mixed monomolecular layers can be formed to a desired built-up degree by repeating the above operation.

For transfer of the monomolecular film onto a substrate, other than the above vertical dipping method, such methods as the horizontal lifting method, the cylinder rotating method, etc., may be employed. The horizontal lifting method is a method in which transfer is effected with the substrate being contacted horizontally on the water surface, and the cylinder rotating method is a method in which the monomolecular layer is transferred onto the substrate surface by rotating a cylindrical substrate on the water surface. In the vertical dipping method as described above, when a substrate having a hydrophilic surface is withdrawn in the direction transversing the water surface, a monomolecular layer with the hydrophilic groups of the DA compound faced toward the substrate side is formed as a first layer on the substrate. When the substrate is moved vertically up and down, mixed monomolecular films are laminated one layer by one layer in the respective steps. Since the direction of the film forming molecules in the withdrawing step becomes opposite to that of the dipping step, according to this method, there is formed a Y-type film in which hydrophilic moieties and hydrophilic moieties, or hydrophobic moieties and hydrophobic moieties are faced to each other between the respective layers.

In contrast, the horizontal lifting method is a method in which a monomolecular film is transferred with the substrate contacted horizontally on the water surface, whereby a monomolecular film is formed on the substrate with the hydrophobic moiety of the DA compound faced toward the substrate side. According to this method, even when a film is built-up, there is no change in direction of the molecules of the DA compound, and thus there is formed an X-type film in which the hydrophobic groups are faced toward the substrate side in all of the layers. On the contrary, a built-up film in which the hydrophilic groups in all the layers are faced toward the substrate side is called a Z-type film.

In a cylinder rotating method, a monomolecular layer is transferred onto the substrate surface by rotating a cylindrical substrate on the water surface. The method for transferring monomolecular layers onto a substrate is not limited to these, but it is also possible to employ a method in which a substrate is extruded into an aqueous phase from substrate roll, when employing a large area substrate. Also, the direction of the hydrophilic moiety and the hydrophobic moiety toward the substrate as described above are given as general rules, and it is also modified then in accordance with the surface treatment of the substrate, etc.

Details of the transferring operation of these monomolecular films are already known and described in, for example "Shin Jikken Kagaku Koza (New Experimental Chemical Course) Volume 18, Interface and Colloid" P. 498–507, published by Maruzen.

Thus, the mixed monomolecular film or the mixed monomolecular built-up film formed on the substrate has high density as well as high degree of orderliness, and therefore, light absorption at any portion is substantially uniform. Accordingly, by constituting a recording layer with such a film, there can be obtained a recording medium to be used in the present invention having recording performance of high density and high resolution capable of effecting optical recording and thermal recording depending on the functions of the DA compound and the compound selected from the group B.

When the recording layer 2 of the two layer separated system or the multi-layer laminated system is formed, one or more layers 8 of the DA compound and one or more layers 9 of the compound selected from the group B may be laminated in desired layer number and order on the substrate.

The layer 8 comprising a monomolecular film or a monomolecular built-up film of the DA compound can be formed on the substrate 11 or other layers according to the above LB method using a solution containing the DA compound for spreading.

Since it is impossible to form a monomolecular film by use of at least one compound selected from the group B alone, the formation is made possible by using organic molecules having a well-balanced amphiphilicity such as higher fatty acids (e.g., stearic acid, arachic acid, etc.) in an appropriate proportion, thus forming a monomolecular film or a built-up monomolecular film according to the LB method as described above.

Of course, a combination of a layer of a monomolecular film or a built-up monomolecular film of the DA compound and a layer obtained by coating of the compound selected from the group B may be allowable.

On the other hand, for formation of a recording layer by coating, the following methods may be employed.

In the case of the one layer mixed system, fine crystalline powder of the DA compound and at least one compound selected from the group B may be dissolved in an appropriate volatile solvent to prepare a coating liquid and this coating liquid is applied to a substrate. Alternatively, in the case of the two layer separated system or the multi-layer laminated system, a coating liquid containing fine crystalline powder of the DA compound and a coating liquid containing the compound selected from the group B may be prepared separately and these are coated on the substrate 1 in a desired order.

The solvent for the coating liquid to be used in formation of a recording layer of the one layer mixed system may be generally selected suitably depending on the kind of the binder, the DA compound and the compound selected from the group B, but may, generally, include alcohols such as methanol, ethanol, isopropanol, etc., ketones such as acetone, methyl ethyl ketone, cyclohexanone, etc.; amides such as N,N-dimethylformamide, N,N-dimethylacetamide, etc.; sulfoxides such as dimethyl sulfoxide, etc.; ethers such as tetrahydrofuran, dioxane, ethyleneglycol monomethyl ether, etc.; esters such as methyl acetate, ethyl acetate, butyl acetate, etc.; aliphatic halogenated hydrocarbons such as chloroform, methylene chloride, dichloroethylene, carbon tetrachloride, trichloroethylene, etc.; and aromatic hydrocarbons such as benzene, toluene, xylene, monochlorobenzene, dichlorobenzene, etc.

In the case of croconic methine dyes, the solvent used may be selected suitably depending on the state of the croconic methine dye. In the case of a croconic methine dye under amorphous state, there may be employed alcohols such as methanol, ethanol, isopropanol, etc.; ketones such as acetone, methyl ethyl ketone, cyclohexanone, etc.; amides such as N,N-dimethylformamide, N,N-dimethylacetamide, etc.; sulfoxides such as dimethyl sulfoxide, etc.; ethers such as tetrahydrofuran, dioxane, ethylene glycol monomethyl ether, etc.; esters such as methyl acetate, ethyl acetate, etc.; aromatic compounds such as benzene, toluene, xylene, ligroin, etc. On the other hand, in the case of a croconic methine dye under state of particles, there may be selected halogenated hydrocarbons such as dichloromethane, chloroform, carbon tetrachloride, 1,1-dichloromethane, 1,2-dichloromethane, 1,1,2-trichloromethane, chlorobenzene, bromobenzene, 1,2-dichlorobenzene, etc.

The solvent for coating liquid to be used for formation of the two layer separated system or the multi-layer laminated system may include alcohols such as methanol, ethanol, isopropanol, etc.; ketones such as acetone, methyl ethyl ketone, cyclohexanone, etc.; aliphatic nitriles such as acetonitrile, etc.; aliphatic halogenated hydrocarbons such as chloroform, methylene chloride, dichloroethylene, carbon tetrachloride, trichloroethylene, etc.; and others. Methylene chloride and acetonitrile are particularly preferred.

As a preferable medium for dispersing the DA compound, there may be employed aliphatic hydrocarbons such as n-hexane, n-heptane, n-octane, cyclohexane, etc. Further, each coating liquid may incorporate suitably a binder comprising a natural or synthetic polymer for improvement of adhesion to the substrate 1 or other layers. Further, various additives may be also added for improving stability and quality of the recording layer 2.

For coating of such coating liquid onto the substrate 1, there may be employed various methods such as a spinner rotary coating, a dip coating, a spray coating, a bead coating, a wire bar coating, a blade coating, a roller coating, a curtain coating, etc.

When the recording layer 2 is the one layer mixed system, its film thickness may be suitably about 200 Å to 2 μm, particularly preferably within the range from 400 to 5000 Å.

In the case of the two separated layer system, the film thickness of each layer may be preferably about 100 Å to 1 μm, particularly preferably in the range from 200 to 5000 Å. Further, in the case of the multi-layer laminated system, the total of the film thickness of the layers containing the individual the compound selected from the group B and the total of the film thickness of the layers containing the individual compounds selected from the group B should be both suitably about 100 Å to 1μ, particularly preferably 200 to 5000 Å.

The mixing ratio of the DA compound to the compound selected from the group B may be preferably about 1/15 to 15/1, optimally 1/10 to 10/1.

If necessary, various protective layers may be also provided on the recording layer thus constituted.

The present invention can be effective regardless of the order in which the respective layers are laminated in the two layer separated system or the multi-layer laminated system.

By use of the optical recording medium thus constituted, the optical recording method of the present invention can be practiced.

In the optical recording medium, by applying light to the DA compound, the wavelength absorbed by the recording layer will change to cause change in apparent color. That is, the DA compound which is substantially colorless and transparent at the initial stage is polymerized by irradiation of UV-rays onto the whole recording layer to be changed to a polydiacetylene derivative compound. This polymerization occurs by irradiation of UV-rays. As the result of this polymerization, the recording layer becomes to have the maximum absorption wavelength at 620 to 660 nm to be changed to blue color or dark color. The change in hue based on this polymerization is an irreversible change, and the recording layer once changed to blue color or dark color will never be returned to the colorless transparent film.

On the other hand, the present inventors have made various investigations about the recording layer having the constitution as described above and consequently found that when the recording layer is subjected to a process in which it is heated at such an appropriate temperature that does not destroy the layer or deform its shape to make it once under molten state and then irradiated with UV-ray as described above, the recording layer will not be changed to blue color any longer.

This may be considered as follows. The change to a blue film as the result of polymerization of the DA compound by irradiation of UV-ray is obtained primarily by high order molecular orientation of the DA compound molecules in the DA compound crystals contained in the recording layer 2. By, e.g., melting the layer containing the DA compound by heating the recording layer as described above, the DA compound crystals contained in that portion can be melted to amorphous state to disturb the order of orientation of the DA compound molecules in that portion, whereby the number of the DA compound molecules in positional relationship capable of reaction on molecular orientation level is reduced to great extent.

The optical recording method of the present invention practices recording by utilizing the function obtained by combining such characteristic of the DA compound crystal and the compound selected from the group B.

In the following, an example of the optical recording method of the present invention is to be described.

First, the recording information is converted to an optical signal by a semiconductor laser after passing through a suitable control circuit. The optical signal passes through an optical system and is converged as shown in FIG. 1A at a predetermined position of a disc-shaped recording medium having a recording layer of the one layer mixed system which is mounted on, for example, an optical recording medium mounting means and is rotating synchronously, thereby effecting optical writing of the recording information by a semiconductor laser 7.

As the semiconductor laser to be used in this operation, it is particularly preferable to use a GaAs junction laser with an output wavelength of 800–850 nm.

In this case, at the converged point (light irradiated site) 3, no apparent change such as color change, etc., will not occur, but the compound selected from the group B existing at this portion generates heat by absorption of the light to melt the fine powdery DA compound crystals contained in the light irradiated site 3, whereby this portion becomes amorphous state to be disturbed in the high order orientation of the DA compound molecules. As the result, the light irradiated site 3 becomes the portion which will not be changed in color in the visualizing treatment practiced later.

The irradiation conditions of laser beam during this writing may be selected suitably depending on the constitution of the optical recording medium used, but it is at least required that the temperature of the light irradiated site 3 should become the temperature which is sufficient to disturb the order of the orientation of the DA compound molecules by melting the fine powder of the DA compound crystals and yet will not destroy the recording layer or change its shape.

Thus, writing of the recording information is effected by formation of a latent image as shown in FIG. 1A comprising the portion 3 disturbed in the high order orientation of the DA compound molecules (subjected to light irradiation), which is formed through the difference in state on the level of molecular orientation in the recording layer, namely formed in the portion 4 wherein the high order orientation of the DA compound molecules is maintained in the fine powdery DA compound crystals (not subjected to light irradiation).

In this connection, the DA compound has no sensitivity to the semiconductor laser as described above, and no such optical writing is possible in the optical recording medium comprising only the DA compound of the related art.

As described above, the recording information is not recorded in the recording layer 2 as an optically detectable image, and therefore the recording image written cannot be read at this stage.

Accordingly, when it is desired to read the recording information, it is necessary to visualize the latent image formed in the recording layer 2.

Visualization of the latent image may be practiced by irradiating uniformly UV-ray over the recording medium.

By irradiation of UV-ray, the DA compound of which high order orientation is maintained in the DA compound crystals existing at the portion 4 not irradiated with light during writing in the recording layer is polymerized to be changed to a polydiacetylene derivative compound, whereby the portion in the recording layer is changed to a blue film 6 having the maximum absorption wavelength at 620–660 nm as shown in FIG. 1B. On the other hand, at the portion 3 irradiated with IR-ray during the previous optical writing, as described above, the high order orientation of the DA compound is disturbed, and therefore polymerization of the DA compound will occur with difficulty, whereby no color change to a blue film will occur at this portion as in the non-irradiated portion 6. Accordingly, the latent image portion 3 formed during the previous writing remains, as the original color of the recording layer which is substantially colorless and transparent, in the film 6 changed to blue color by the UV-ray irradiation treatment, thus being visualized as the colorless portion 5 which is optically distinguishable from the blue film 6.

After completion of the treatment by irradiation of UV-ray, the recording layer 2 may be heated to about 50° C. or higher if necessary, whereby the polydiacetylene derivative compound in the blue film 6 will be changed to red color and therefore the recording information written in the recording layer 2, as the latent image can be visualized as the colorless portion 5 in the red film. It is preferable that the heating temperature should be in the range from about 50° C. to 120° C.

Heating treatment of the recording layer can be practiced by use of a heating means such as a heater, etc., or alternatively it can be practiced by irradiation of a radiation such as IR-ray, etc., on the recording layer, since a compound selected from the group B capable of generating heat by absorbing the radiation is contained in the recording layer.

Having described above about the optical recording method of the present invention by use of a recording medium having a recording layer of the one layer mixed system, when a recording medium having the two layer separated system as shown in FIGS. 2A and 2B is used, the converged point 3 of the laser beam is positioned in the layer 9 containing the compound selected from the group B as shown in FIG. 2A. Thus, by irradiation of the laser beam 7, the compound selected from the group B contained in the layer 9 generates heat by absorption of the laser beam 7, and the portion of the layer 8 containing the DA compound on the converged point 3 is melted by the heat generation, whereby a latent image is formed as shown in the process as described above. This latent image can be visualized as the colorless portion 5 optically distinguishable from the blue or red film 6 as shown in FIG. 2B by the irradiation treatment of UV-ray as described above, or by further heating treatment optionally practiced.

As the optical recording medium, a disc (optical disc) shaped in a disc has been employed in the above example, but it is also possible to use an optical tape, an optical card, etc., depending on the kind of the substrate supporting the recording layer containing the DA compound and the compound selected from the group B.

EXAMPLE 1-1

One part by weight of fine crystalline powder of a diacetylene derivative represented by the formula $C_{12}H_{25}-C\equiv C-C\equiv C-C_8H_{16}-COOH$ and 15 parts by weight of the AZ compound represented by the above formula 1-1-1 were added to 30 parts by weight of methylene chloride, followed by through stirring, to prepare a coating solution.

Next, a disc substrate made of a glass (thickness 1.5 mm, diameter 200 mm) was mounted on a spinner coating machine, and a small amount of the above coating solution was added dropwise at the center of the disc substrate and thereafter the spinner was rotated at a predetermined rotational number for a predetermined time to effect coating, followed by drying at room temperature, to prepare optical recording media with thicknesses of coated films after drying of 500 Å, 1000 Å and 2000 Å, respectively.

By use of the recording media thus obtained, the optical recording method of the present invention was practiced as described below.

First, each of the above recording media was irradiated with a semiconductor laser of 830 nm (laser beam diameter: 1 μm, irradiation time: 200 ns/1 dot, output: 4 mW) following an input information to form a latent image. During this operation, no apparent change was recognized at the light-irradiated portion of the recording medium.

Next, after completion of writing by used of this semiconductor laser, the recording medium was irradiated uniformly and sufficiently with UV-rays of 254 nm. As the result, portions other than those irradiated with the semiconductor laser during previous writing onto the recording layer of the recording medium were changed in color to blue, whereby the latent image formed previously, namely the negative image with the portions irradiated with the semiconductor laser being left colorless, was visualized.

Evaluations of the recording results are shown in Table 1. Evaluations were performed by synthetic judgement of sensitivity, image resolution and goodness or badness of contrast between the colorless portion and the surrounding portion, with the particularly good one being rated as ⊙, good one as o and incapability of recording or bad one as x.

EXAMPLE 1-2

By use of a mixed solution containing 1 part by weight of the diacetylene derivative compound, 10 parts by weight of the AZ compound and 21 parts by weight of methylene chloride as the coating solution, recording media were prepared according to the same method as in Example 1-1.

On the recording media thus obtained, optical recording was practiced in the same manner as in Example 1-1, and then the negative images were visualized by irradiating UV-rays of 254 nm uniformly and sufficiently on the recording media, and the images were evaluated. The results are shown in Table 1-1.

EXAMPLE 1-3

By use of a mixed solution containing 1 part by weight of the diacetylene derivative compound, 5 parts by weight of the AZ compound and 12 parts by weight of methylene chloride as the coating solution, following otherwise the same procedure as in Example 1-1, experiments were conducted.

The results are shown in Table 1-1.

EXAMPLE 1-4

By use of a mixed solution containing 1 part by weight of the diacetylene derivative compound, 1 part by weight of the AZ compound and 4 parts by weight of methylene chloride as the coating solution, following otherwise the same procedure as in Example 1-1, experiments were conducted.

The results are shown in Table 1-1.

EXAMPLE 1-5

By use of a mixed solution containing 5 parts by weight of the diacetyle derivative compound, 1 part by weight of the AZ compound and 12 parts by weight of methylene chloride as the coating solution, following otherwise the same procedure as in Example 1-1, experiments were conducted.

The results are shown in Table 1-1.

EXAMPLE 1-6

By use of a mixed solution containing 10 parts by weight of the diacetylene derivative compound, 1 part by weight of the AZ compound and 20 parts by weight of methylene chloride as the coating solution, following otherwise the same procedure as in Example 1-1, experiments were conducted.

The results are shown in Table 1-1.

EXAMPLE 1-7

By use of a mixed solution containing 15 parts by weight of the diacetylene derivative compound, 1 part by weight of the AZ compound and 30 parts by weight of methylene chloride as the coating solution, following otherwise the same procedure as in Example 1-1, experiments were conducted.

The results are shown in Table 1-1.

TABLE 1-1

| Recording medium | Film thickness | Sensitivity | Image resolution | Contrast |
|---|---|---|---|---|
| Example 1-1 | 500 Å | ◉ | o | x |
|  | 1000 Å | ◉ | o | x |
|  | 2000 Å | ◉ | o | x |
| Example 1-2 | 500 Å | ◉ | o | x |
|  | 1000 Å | ◉ | o | x |
|  | 2000 Å | ◉ | o | o |
| Example 1-3 | 500 Å | ◉ | ◉ | x |
|  | 1000 Å | ◉ | ◉ | o |
|  | 2000 Å | ◉ | ◉ | ◉ |
| Example 1-4 | 500 Å | ◉ | ◉ | o |
|  | 1000 Å | ◉ | ◉ | ◉ |
|  | 2000 Å | ◉ | ◉ | ◉ |
| Example 1-5 | 500 Å | ◉ | ◉ | o |
|  | 1000 Å | ◉ | ◉ | ◉ |
|  | 2000 Å | ◉ | ◉ | ◉ |
| Example 1-6 | 500 Å | x | x | x |
|  | 1000 Å | x | x | x |
|  | 2000 Å | o | o | o |
| Example 1-7 | 500 Å | x | x | x |
|  | 1000 Å | x | x | x |

TABLE 1-1-continued

| Recording medium | Film thickness | Sensitivity | Image resolution | Contrast |
|---|---|---|---|---|
|  | 2000 Å | o | o | x |

EXAMPLES 1-8 TO 1-14

As for the steps of optical recording and visualization of negative images, Examples 1-1 to 1-7 were repeated, and thereafter, each of the recording media was heated to about 80° C. to obtain the negative images in which the blue color of the back ground was changed to red color. For these negative images, evaluation was performed according to the same standards as in Example 1-1 to obtain the results shown in Table 1-2.

TABLE 1-2

| Recording medium | Film thickness | Sensitivity | Image resolution | Contrast |
|---|---|---|---|---|
| Example 1-8 | 500 Å | ◉ | o | x |
|  | 1000 Å | ◉ | o | x |
|  | 2000 Å | ◉ | o | x |
| Example 1-9 | 500 Å | ◉ | o | x |
|  | 1000 Å | ◉ | o | x |
|  | 2000 Å | ◉ | o | o |
| Example 1-10 | 500 Å | ◉ | ◉ | x |
|  | 1000 Å | ◉ | ◉ | o |
|  | 2000 Å | ◉ | ◉ | ◉ |
| Example 1-11 | 500 Å | ◉ | ◉ | o |
|  | 1000 Å | ◉ | ◉ | ◉ |
|  | 2000 Å | ◉ | ◉ | ◉ |
| Example 1-12 | 500 Å | ◉ | ◉ | o |
|  | 1000 Å | ◉ | ◉ | ◉ |
|  | 2000 Å | ◉ | ◉ | ◉ |
| Example 1-13 | 500 Å | x | x | x |
|  | 1000 Å | x | x | x |
|  | 2000 Å | o | o | o |
| Example 1-14 | 500 Å | x | x | x |
|  | 1000 Å | x | x | x |
|  | 2000 Å | o | o | x |

EXAMPLE 1-15

According to the same procedure as in Example 1-4 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$, an optical recording medium was prepared. By use of this, experiments were conducted in the same manner as in Example 1-1. The results are shown in Table 1-3.

EXAMPLE 1-16

According to the same procedure as in Example 1-15 except for using the AZ compound represented by the formulae 1-1-5 in place of the AZ compound represented by the formula 1-1-1, recording medium was prepared. By use of this, experiments were conducted in the same manner as in Example 1-1 to obtain the results shown in Table 1-3.

EXAMPLE 1-17

According to the same procedure as in Example 1-15 except for using the AZ compound represented by the formulae 1-1-8 in place of the AZ compound represented by the formula 1-1-1, recording medium was prepared. By use of this, experiments were conducted in the same manner as in Example 1-1 to obtain the results shown in Table 1-3.

EXAMPLE 1-18

According to the same procedure as in Example 1-15 except for using the AZ compound represented by the formulae 1-1-15 in place of the AZ compound represented by the formula 1-1-1, recording medius was prepared. By use of this, experiments were conducted in the same manner as in Example 1-1 to obtain the results shown in Table 1-3.

EXAMPLE 1-19

According to the same procedure as in Example 1-15 except for using the AZ compound represented by the formulae 1-1-17 in place of the AZ compound represented by the formula 1-1-1, recording medius was prepared. By use of this, experiments were conducted in the same manner as in Example 1-1 to obtain the results shown in Table 1-3.

TABLE 1-3

| Recording medium | Film thickness | Sensitivity | Image resolution | Contrast |
|---|---|---|---|---|
| Example 1-15 | 500 Å | ◎ | ◎ | ○ |
|  | 1000 Å | ◎ | ◎ | ◎ |
|  | 2000 Å | ◎ | ◎ | ◎ |
| Example 1-16 | 500 Å | ◎ | ○ | ○ |
|  | 1000 Å | ◎ | ◎ | ● |
|  | 2000 Å | ● | ◎ | ● |
| Example 1-17 | 500 Å | ○ | ○ | ○ |
|  | 1000 Å | ○ | ○ | ○ |
|  | 2000 Å | ◎ | ◎ | ◎ |
| Example 1-18 | 500 Å | ◎ | ◎ | ○ |
|  | 1000 Å | ◎ | ◎ | ◎ |
|  | 2000 Å | ◎ | ◎ | ◎ |
| Example 1-19 | 500 Å | ○ | ○ | ○ |
|  | 1000 Å | ◎ | ◎ | ◎ |
|  | 2000 Å | ◎ | ◎ | ◎ |

EXAMPLE 1-20

One part by weight of an AZ compound represented by the formula 1-1-1 was dissolved in 10 parts by weight of acetonitrile to provide a coating solution A1.

Separately, 1 part by weight of fine crystal powder of a diacetylene derivative compound represented by $C_{12}H_{25}$—C≡C—C≡C—$C_8H_{16}$—COOH was added into 10 parts by weight of benzene and stirred thoroughly to provide a coating solution of B1.

Next, a disc substrate made of a glass (thickness 1.5 mm, diameter 200 mm) was mounted on a spinner coating machine, and first a small amount of the above coating solution A1 was added dropwise at the center of the disc substrate and then coated by rotating the spinner at a predetermined rotational number for a predetermined time, followed by drying at room temperature, to form a layer containing the AZ compound on the substrate. Subsequently, the substrate having the layer containing the AZ compound formed thereon was again mounted on the spinner coating machine, and a small amount of the above coating solution B1 was added dropwise at the central portion of the surface of the layer containing the AZ compound previously formed on the disc substrate, and coated by rotating the spinner at a predetermined rotational number for a predetermined time, followed by drying at room temperature, to laminate the layer containing the DA compound on the layer containing the AZ compound, thus providing a recording layer.

By varying the film thicknesses of the layer containing the AZ compound and of the layer containing the DA compounds, 25 kinds of recording media of samples 1-1-20-1 to 1-1-20-25 were obtained.

By use of the recording media thus obtained, experiments were conducted in the same manner as in Example 1-1 to obtain the results shown in Table 1-4B.

EXAMPLE 1-21

According to the same procedure as in Example 1-20 except for using a diacetylene derivative compound represented by $C_8H_{17}$—C≡C—C≡C—$C_2H_4$—COOH in place of the diacetylene derivative compound represented by $C_{12}H_{25}$—C≡C—C≡C—$C_8H_{16}$—COOH in the recording liquid B1, 25 kinds of recording media of samples 1-1-21-1 to 1-1-21-25 as shown in Table 1-5A were prepared.

By use of the recording media thus obtained, experiments were conducted in the same manner as in Example 1-1 to obtain the results shown in Table 1-5B.

EXAMPLE 1-22

According to the same procedure as in Example 1-21 except for using an AZ compound represented by the formula 1-1-5 in place of the AZ compound represented by the formula 1-1-1 in the recording liquid AI, 25 kinds of recording media of samples 1-1-22-1 to 1-1-22-25 as shown in Table 1-6A were prepared.

By use of the recording media thus obtained, experiments were conducted in the same manner as in Example 1-1 to obtain the results shown in Table 1-6B.

EXAMPLE 1-23

According to the same procedure as in Example 1-21 except for using an AZ compound represented by the formula 1-1-8 in place of the AZ compound represented by the formula 1-1-1 in the recording liquid A1, 25 kinds of recording media of samples 1-1-23-1 to 1-1-23-25 as shown in Table 1-7A were prepared.

By use of the recording media thus obtained, experiments were conducted in the same manner as in Example 1-21 to obtain the results shown in Table 1-7B.

TABLE 1-4A

| Sample No. | Film thickness of layer containing DA compound (Å) | Film thickness of layer containing AZ compound (Å) | Sample No. | Film thickness of layer containing DA compound (Å) | Film thickness of layer containing AZ compound (Å) |
|---|---|---|---|---|---|
| 1-1-20-1 | 100 | 100 | 1-1-20-14 | 1000 | 3000 |
| 1-1-20-2 | 100 | 200 | 1-1-20-15 | 1000 | 6000 |
| 1-1-20-3 | 100 | 1000 | 1-1-20-16 | 3000 | 100 |
| 1-1-20-4 | 100 | 3000 | 1-1-20-17 | 3000 | 200 |
| 1-1-20-5 | 100 | 6000 | 1-1-20-18 | 3000 | 1000 |
| 1-1-20-6 | 200 | 100 | 1-1-20-19 | 3000 | 3000 |
| 1-1-20-7 | 200 | 200 | 1-1-20-20 | 3000 | 6000 |
| 1-1-20-8 | 200 | 1000 | 1-1-20-21 | 6000 | 100 |
| 1-1-20-9 | 200 | 3000 | 1-1-20-22 | 6000 | 200 |
| 1-1-20-10 | 200 | 6000 | 1-1-20-23 | 6000 | 1000 |
| 1-1-20-11 | 1000 | 100 | 1-1-20-24 | 6000 | 3000 |

TABLE 1-4A-continued

| Sample No. | Film thickness of layer containing DA compound (Å) | Film thickness of layer containing AZ compound (Å) | Sample No. | Film thickness of layer containing DA compound (Å) | Film thickness of layer containing AZ compound (Å) |
|---|---|---|---|---|---|
| 1-1-20-12 | 1000 | 200 | 1-1-20-25 | 6000 | 6000 |
| 1-1-20-13 | 1000 | 1000 | | | |

TABLE 1-4B

| Sample No. | Sensitivity | Image resolution | Contrast | Sample No. | Sensitivity | Image resolution | Contrast |
|---|---|---|---|---|---|---|---|
| 1-1-20-1 | ● | ○ | x | 1-1-20-14 | ● | ● | ● |
| 1-1-20-2 | ● | ○ | x | 1-1-20-15 | ● | ● | ● |
| 1-1-20-3 | ● | ○ | x | 1-1-20-16 | x | x | x |
| 1-1-20-4 | ● | ○ | x | 1-1-20-17 | x | x | x |
| 1-1-20-5 | ● | ○ | x | 1-1-20-18 | ● | ● | ● |
| 1-1-20-6 | ● | ○ | x | 1-1-20-19 | ● | ● | ● |
| 1-1-20-7 | ● | ○ | x | 1-1-20-20 | ● | ● | ● |
| 1-1-20-8 | ● | ○ | x | 1-1-20-21 | x | x | x |
| 1-1-20-9 | ● | ○ | x | 1-1-20-22 | x | x | x |
| 1-1-20-10 | ● | ○ | x | 1-1-20-23 | ● | ● | ● |
| 1-1-20-11 | ○ | ○ | x | 1-1-20-24 | ● | ● | ● |
| 1-1-20-12 | ○ | ○ | x | 1-1-20-25 | ● | ● | ● |
| 1-1-20-13 | ● | ● | ● | | | | |

TABLE 1-5A

| Sample No. | Film thickness of layer containing DA compound (Å) | Film thickness of layer containing AZ compound (Å) | Sample No. | Film thickness of layer containing DA compound (Å) | Film thickness of layer containing AZ compound (Å) |
|---|---|---|---|---|---|
| 1-1-21-1 | 100 | 100 | 1-1-21-14 | 1000 | 3000 |
| 1-1-21-2 | 100 | 200 | 1-1-21-15 | 1000 | 6000 |
| 1-1-21-3 | 100 | 1000 | 1-1-21-16 | 3000 | 100 |
| 1-1-21-4 | 100 | 3000 | 1-1-21-17 | 3000 | 200 |
| 1-1-21-5 | 100 | 6000 | 1-1-21-18 | 3000 | 1000 |
| 1-1-21-6 | 200 | 100 | 1-1-21-19 | 3000 | 3000 |
| 1-1-21-7 | 200 | 200 | 1-1-21-20 | 3000 | 6000 |
| 1-1-21-8 | 200 | 1000 | 1-1-21-21 | 6000 | 100 |
| 1-1-21-9 | 200 | 3000 | 1-1-21-22 | 6000 | 200 |
| 1-1-21-10 | 200 | 6000 | 1-1-21-23 | 6000 | 1000 |
| 1-1-21-11 | 1000 | 100 | 1-1-21-24 | 6000 | 3000 |
| 1-1-21-12 | 1000 | 200 | 1-1-21-25 | 6000 | 6000 |
| 1-1-21-13 | 1000 | 1000 | | | |

TABLE 1-5B

| Sample No. | Sensitivity | Image resolution | Contrast | Sample No. | Sensitivity | Image resolution | Contrast |
|---|---|---|---|---|---|---|---|
| 1-1-21-1 | ● | ○ | x | 1-1-21-14 | ● | ● | ● |
| 1-1-21-2 | ● | ○ | x | 1-1-21-15 | ● | ● | ● |
| 1-1-21-3 | ● | ○ | x | 1-1-21-16 | x | x | x |
| 1-1-21-4 | ● | ○ | x | 1-1-21-17 | ○ | ○ | ○ |
| 1-1-21-5 | ● | ○ | x | 1-1-21-18 | ● | ● | ● |
| 1-1-21-6 | ● | ○ | x | 1-1-21-19 | ● | ● | ● |
| 1-1-21-7 | ● | ○ | x | 1-1-21-20 | ● | ● | ● |
| 1-1-21-8 | ● | ○ | x | 1-1-21-21 | x | x | x |
| 1-1-21-9 | ● | ○ | x | 1-1-21-22 | x | x | x |
| 1-1-21-10 | ● | ○ | x | 1-1-21-23 | ● | ● | ● |
| 1-1-21-11 | ○ | ○ | x | 1-1-21-24 | ● | ● | ● |
| 1-1-21-12 | ○ | ○ | x | 1-1-21-25 | ● | ● | ● |
| 1-1-21-13 | ● | ● | ● | | | | |

TABLE 1-6A

| Sample No. | Film thickness of layer containing DA compound (Å) | Film thickness of layer containing AZ compound (Å) | Sample No. | Film thickness of layer containing DA compound (Å) | Film thickness of layer containing AZ compound (Å) |
|---|---|---|---|---|---|
| 1-1-22-1 | 100 | 100 | 1-1-22-14 | 1000 | 3000 |
| 1-1-22-2 | 100 | 200 | 1-1-22-15 | 1000 | 6000 |
| 1-1-22-3 | 100 | 1000 | 1-1-22-16 | 3000 | 100 |
| 1-1-22-4 | 100 | 3000 | 1-1-22-17 | 3000 | 200 |
| 1-1-22-5 | 100 | 6000 | 1-1-22-18 | 3000 | 1000 |
| 1-1-22-6 | 200 | 100 | 1-1-22-19 | 3000 | 3000 |
| 1-1-22-7 | 200 | 200 | 1-1-22-20 | 3000 | 6000 |

TABLE 1-6A-continued

| Sample No. | Film thickness of layer containing DA compound (Å) | Film thickness of layer containing AZ compound (Å) | Sample No. | Film thickness of layer containing DA compound (Å) | Film thickness of layer containing AZ compound (Å) |
|---|---|---|---|---|---|
| 1-1-22-8 | 200 | 1000 | 1-1-22-21 | 6000 | 100 |
| 1-1-22-9 | 200 | 3000 | 1-1-22-22 | 6000 | 200 |
| 1-1-22-10 | 200 | 6000 | 1-1-22-23 | 6000 | 1000 |
| 1-1-22-11 | 1000 | 100 | 1-1-22-24 | 6000 | 3000 |
| 1-1-22-12 | 1000 | 200 | 1-1-22-25 | 6000 | 6000 |
| 1-1-22-13 | 1000 | 1000 | | | |

TABLE 1-6B

| Sample No. | Sensitivity | Image resolution | Contrast | Sample No. | Sensitivity | Image resolution | Contrast |
|---|---|---|---|---|---|---|---|
| 1-1-22-1 | ● | ● | x | 1-1-22-14 | o | ● | o |
| 1-1-22-2 | ● | ● | x | 1-1-22-15 | ● | ● | ● |
| 1-1-22-3 | ● | ● | x | 1-1-22-16 | x | x | x |
| 1-1-22-4 | ● | ● | x | 1-1-22-17 | x | x | x |
| 1-1-22-5 | ● | ● | x | 1-1-22-18 | o | o | o |
| 1-1-22-6 | ● | ● | x | 1-1-22-19 | ● | ● | ● |
| 1-1-22-7 | ● | ● | x | 1-1-22-20 | ● | ● | ● |
| 1-1-22-8 | ● | ● | x | 1-1-22-21 | x | x | x |
| 1-1-22-9 | ● | ● | x | 1-1-22-22 | x | x | x |
| 1-1-22-10 | ● | ● | x | 1-1-22-23 | ● | ● | ● |
| 1-1-22-11 | o | o | x | 1-1-22-24 | ● | ● | ● |
| 1-1-22-12 | o | o | x | 1-1-22-25 | ● | ● | ● |
| 1-1-22-13 | o | o | o | | | | |

TABLE 1-7A

| Sample No. | Film thickness of layer containing DA compound (Å) | Film thickness of layer containing AZ compound (Å) | Sample No. | Film thickness of layer containing DA compound (Å) | Film thickness of layer containing AZ compound (Å) |
|---|---|---|---|---|---|
| 1-1-23-1 | 100 | 100 | 1-1-23-14 | 1000 | 3000 |
| 1-1-23-2 | 100 | 200 | 1-1-23-15 | 1000 | 6000 |
| 1-1-23-3 | 100 | 1000 | 1-1-23-16 | 3000 | 100 |
| 1-1-23-4 | 100 | 3000 | 1-1-23-17 | 3000 | 200 |
| 1-1-23-5 | 100 | 6000 | 1-1-23-18 | 3000 | 1000 |
| 1-1-23-6 | 200 | 100 | 1-1-23-19 | 3000 | 3000 |
| 1-1-23-7 | 200 | 200 | 1-1-23-20 | 3000 | 6000 |
| 1-1-23-8 | 200 | 1000 | 1-1-23-21 | 6000 | 100 |
| 1-1-23-9 | 200 | 3000 | 1-1-23-22 | 6000 | 200 |
| 1-1-23-10 | 200 | 6000 | 1-1-23-23 | 6000 | 1000 |
| 1-1-23-11 | 1000 | 100 | 1-1-23-24 | 6000 | 3000 |
| 1-1-23-12 | 1000 | 200 | 1-1-23-25 | 6000 | 6000 |
| 1-1-23-13 | 1000 | 1000 | | | |

TABLE 1-7B

| Sample No. | Sensitivity | Image resolution | Contrast | Sample No. | Sensitivity | Image resolution | Contrast |
|---|---|---|---|---|---|---|---|
| 1-1-23-1 | ● | o | x | 1-1-23-14 | ● | ● | ● |
| 1-1-23-2 | ● | o | x | 1-1-23-15 | ● | ● | ● |
| 1-1-23-3 | ● | o | x | 1-1-23-16 | x | x | x |
| 1-1-23-4 | ● | o | x | 1-1-23-17 | x | x | x |
| 1-1-23-5 | ● | o | x | 1-1-23-18 | ● | ● | ● |
| 1-1-23-6 | ● | o | x | 1-1-23-19 | ● | ● | ● |
| 1-1-23-7 | ● | o | x | 1-1-23-20 | ● | ● | ● |
| 1-1-23-8 | ● | o | o | 1-1-23-21 | x | x | x |
| 1-1-23-9 | ● | o | o | 1-1-23-22 | x | x | x |
| 1-1-23-10 | ● | o | o | 1-1-23-23 | ● | ● | ● |
| 1-1-23-11 | o | o | x | 1-1-23-24 | ● | ● | ● |
| 1-1-23-12 | o | o | x | 1-1-23-25 | ● | ● | ● |
| 1-1-23-13 | ● | | | | | | |

EXAMPLE 2-1

One part by weight of fine crystalline powder of a diacetylene derivative represented by the formula $C_{12}H_{25}$—C≡C—C≡C—$C_8C_{16}$—COOH and 15 parts by weight of the pyrylium dye represented by the above formula 2-1-5 were added to 25 parts by weight of methylene chloride, followed by thorough stirring, to prepare a coating solution.

Following subsequently the same procedure as in Example 1-1, experiments were conducted.

EXAMPLE 2-2

By use of a mixed solution containing 1 part by weight of the diacetylene derivative compound, 10 parts by weight of the pyrilium dye and 21 parts by weight of methylene chloride as the coating solution, experiments were conducted according to the same method as in Example 2-1.

EXAMPLE 2-3

By use of a mixed solution containing 1 part by weight of the diacetylene derivative compound, 5 parts by weight of the pyrilium dye and 12 parts by weight of methylene chloride as the coating solution, experiments were conducted according to the same method as in Example 2-1.

EXAMPLE 2-4

By use of a mixed solution containing 1 part by weight of the diacetylene derivative compound, 1 part by weight of the pyrylium dye and 4 parts by weight of methylene chloride as the coating solution, experiments were conducted according to the same method as in Example 2-1.

EXAMPLE 2-5

By use of a mixed solution containing 5 parts by weight of the diacetylene derivative compound, 1 part by weight of the pyrylium dye and 12 parts by weight of methylene chloride as the coating solution, experiments were conducted according to the same method as in Example 2-1.

EXAMPLE 2-6

By use of a mixed solution containing 10 parts by weight of the diacetylene derivative compound, 1 part by weight of the pyrylium dye and 20 parts by weight of methylene chloride as the coating solution, experiments were conducted according to the same method as in Example 2-1.

EXAMPLE 2-7

By use of a mixed solution containing 15 parts by weight of the diacetylene derivative compound, 1 part by weight of the pyrylium dye and 30 parts by weight of methylene chloride as the coating solution, experiments were donducted according to the same method as in Example 2-1.

The results of Examples 2-1 to 2-7 are shown in Table 2-1.

TABLE 2-1

| Optical recording medium | Film thickness | Sensi-tivity | Image resolution | Contrast |
|---|---|---|---|---|
| Example 2-1 | 500Å | ● | o | x |
|  | 1000Å | ● | o | x |
|  | 2000Å | ● | o | o |
| Example 2-2 | 500Å | ● | o | x |
|  | 1000Å | ● | o | o |
|  | 2000Å | ● | o | o |
| Example 2-3 | 500Å | ● | ● | x |
|  | 1000Å | ● | ● | o |
|  | 2000Å | ● | ● | ● |
| Example 2-4 | 500Å | ● | ● | o |
|  | 1000Å | ● | ● | ● |
|  | 2000Å | ● | ● | ● |
| Example 2-5 | 500Å | ● | ● | o |
|  | 1000Å | ● | ● | ● |
|  | 2000Å | ● | ● | ● |
| Example 2-6 | 500Å | o | o | o |
|  | 1000Å | o | o | o |
|  | 2000Å | o | o | o |
| Example 2-7 | 500Å | x | x | x |
|  | 1000Å | x | x | x |
|  | 2000Å | o | o | o |

EXAMPLES 2-8 TO 2-14

As for the steps of optical recording and visualization of negative images, Examples 2-1 to 2-7 were repeated, and thereafter, each of the recording media was heated to about 80° C. to obtain the negative images in which the blue color of the back ground was changed to red color. For these negative images, evaluation was performed according to the same standards as in Example 2-1 to obtain the results shown in Table 2-2.

TABLE 2-2

| Optical recording medium | Film thickness | Sensi-tivity | Image resolution | Contrast |
|---|---|---|---|---|
| Example 2-8 | 500Å | ● | o | x |
|  | 1000Å | ● | o | x |
|  | 2000Å | ● | o | o |
| Example 2-9 | 500Å | ● | o | x |
|  | 1000Å | ● | o | o |
|  | 2000Å | ● | o | o |
| Example 2-10 | 500Å | ● | ● | x |
|  | 1000Å | ● | ● | o |
|  | 2000Å | ● | ● | ● |
| Example 2-11 | 500Å | ● | ● | o |
|  | 1000Å | ● | ● | ● |
|  | 2000Å | ● | ● | ● |
| Example 2-12 | 500Å | ● | ● | o |
|  | 1000Å | ● | ● | ● |
|  | 2000Å | ● | ● | ● |
| Example 2-13 | 500Å | o | o | o |
|  | 1000Å | o | o | o |
|  | 2000Å | o | o | o |
| Example 2-14 | 500Å | x | x | x |
|  | 1000Å | x | x | x |
|  | 2000Å | o | o | o |

EXAMPLE 2-15

Experiments were conducted according to the same procedure as in Example 2-4 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$. The results are shown in Table 2-3.

EXAMPLE 2-16 TO 2-19

According to the same procedure as in Example 2-15 except for using the pyrylium dyes represented by the formulae 2-1-6, 2-1-7, 2-1-14 and 2-1-16, respectively, in place of the pyrylium dye used in Example 2-15, experiments were conducted in the same manner. The results are shown in Table 2-3.

TABLE 2-3

| Optical recording medium | Film thickness | Sensi-tivity | Image resolution | Contrast |
|---|---|---|---|---|
| Example 2-15 | 500Å | ● | ● | o |
|  | 1000Å | ● | ● | ● |
|  | 2000Å | ● | ● | ● |
| Example 2-16 | 500Å | ● | o | o |
|  | 1000Å | ● | ● | ● |
|  | 2000Å | ● | ● | ● |
| Example 2-17 | 500Å | o | o | o |
|  | 1000Å | o | o | o |

TABLE 2-3-continued

| Optical recording medium | Film thickness | Sensitivity | Image resolution | Contrast |
|---|---|---|---|---|
| | 2000Å | ◉ | ◉ | ◉ |
| Example 2-18 | 500Å | ● | ◉ | ○ |
| | 1000Å | ◉ | ● | ● |
| | 2000Å | ◉ | ● | ● |
| Example 2-19 | 500Å | ● | ○ | ○ |
| | 1000Å | ◉ | ● | ● |
| | 2000Å | ● | ● | ● | into 10 parts by weight of benzene and stirred thoroughly to provide a coating solution B2.

By use of the coating solutions A2 and B2 in place of A1 and B1 in Example 1-20, respectively, experiments were conducted in the same manner as in Example 1-20.

However, by varying the film thicknesses of the layer containing the pyrylium dye and of the layer containing the DA compound, 25 kinds of recording media of samples 2-1-20-1 to 2-1-20-25 were obtained.

The results are shown in Table 2-4B.

TABLE 2-4A

| Sample No. | Film thickness of layer containing DA compound (Å) | Film thickness of layer containing pyrylium dye (Å) | Sample No. | Film thickness of layer containing DA compound (Å) | Film thickness of layer containing pyrylium dye (Å) |
|---|---|---|---|---|---|
| 2-1-20-1 | 100 | 100 | 2-1-20-14 | 1000 | 3000 |
| 2-1-20-2 | 100 | 200 | 2-1-20-15 | 1000 | 6000 |
| 2-1-20-3 | 100 | 1000 | 2-1-20-16 | 3000 | 100 |
| 2-1-20-4 | 100 | 3000 | 2-1-20-17 | 3000 | 200 |
| 2-1-20-5 | 100 | 6000 | 2-1-20-18 | 3000 | 1000 |
| 2-1-20-6 | 200 | 100 | 2-1-20-19 | 3000 | 3000 |
| 2-1-20-7 | 200 | 200 | 2-1-20-20 | 3000 | 6000 |
| 2-1-20-8 | 200 | 1000 | 2-1-20-21 | 6000 | 100 |
| 2-1-20-9 | 200 | 3000 | 2-1-20-22 | 6000 | 200 |
| 2-1-20-10 | 200 | 6000 | 2-1-20-23 | 6000 | 1000 |
| 2-1-20-11 | 1000 | 100 | 2-1-20-24 | 6000 | 3000 |
| 2-1-20-12 | 1000 | 200 | 2-1-20-25 | 6000 | 6000 |
| 2-1-20-13 | 1000 | 1000 | | | |

TABLE 2-4B

| Sample No. | Sensitivity | Image resolution | Contrast | Sample No. | Sensitivity | Image resolution | Contrast |
|---|---|---|---|---|---|---|---|
| 2-1-20-1 | ◉ | ○ | x | 2-1-20-14 | ◉ | ◉ | ◉ |
| 2-1-20-2 | ◉ | ○ | x | 2-1-20-15 | ◉ | ● | ● |
| 2-1-20-3 | ● | ○ | x | 2-1-20-16 | x | x | x |
| 2-1-20-4 | ◉ | ○ | x | 2-1-20-17 | x | x | x |
| 2-1-20-5 | ◉ | ○ | x | 2-1-20-18 | ◉ | ● | ● |
| 2-1-20-6 | ● | ○ | x | 2-1-20-19 | ● | ● | ● |
| 2-1-20-7 | ◉ | ○ | x | 2-1-20-20 | ● | ● | ● |
| 2-1-20-8 | ● | ○ | ○ | 2-1-20-21 | x | x | x |
| 2-1-20-9 | ● | ○ | ○ | 2-1-20-22 | x | x | x |
| 2-1-20-10 | ● | ○ | ○ | 2-1-20-23 | ○ | ○ | ○ |
| 2-1-20-11 | ○ | ○ | x | 2-1-20-24 | ◉ | ◉ | ◉ |
| 2-1-20-12 | ○ | ○ | x | 2-1-20-25 | ◉ | ◉ | ◉ |
| 2-1-20-13 | ◉ | ● | ● | | | | |

EXAMPLE 2-20

One part by weight of an pyrylium dye represented by the formula 2-1-5 was dissolved in 10 parts by weight of acetonitrile to provide a coating solution A2.

Separately, 1 part by weight of fine crystal powder of a diacetylene derivative compound represented by $C_{12}H_{25}-C\equiv C-C\equiv C-C_8H_{16}-COOH$ was added

EXAMPLE 2-21

According to the same procedure as in Example 2-20 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$ in the coating solution, B2, 25 kinds of recording media of samples 2-1-21-1 to 2-1-21-25 as shown in Table 2-5A were prepared.

The results are shown in Table 2-5B.

TABLE 2-5A

| Sample No. | Film thickness of layer containing DA compound (Å) | Film thickness of layer containing pyrylium dye (Å) | Sample No. | Film thickness of layer containing DA compound (Å) | Film thickness of layer containing pyrylium dye (Å) |
|---|---|---|---|---|---|
| 2-1-21-1 | 100 | 100 | 2-1-21-14 | 1000 | 3000 |
| 2-1-21-2 | 100 | 200 | 2-1-21-15 | 1000 | 6000 |
| 2-1-21-3 | 100 | 1000 | 2-1-21-16 | 3000 | 100 |
| 2-1-21-4 | 100 | 3000 | 2-1-21-17 | 3000 | 200 |
| 2-1-21-5 | 100 | 6000 | 2-1-21-18 | 3000 | 1000 |
| 2-1-21-6 | 200 | 100 | 2-1-21-19 | 3000 | 3000 |
| 2-1-21-7 | 200 | 200 | 2-1-21-20 | 3000 | 6000 |
| 2-1-21-8 | 200 | 1000 | 2-1-21-21 | 6000 | 100 |
| 2-1-21-9 | 200 | 3000 | 2-1-21-22 | 6000 | 200 |

TABLE 2-5A-continued

| Sample No. | Film thickness of layer containing DA compound (Å) | Film thickness of layer containing pyrylium dye (Å) | Sample No. | Film thickness of layer containing DA compound (Å) | Film thickness of layer containing pyrylium dye (Å) |
|---|---|---|---|---|---|
| 2-1-21-10 | 200 | 6000 | 2-1-21-23 | 6000 | 1000 |
| 2-1-21-11 | 1000 | 100 | 2-1-21-24 | 6000 | 3000 |
| 2-1-21-12 | 1000 | 200 | 2-1-21-25 | 6000 | 6000 |
| 2-1-21-13 | 1000 | 1000 | | | |

TABLE 2-5B

| Sample No. | Sensitivity | Image resolution | Contrast | Sample No. | Sensitivity | Image resolution | Contrast |
|---|---|---|---|---|---|---|---|
| 2-1-21-1 | ⊚ | o | x | 2-1-21-14 | ⊚ | ⊚ | ● |
| 2-1-21-2 | ⊚ | o | x | 2-1-21-15 | ⊚ | ⊚ | ● |
| 2-1-21-3 | ⊚ | o | x | 2-1-21-16 | x | x | x |
| 2-1-21-4 | ⊚ | o | x | 2-1-21-17 | o | o | o |
| 2-1-21-5 | ⊚ | o | x | 2-1-21-18 | ⊚ | ⊚ | ⊚ |
| 2-1-21-6 | ⊚ | o | x | 2-1-21-19 | ● | ⊚ | ● |
| 2-1-21-7 | ⊚ | o | x | 2-1-21-20 | ⊚ | ● | ⊚ |
| 2-1-21-8 | ⊚ | o | o | 2-1-21-21 | x | x | x |
| 2-1-21-9 | ⊚ | o | o | 2-1-21-22 | x | x | x |
| 2-1-21-10 | ⊚ | o | o | 2-1-21-23 | ⊚ | ⊚ | ⊚ |
| 2-1-21-11 | o | o | x | 2-1-21-24 | ⊚ | ⊚ | ⊚ |
| 2-1-21-12 | o | o | x | 2-1-21-25 | ⊚ | ⊚ | ⊚ |
| 2-1-21-13 | ● | ● | ⊚ | | | | |

EXAMPLE 2-22

According to the same procedure as in Example 2-21 except for using a thiopyrylium dye represented by the formula 2-1-1 in place of the pyrylium dye represented by the formula 2-1-5, 25 kinds of recording media of samples 2-1-22-1 to 2-1-22-25 as shown in Table 2-6A were prepared.

The results are shown in Table 2-6B.

EXAMPLE 2-23

According to the same procedure as in Example 2-21 except for using a selenapyrylium dye represented by the formula 2-1-6 in place of the pyrylium dye represented by the formula 2-1-5, 25 kinds of recording media

TABLE 2-6A

| Sample No. | Film thickness of layer containing DA compound (Å) | Film thickness of layer containing pyrylium dye (Å) | Sample No. | Film thickness of layer containing DA compound (Å) | Film thickness of layer containing pyrylium dye (Å) |
|---|---|---|---|---|---|
| 2-1-22-1 | 100 | 100 | 2-1-22-14 | 1000 | 3000 |
| 2-1-22-2 | 100 | 200 | 2-1-22-15 | 1000 | 6000 |
| 2-1-22-3 | 100 | 1000 | 2-1-22-16 | 3000 | 100 |
| 2-1-22-4 | 100 | 3000 | 2-1-22-17 | 3000 | 200 |
| 2-1-22-5 | 100 | 6000 | 2-1-22-18 | 3000 | 1000 |
| 2-1-22-6 | 200 | 100 | 2-1-22-19 | 3000 | 3000 |
| 2-1-22-7 | 200 | 200 | 2-1-22-20 | 3000 | 6000 |
| 2-1-22-8 | 200 | 1000 | 2-1-22-21 | 6000 | 100 |
| 2-1-22-9 | 200 | 3000 | 2-1-22-22 | 6000 | 200 |
| 2-1-22-10 | 200 | 6000 | 2-1-22-23 | 6000 | 1000 |
| 2-1-22-11 | 1000 | 100 | 2-1-22-24 | 6000 | 3000 |
| 2-1-22-12 | 1000 | 200 | 2-1-22-25 | 6000 | 6000 |
| 2-1-22-13 | 1000 | 1000 | | | |

TABLE 2-6B

| Sample No. | Sensitivity | Image resolution | Contrast | Sample No. | Sensitivity | Image resolution | Contrast |
|---|---|---|---|---|---|---|---|
| 2-1-22-1 | ● | ● | x | 2-1-22-14 | o | ⊚ | o |
| 2-1-22-2 | ● | ⊚ | x | 2-1-22-15 | ● | ⊚ | ⊚ |
| 2-1-22-3 | ● | ● | x | 2-1-22-16 | x | x | x |
| 2-1-22-4 | ● | ● | x | 2-1-22-17 | x | x | x |
| 2-1-22-5 | ● | ⊚ | x | 2-1-22-18 | o | o | o |
| 2-1-22-6 | ⊚ | ⊚ | x | 2-1-22-19 | ⊚ | ⊚ | ⊚ |
| 2-1-22-7 | ● | ⊚ | x | 2-1-22-20 | ⊚ | ⊚ | ⊚ |
| 2-1-22-8 | ⊚ | ⊚ | x | 2-1-22-21 | x | x | x |
| 2-1-22-9 | ● | ⊚ | x | 2-1-21-22 | x | x | x |
| 2-1-22-10 | ⊚ | ⊚ | x | 2-1-22-23 | o | o | o |
| 2-1-22-11 | o | o | x | 2-1-22-24 | o | o | o |
| 2-1-22-12 | o | o | x | 2-1-22-2 | ⊚ | ● | ⊚ |
| 2-1-22-13 | o | o | o | | | | | of samples 2-1-23-1 to 2-1-23-25 as shown in Table 2-7A were prepared.

The results are shown in Table 2-7B.

TABLE 2-7A

| Sample No. | Film thickness of layer containing DA compound (Å) | Film thickness of layer containing pyrylium dye (Å) | Sample No. | Film thickness of layer containing DA compound (Å) | Film thickness of layer containing pyrylium dye (Å) |
|---|---|---|---|---|---|
| 2-1-23-1 | 100 | 100 | 2-1-23-14 | 1000 | 3000 |
| 2-1-23-2 | 100 | 200 | 2-1-23-15 | 1000 | 6000 |
| 2-1-23-3 | 100 | 1000 | 2-1-23-16 | 3000 | 100 |
| 2-1-23-4 | 100 | 3000 | 2-1-23-17 | 3000 | 200 |
| 2-1-23-5 | 100 | 6000 | 2-1-23-18 | 3000 | 1000 |
| 2-1-23-6 | 200 | 100 | 2-1-23-19 | 3000 | 3000 |
| 2-1-23-7 | 200 | 200 | 2-1-23-20 | 3000 | 6000 |
| 2-1-23-8 | 200 | 1000 | 2-1-23-21 | 6000 | 100 |
| 2-1-23-9 | 200 | 3000 | 2-1-23-22 | 6000 | 200 |
| 2-1-23-10 | 200 | 6000 | 2-1-23-23 | 6000 | 1000 |
| 2-1-23-11 | 1000 | 100 | 2-1-23-24 | 6000 | 3000 |
| 2-1-23-12 | 1000 | 200 | 2-1-23-25 | 6000 | 6000 |
| 2-1-23-13 | 1000 | 1000 | | | |

TABLE 2-7B

| Sample No. | Sensitivity | Image resolution | Contrast | Sample No. | Sensitivity | Image resolution | Contrast |
|---|---|---|---|---|---|---|---|
| 2-1-23-1 | ⦿ | o | x | 2-1-23-14 | ● | ● | ⊚ |
| 2-1-23-2 | ● | o | x | 2-1-23-15 | ● | ● | ⊚ |
| 2-1-23-3 | ● | o | x | 2-1-23-16 | x | x | x |
| 2-1-23-4 | ● | o | x | 2-1-23-17 | x | x | x |
| 2-1-23-5 | ● | o | x | 2-1-23-18 | ⊚ | ⊚ | ⊚ |
| 2-1-23-6 | ⊚ | o | x | 2-1-23-19 | ⊚ | ⊚ | ⊚ |
| 2-1-23-7 | ● | o | x | 2-1-23-20 | ⊚ | ⊚ | ⊚ |
| 2-1-23-8 | ● | o | o | 2-1-23-21 | x | x | x |
| 2-1-23-9 | ● | o | o | 2-1-23-22 | x | x | x |
| 2-1-23-10 | ● | o | o | 2-1-23-23 | o | o | o |
| 2-1-23-11 | o | o | x | 2-1-23-24 | ● | ⊚ | ⊚ |
| 2-1-23-12 | o | o | x | 2-1-23-25 | ⊚ | ● | ⊚ |
| 2-1-23-13 | ● | ● | ⊚ | | | | |

EXAMPLE 3-1

One part by weight of fine crystalline powder of a diacetylene derivative represented by the formula $C_{12}H_{25}-C\equiv C-C\equiv C-C_8C_{16}-COOH$ and 15 parts by weight of the diene compound salt represented by the above formula 3-1-1 were added to 30 parts by weight of methylene chloride, followed by thorough stirring, to prepare a coating solution.

Following subsequently the same procedure as in Example 1-1, experiments were conducted to obtain the results shown in Table 3-1.

EXAMPLE 3-2

By use of a mixed solution containing 1 part by weight of the diacetylene derivative compound, 10 parts by weight of the diene compound salt and 21 parts by weight of methylene chloride as the coating solution, experiments were conducted according to the same method as in Example 3-1.

EXAMPLE 3-3

By use of a mixed solution containing 1 part by weight of the diacetylene derivative compound, 5 parts by weight of the diene compound salt and 12 parts by weight of methylene chloride as the coating solution, experiments were conducted according to the same method as in Example 3-1.

EXAMPLE 3-4

By use of a mixed solution containing 1 part by weight of the diacetylene derivative compound, 1 part by weight of the diene compound salt and 4 parts by weight of methylene chloride as the coating solution, experiments were conducted according to the same method as in Example 3-1.

EXAMPLE 3-5

By use of a mixed solution containing 5 parts by weight of the diacetylene derivative compound, 1 part by weight of the diene compound salt and 12 parts by weight of methylene chloride as the coating solution, experiments were conducted according to the same method as in Example 3-1.

EXAMPLE 3-6

By use of a mixed solution containing 10 parts by weight of the diacetylene derivative compound, 1 part by weight of the diene compound salt and 20 parts by weight of methylene chloride as the coating solution, experiments were conducted according to the same method as in Example 3-1.

EXAMPLE 3-7

By use of a mixed solution containing 15 parts by weight of the diacetylene derivative compound, 1 part by weight of the diene compound salt and 30 parts by weight of methylene chloride as the coating solution, experiments were conducted according to the same method as in Example 3-1.

The results of Examples 3-1 to 3-7 are shown in Table 3-1.

TABLE 3-1

| Optical recording medium | Film thickness | Sensitivity | Image resolution | Contrast |
|---|---|---|---|---|
| Example 3-1 | 500 Å | ◉ | ○ | x |
|  | 1000 Å | ◉ | ○ | x |
|  | 2000 Å | ◉ | ○ | ○ |
| Example 3-2 | 500 Å | ◉ | ○ | x |
|  | 1000 Å | ◉ | ○ | ○ |
|  | 2000 Å | ◉ | ○ | ○ |
| Example 3-3 | 500 Å | ◉ | ◉ | x |
|  | 1000 Å | ◉ | ● | ● |
|  | 2000 Å | ◉ | ● | ● |
| Example 3-4 | 500 Å | ◉ | ◉ | ○ |
|  | 1000 Å | ◉ | ● | ● |
|  | 2000 Å | ◉ | ● | ● |
| Example 3-5 | 500 Å | ○ | ○ | ● |
|  | 1000 Å | ◉ | ◉ | ● |
|  | 2000 Å | ◉ | ◉ | ● |
| Example 3-6 | 500 Å | x | x | x |
|  | 1000 Å | ○ | ○ | x |
|  | 2000 Å | ○ | ○ | ○ |
| Example 3-7 | 500 Å | x | x | x |
|  | 1000 Å | x | x | x |
|  | 2000 Å | ○ | ○ | x |

EXAMPLES 3-8 TO 3-14

As for the steps of optical recording and visualization of negative images, Examples 3-1 to 3-7 were repeated, and thereafter, each of the recording media was heated to about 80° C. to obtain the negative images in which the blue color of the back ground was changed to red color. For these negative images, evaluation was performed according to the same standards as in Example 3-1 to obtain the results shown in Table 3-2.

TABLE 3-2

| Optical recording medium | Film thickness | Sensitivity | Image resolution | Contrast |
|---|---|---|---|---|
| Example 3-8 | 500 Å | ● | ○ | x |
|  | 1000 Å | ● | ○ | x |
|  | 2000 Å | ● | ○ | ○ |
| Example 3-9 | 500 Å | ● | ○ | x |
|  | 1000 Å | ● | ○ | ○ |
|  | 2000 Å | ● | ○ | ○ |
| Example 3-10 | 500 Å | ◉ | ● | x |
|  | 1000 Å | ◉ | ● | ● |
|  | 2000 Å | ◉ | ● | ● |
| Example 3-11 | 500 Å | ◉ | ● | ○ |
|  | 1000 Å | ◉ | ● | ● |
|  | 2000 Å | ◉ | ● | ● |
| Example 3-12 | 500 Å | ○ | ○ | ● |
|  | 1000 Å | ● | ● | ● |
|  | 2000 Å | ● | ● | ● |
| Example 3-13 | 500 Å | x | x | x |
|  | 1000 Å | ○ | ○ | x |
|  | 2000 Å | ○ | ○ | ○ |
| Example 3-14 | 500 Å | x | x | x |
|  | 1000 Å | x | x | x |
|  | 2000 Å | ○ | ○ | x |

EXAMPLE 3-15

Experiments were conducted according to the same procedure as in Example 3-4 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$. The results are shown in Table 3-3.

EXAMPLE 3-16 TO 3-20

According to the same procedure as in Example 3-15 except for using the diene compound salt represented by the formulae 3-1-3, 3-1-8, 3-1-12, 3-1-15 and 3-1-20, respectively, in place of the diene compound salt used in Example 3-15, experiments were conducted in the same manner. The results are shown in Table 3-3.

TABLE 3-3

| Optical recording medium | Film thickness | Sensitivity | Image resolution | Contrast |
|---|---|---|---|---|
| Example 3-15 | 500 Å | ● | ◉ | ○ |
|  | 1000 Å | ● | ◉ | ◉ |
|  | 2000 Å | ● | ◉ | ◉ |
| Example 3-16 | 500 Å | ◉ | ◉ | ○ |
|  | 1000 Å | ◉ | ◉ | ◉ |
|  | 2000 Å | ◉ | ◉ | ◉ |
| Example 3-17 | 500 Å | ● | ○ | ○ |
|  | 1000 Å | ◉ | ○ | ○ |
|  | 2000 Å | ◉ | ○ | ◉ |
| Example 3-18 | 500 Å | ◉ | ○ | ○ |
|  | 1000 Å | ◉ | ○ | ○ |
|  | 2000 Å | ◉ | ◉ | ◉ |
| Example 3-19 | 500 Å | ◉ | ◉ | ○ |
|  | 1000 Å | ◉ | ◉ | ◉ |
|  | 2000 Å | ◉ | ◉ | ◉ |
| Example 3-20 | 500 Å | ◉ | ◉ | ○ |
|  | 1000 Å | ◉ | ● | ● |
|  | 2000 Å | ◉ | ◉ | ● |

EXAMPLE 3-21

One part by weight of a diene compound salt represented by the formula 3-1-5 was dissolved in 5 parts by weight of ethyl acetate to provide a coating solution A3.

Separately, 1 part by weight of fine crystal powder of a diacetylene derivative compound represented by $C_{12}H_{25}-C\equiv C-C\equiv C-C_8H_{16}-COOH$ was added into 10 parts by weight of benzene and stirred thoroughly to provide a coating solution B3.

By use of the coating solutions A3 and B3 in place of A1 and B1 in Example 1-20, respectively, experiments were conducted in the same manner as in Example 1-20.

However, by varying the film thicknesses of the layer containing the diene compound salt and of the layer containing the DA compound variously, 25 kinds of recording media of samples 3-1-21-1 to 3-1-21-25 were used.

The results are shown in Table 3-4B.

TABLE 3-4A

| Sample No. | Film thickness of layer containing DA compound (Å) | Film thickness of layer containing diene compound salt (Å) | Sample No. | Film thickness of layer containing DA compound (Å) | Film thickness of layer containing diene compound salt (Å) |
|---|---|---|---|---|---|
| 3-1-21-1 | 100 | 100 | 3-1-21-14 | 1000 | 3000 |
| 3-1-21-2 | 100 | 200 | 3-1-21-15 | 1000 | 6000 |
| 3-1-21-3 | 100 | 1000 | 3-1-21-16 | 3000 | 100 |
| 3-1-21-4 | 100 | 3000 | 3-1-21-17 | 3000 | 200 |
| 3-1-21-5 | 100 | 6000 | 3-1-21-18 | 3000 | 1000 |

TABLE 3-4A-continued

| Sample No. | Film thickness of layer containing DA compound (Å) | Film thickness of layer containing diene compound salt (Å) | Sample No. | Film thickness of layer containing DA compound (Å) | Film thickness of layer containing diene compound salt (Å) |
|---|---|---|---|---|---|
| 3-1-21-6 | 200 | 100 | 3-1-21-19 | 3000 | 3000 |
| 3-1-21-7 | 200 | 200 | 3-1-21-20 | 3000 | 6000 |
| 3-1-21-8 | 200 | 1000 | 3-1-21-21 | 6000 | 100 |
| 3-1-21-9 | 200 | 3000 | 3-1-21-22 | 6000 | 200 |
| 3-1-21-10 | 200 | 6000 | 3-1-21-23 | 6000 | 1000 |
| 3-1-21-11 | 1000 | 100 | 3-1-21-24 | 6000 | 3000 |
| 3-1-21-12 | 1000 | 200 | 3-1-21-25 | 6000 | 6000 |
| 3-1-21-13 | 1000 | 1000 | | | |

TABLE 3-4B

| Sample No. | Sensitivity | Image resolution | Contrast | Sample No. | Sensitivity | Image resolution | Contrast |
|---|---|---|---|---|---|---|---|
| 3-1-21-1 | ● | ⊚ | x | 3-1-21-14 | ⊚ | ● | ● |
| 3-1-21-2 | ● | ● | x | 3-1-21-15 | ⊚ | ● | ● |
| 3-1-21-3 | ● | ⊚ | x | 3-1-21-16 | x | x | x |
| 3-1-21-4 | x | x | x | 3-1-21-17 | ● | ● | ⊚ |
| 3-1-21-5 | x | x | x | 3-1-21-18 | ● | ● | ⊚ |
| 3-1-21-6 | ● | ● | x | 3-1-21-19 | ● | ● | ⊚ |
| 3-1-21-7 | ● | ● | x | 3-1-21-20 | ⊚ | ● | ⊚ |
| 3-1-21-8 | ⊚ | ● | x | 3-1-21-21 | x | x | x |
| 3-1-21-9 | o | o | x | 3-1-21-22 | x | x | x |
| 3-1-21-10 | x | x | x | 3-1-21-23 | o | o | o |
| 3-1-21-11 | o | o | o | 3-1-21-24 | ⊚ | ● | ● |
| 3-1-21-12 | o | o | o | 3-1-21-25 | ● | ⊚ | ⊚ |
| 3-1-21-13 | ● | ⊚ | | | | | |

EXAMPLE 3-22

According to the same procedure as in Example 3-20 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$ in the coating solution B2, 25 kinds of recording media of samples 3-1-22-1 to 3-1-22-25 as shown in Table 3-5A were used to carry out the experiments.

The results are shown in Table 3-5B.

TABLE 3-5A

| Sample No. | Film thickness of layer containing DA compound (Å) | Film thickness of layer containing diene compound salt (Å) | Sample No. | Film thickness of layer containing DA compound (Å) | Film thickness of layer containing diene compound salt (Å) |
|---|---|---|---|---|---|
| 3-1-22-1 | 100 | 100 | 3-1-22-14 | 1000 | 3000 |
| 3-1-22-2 | 100 | 200 | 3-1-22-15 | 1000 | 6000 |
| 3-1-22-3 | 100 | 1000 | 3-1-22-16 | 3000 | 100 |
| 3-1-22-4 | 100 | 3000 | 3-1-22-17 | 3000 | 200 |
| 3-1-22-5 | 100 | 6000 | 3-1-22-18 | 3000 | 1000 |
| 3-1-22-6 | 200 | 100 | 3-1-22-19 | 3000 | 3000 |
| 3-1-22-7 | 200 | 200 | 3-1-22-20 | 3000 | 6000 |
| 3-1-22-8 | 200 | 1000 | 3-1-22-21 | 6000 | 100 |
| 3-1-22-9 | 200 | 3000 | 3-1-22-22 | 6000 | 200 |
| 3-1-22-10 | 200 | 6000 | 3-1-22-23 | 6000 | 1000 |
| 3-1-22-11 | 1000 | 100 | 3-1-22-24 | 6000 | 3000 |
| 3-1-22-12 | 1000 | 200 | 3-1-22-25 | 6000 | 6000 |
| 3-1-22-13 | 1000 | 1000 | | | |

TABLE 3-5B

| Sample No. | Sensitivity | Image resolution | Contrast | Sample No. | Sensitivity | Image resolution | Contrast |
|---|---|---|---|---|---|---|---|
| 3-1-22-1 | ⊚ | ⊚ | x | 3-1-22-14 | ⊚ | ⊚ | ● |
| 3-1-22-2 | ⊚ | ● | x | 3-1-22-15 | ⊚ | ⊚ | ⊚ |
| 3-1-22-3 | ⊚ | ⊚ | x | 3-1-22-16 | o | o | o |
| 3-1-22-4 | x | x | x | 3-1-22-17 | ⊚ | ⊚ | ⊚ |
| 3-1-22-5 | x | x | x | 3-1-22-18 | ⊚ | ⊚ | ● |
| 3-1-22-6 | ⊚ | ⊚ | x | 3-1-22-19 | ⊚ | ⊚ | ⊚ |
| 3-1-22-7 | ● | ● | x | 3-1-22-20 | ⊚ | ⊚ | ⊚ |
| 3-1-22-8 | ● | ⊚ | x | 3-1-22-21 | x | x | x |
| 3-1-22-9 | ⊚ | o | x | 3-1-22-22 | x | x | x |
| 3-1-22-10 | o | o | x | 3-1-22-23 | o | o | o |
| 3-1-22-11 | o | o | o | 3-1-22-24 | ● | ⊚ | ● |
| 3-1-22-12 | o | o | o | 3-1-22-25 | ● | ● | ● |

TABLE 3-5B-continued

| Sample No. | Sensitivity | Image resolution | Contrast | Sample No. | Sensitivity | Image resolution | Contrast |
|---|---|---|---|---|---|---|---|
| 3-1-22-13 | | | | | | | |

EXAMPLE 3-23

According to the same procedure as in Example 3-22 except for using a diene compound salt represented by the formula 3-1-5 in place of the diene compound salt represented by the formula 3-1-1, 25 kinds of recording media of samples 3-1-23-1 to 3-1-23-25 as shown in Table 3-6A were prepared.

The results are shown in Table 3-6B.

EXAMPLE 3-24

According to the same procedure as in Example 3-22 except for using a diene compound salt represented by the formula 3-1-10 in place of the diene compound salt represented by the formula 3-1-1, 25 kinds of recording media of samples 3-1-24-1 to 3-1-24-25 as shown in Table 3-7A were prepared.

The results are shown in Table 3-7B.

TABLE 3-6A

| Sample No. | Film thickness of layer containing DA compound (Å) | Film thickness of layer containing diene compound salt (Å) | Sample No. | Film thickness of layer containing DA compound (Å) | Film thickness of layer containing diene compound salt (Å) |
|---|---|---|---|---|---|
| 3-1-23-1 | 100 | 100 | 3-1-23-14 | 1000 | 3000 |
| 3-1-23-2 | 100 | 200 | 3-1-23-15 | 1000 | 6000 |
| 3-1-23-3 | 100 | 1000 | 3-1-23-16 | 3000 | 100 |
| 3-1-23-4 | 100 | 3000 | 3-1-23-17 | 3000 | 200 |
| 3-1-23-5 | 100 | 6000 | 3-1-23-18 | 3000 | 1000 |
| 3-1-23-6 | 200 | 100 | 3-1-23-19 | 3000 | 3000 |
| 3-1-23-7 | 200 | 200 | 3-1-23-20 | 3000 | 6000 |
| 3-1-23-8 | 200 | 1000 | 3-1-23-21 | 6000 | 100 |
| 3-1-23-9 | 200 | 3000 | 3-1-23-22 | 6000 | 200 |
| 3-1-23-10 | 200 | 6000 | 3-1-23-23 | 6000 | 1000 |
| 3-1-23-11 | 1000 | 100 | 3-1-23-24 | 6000 | 3000 |
| 3-1-23-12 | 1000 | 200 | 3-1-23-25 | 6000 | 6000 |
| 3-1-23-13 | 1000 | 1000 | | | |

TABLE 3-6B

| Sample No. | Sensitivity | Image resolution | Contrast | Sample No. | Sensitivity | Image resolution | Contrast |
|---|---|---|---|---|---|---|---|
| 3-1-23-1 | ◉ | ◉ | x | 3-1-23-14 | ◉ | ◉ | ◉ |
| 3-1-23-2 | ◉ | ◉ | x | 3-1-23-15 | ◉ | ◉ | ◉ |
| 3-1-23-3 | ◉ | ◉ | x | 3-1-23-16 | x | x | x |
| 3-1-23-4 | x | x | x | 3-1-23-17 | ◉ | ◉ | ◉ |
| 3-1-23-5 | x | x | x | 3-1-23-18 | ◉ | ◉ | ◉ |
| 3-1-23-6 | o | o | x | 3-1-23-19 | ◉ | ◉ | ◉ |
| 3-1-23-7 | x | x | x | 3-1-23-20 | ◉ | ◉ | ◉ |
| 3-1-23-8 | ◉ | ◉ | x | 3-1-23-21 | x | x | x |
| 3-1-23-9 | o | o | x | 3-1-23-22 | x | x | x |
| 3-1-23-10 | x | x | x | 3-1-23-23 | o | o | o |
| 3-1-23-11 | o | o | o | 3-1-23-24 | ● | ● | ● |
| 3-1-23-12 | o | o | o | 3-1-23-25 | ● | ● | ● |
| 3-1-23-13 | ◉ | ◉ | ◉ | | | | |

TABLE 3-7A

| Sample | Film thickness layer compound (Å) | Film thickness of layer containing pound salt (Å) | Sample No. | Film thickness containing DA compound (Å) | Film thickness of layer diene compound salt (Å) |
|---|---|---|---|---|---|
| 3-1-24-1 | 100 | 100 | 3-1-24-14 | 1000 | 3000 |
| 3-1-24-2 | 100 | 200 | 3-1-24-15 | 1000 | 6000 |
| 3-1-24-3 | 100 | 1000 | 3-1-24-16 | 3000 | 100 |
| 3-1-24-4 | 100 | 3000 | 3-1-24-17 | 3000 | 200 |
| 3-1-23-5 | 100 | 6000 | 3-1-24-18 | 3000 | 1000 |
| 3-1-24-6 | 200 | 100 | 3-1-24-19 | 3000 | 3000 |
| 3-1-24-7 | 200 | 200 | 3-1-24-20 | 3000 | 6000 |
| 3-1-24-8 | 200 | 1000 | 3-1-24-21 | 6000 | 100 |
| 3-1-24-9 | 200 | 3000 | 3-1-24-22 | 6000 | 200 |
| 3-1-24-10 | 200 | 6000 | 3-1-24-23 | 6000 | 1000 |
| 3-1-24-11 | 1000 | 100 | 3-1-24-24 | 6000 | 3000 |
| 3-1-24-12 | 1000 | 200 | 3-1-24-25 | 6000 | 6000 |
| 3-1-24-13 | 1000 | 1000 | | | |

TABLE 3-7B

| Sample No. | Sensitivity | Image resolution | Contrast | Sample No. | Sensitivity | Image resolution | Contrast |
|---|---|---|---|---|---|---|---|
| 3-1-24-1 | ● | o | x | 3-1-24-14 | ● | ● | ● |
| 3-1-24-2 | ● | o | x | 3-1-24-15 | ● | ● | ◉ |
| 3-1-24-3 | ● | o | x | 3-1-24-16 | o | o | o |
| 3-1-24-4 | x | x | x | 3-1-24-17 | ● | ◉ | ◉ |
| 3-1-24-5 | x | x | x | 3-1-24-18 | ◉ | ◉ | ◉ |
| 3-1-24-6 | ● | o | x | 3-1-23-19 | ● | ◉ | ◉ |
| 3-1-24-7 | ● | o | x | 3-1-24-20 | ◉ | ◉ | ◉ |
| 3-1-24-8 | ◉ | o | x | 3-1-24-21 | x | x | x |
| 3-1-24-9 | o | o | x | 3-1-24-22 | x | x | x |
| 3-1-24-10 | o | o | x | 3-1-24-23 | o | o | o |
| 3-1-24-11 | o | o | o | 3-1-24-24 | ◉ | ● | ◉ |
| 3-1-24-12 | o | o | o | 3-1-24-25 | ● | ◉ | ● |
| 3-1-24-13 | ◉ | ◉ | ● | | | | |

EXAMPLE 4-1

One part by weight of fine crystalline powder of a diacetylene derivative represented by the formula $C_{12}H_{25}-C\equiv C-C\equiv C-C_8C_{16}-COOH$ and 15 parts by weight of the croconic methine dye represented by the above formula 4-1-25 were added to 30 parts by weight of methylene chloride, followed by thorough stirring, to prepare a coating solution.

Following subsequently the same procedure as in Example 1-1, experiments were conducted.

EXAMPLE 4-2

By use of a mixed solution containing 1 part by weight of the diacetylene derivative compound, 10 parts by weight of the croconic methine dye and 20 parts by weight of methylene chloride as the coating solution, experiments were conducted according to the same method as in Example 4-1.

EXAMPLE 4-3

By use of a mixed solution containing 1 part by weight of the diacetylene derivative compound, 5 parts by weight of the croconic methine dye and 12 parts by weight of methylene chloride as the coating solution, experiments were conducted according to the same method as in Example 4-1.

EXAMPLE 4-4

By use of a mixed solution containing 1 part by weight of the diacetylene derivative compound, 1 part by weight of the croconic methine dye and 4 parts by weight of methylene chloride as the coating solution, experiments were conducted according to the same method as in Example 4-1.

EXAMPLE 4-5

By use of a mixed solution containing 5 parts by weight of the diacetylene derivative compound, 1 part by weight of the croconic methine dye and 12 parts by weight of methylene chloride as the coating solution, experiments were conducted according to the same method as in Example 4-1.

EXAMPLE 4-6

By use of a mixed solution containing 10 parts by weight of the diacetylene derivative compound, 1 part by weight of the croconic methine dye and 20 parts by weight of methylene chloride as the coating solution, experiments were conducted according to the same method as in Example 4-1.

EXAMPLE 4-7

By use of a mixed solution containing 15 parts by weight of the diacetylene derivative compound, 1 part weight of the croconic methine dye and 30 parts by weight of methylene chloride as the coating solution, experiments were conducted according to the same method as in Example 401.

The results of Examples 4-1 to 4-7 are shown in Table 4-1.

TABLE 4-1

| Optical recording medium | Film thickness | Sensitivity | Image resolution | Contrast |
|---|---|---|---|---|
| Example 4-1 | 500 Å | ● | o | x |
| | 1000 Å | ◉ | o | x |
| | 2000 Å | ● | x | x |
| Example 4-2 | 500 Å | ● | o | x |
| | 1000 Å | ● | o | x |
| | 2000 Å | ● | o | x |
| Example 4-3 | 500 Å | ● | ◉ | x |
| | 1000 Å | ● | ◉ | o |
| | 2000 Å | ● | ◉ | ◉ |
| Example 4-4 | 500 Å | ◉ | ● | o |
| | 1000 Å | ● | ● | ◉ |
| | 2000 Å | ◉ | ◉ | ◉ |
| Example 4-5 | 500 Å | ● | ● | ◉ |
| | 1000 Å | ● | ◉ | ◉ |
| | 2000 Å | ● | ◉ | ◉ |
| Example 4-6 | 500 Å | x | x | x |
| | 1000 Å | o | o | o |
| | 2000 Å | o | o | o |
| Example 4-7 | 500 Å | x | x | x |
| | 1000 Å | x | x | x |
| | 2000 Å | o | o | o |

EXAMPLES 4-8 TO 4-14

As for the steps of optical recording and visualization of negative images, Examples 4-1 to 4-7 were repeated, and thereafter, each of the recording media was heated to about 80° C. to obtain the negative images in which the blue color of the back ground was changed to red color. For these negative images, evaluation was performed according to the same standards as in Example 4-1 to obtain the results shown in Table 4-2.

TABLE 4-2

| Optical recording medium | Film thickness | Sensitivity | Image resolution | Contrast |
|---|---|---|---|---|
| Example 4-8 | 500 Å | ◉ | o | x |
| | 1000 Å | ◉ | o | x |
| | 2000 Å | ◉ | x | x |
| Example 4-9 | 500 Å | ◉ | o | x |
| | 1000 Å | ● | o | x |
| | 2000 Å | ● | o | x |

TABLE 4-2-continued

| Optical recording medium | Film thickness | Sensitivity | Image resolution | Contrast |
|---|---|---|---|---|
| Example 4-10 | 500 Å | ⊚ | ⊚ | x |
|  | 1000 Å | ⊚ | ⊚ | ○ |
|  | 2000 Å | ⊚ | ⊚ | ⊚ |
| Example 4-11 | 500 Å | ⊚ | ⊚ | ○ |
|  | 1000 Å | ⊚ | ⊚ | ● |
|  | 2000 Å | ⊚ | ⊚ | ● |
| Example 4-12 | 500 Å | ⊚ | ⊚ | ⊚ |
|  | 1000 Å | ⊚ | ⊚ | ⊚ |
|  | 2000 Å | ⊚ | ⊚ | ⊚ |
| Example 4-13 | 500 Å | x | x | x |
|  | 1000 Å | ○ | ○ | ○ |
|  | 2000 Å | ○ | ○ | ○ |
| Example 4-14 | 500 Å | x | x | x |
|  | 1000 Å | x | x | x |
|  | 2000 Å | ○ | ○ | ○ |

TABLE 4-3

| Optical recording medium | Film thickness | Sensitivity | Image resolution | Contrast |
|---|---|---|---|---|
| Example 4-15 | 500 Å | ○ | ○ | ○ |
|  | 1000 Å | ○ | ○ | ○ |
|  | 2000 Å | ⊚ | ⊚ | ⊚ |
| Example 4-16 | 500 Å | ● | ○ | ○ |
|  | 1000 Å | ⊚ | ⊚ | ⊚ |
|  | 2000 Å | ⊚ | ⊚ | ⊚ |
| Example 4-17 | 500 Å | ⊚ | ● | ○ |
|  | 1000 Å | ● | ⊚ | ● |
|  | 2000 Å | ⊚ | ● | ● |
| Example 4-18 | 500 Å | ● | ⊚ | ○ |
|  | 1000 Å | ⊚ | ● | ● |
|  | 2000 Å | ⊚ | ⊚ | ● |
| Example 4-19 | 500 Å | ⊚ | ⊚ | ○ |
|  | 1000 Å | ⊚ | ⊚ | ⊚ |
|  | 2000 Å | ⊚ | ● | ⊚ |

EXAMPLE 4-15

Experiments were conducted according to the same procedure as in Example 4-4 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$. The results are shown in Table 4-3.

EXAMPLES 4-16 TO 4-19

According to the same procedure as in Example 4'-15 except for using the croconic methine dye represented by the formulae 4-1-2, 4-1-29, 4-1-37 and 4-1-42, respectively, in place of the croconic methine dye used in Example 4-15, experiments were conducted in the same manner. The results are shown in Table 4-3.

EXAMPLE 4-20

One part by weight of a croconic methine dye represented by the formula 4-1-5 was dissolved in 10 parts by weight of acetonitrile to produce a coating solution A4.

Separately, 1 part by weight of fine crystal powder of a diacetylene derivative compound represented by $C_{12}H_{25}-C\equiv C-C\equiv C-C_8H_{16}-COOH$ was added into 10 parts by weight of benzene and stirred thoroughly to provide a coating solution B4.

By use of the coating solutions A4 and B4 in place of A1 and B1 in Example 1-20, respectively, experiments were conducted in the same manner as in Example 1-20.

However, by varying the film thicknesses of the layer containing the croconic methine dye and of the layer containing the DA compound variously, 25 kinds of recording media of samples 4-1-20-1 to 4-1-20-25 were used.

The results are shown in Table 4-4B.

TABLE 4-4A

| Sample No. | Film thickness of layer containing DA compound (Å) | Film thickness of layer containing croconic methine dye (Å) | Sample No. | Film thickness of layer containing DA compound (Å) | Film thickness of layer containing croconic methine dye (Å) |
|---|---|---|---|---|---|
| 4-1-20-1 | 100 | 100 | 4-1-20-14 | 1000 | 3000 |
| 4-1-20-2 | 100 | 200 | 4-1-20-15 | 1000 | 6000 |
| 4-1-20-3 | 100 | 1000 | 4-1-20-16 | 3000 | 100 |
| 4-1-20-4 | 100 | 3000 | 4-1-20-17 | 3000 | 200 |
| 4-1-20-5 | 100 | 6000 | 4-1-20-18 | 3000 | 1000 |
| 4-1-20-6 | 200 | 100 | 4-1-20-19 | 3000 | 3000 |
| 4-1-20-7 | 200 | 200 | 4-1-20-20 | 3000 | 6000 |
| 4-1-20-8 | 200 | 1000 | 4-1-20-21 | 6000 | 100 |
| 4-1-20-9 | 200 | 3000 | 4-1-20-22 | 6000 | 200 |
| 4-1-20-10 | 200 | 6000 | 4-1-20-23 | 6000 | 1000 |
| 4-1-20-11 | 1000 | 100 | 4-1-20-24 | 6000 | 3000 |
| 4-1-20-12 | 1000 | 200 | 4-1-20-25 | 6000 | 6000 |
| 4-1-20-13 | 1000 | 1000 |  |  |  |

TABLE 4-4B

| Sample No. | Sensitivity | Image resolution | Contrast | Sample No. | Sensitivity | Image resolution | Contrast |
|---|---|---|---|---|---|---|---|
| 4-1-20-1 | ● | ○ | x | 4-1-20-14 | ⊚ | ⊚ | ⊚ |
| 4-1-20-2 | ⊚ | ○ | x | 4-1-20-15 | ⊚ | ⊚ | ⊚ |
| 4-1-20-3 | ● | ○ | x | 4-1-20-16 | x | x | x |
| 4-1-20-4 | ● | ○ | x | 4-1-20-17 | x | x | x |
| 4-1-20-5 | ● | ○ | x | 4-1-20-18 | ⊚ | ⊚ | ⊚ |
| 4-1-20-6 | ⊚ | ○ | x | 4-1-20-19 | ⊚ | ⊚ | ⊚ |
| 4-1-20-7 | ● | ○ | x | 4-1-20-20 | ⊚ | ⊚ | ⊚ |
| 4-1-20-8 | ● | ○ | ○ | 4-1-20-21 | x | x | x |
| 4-1-20-9 | ● | ○ | ○ | 4-1-20-22 | x | x | x |
| 4-1-20-10 | ⊚ | ○ | ○ | 4-1-20-23 | ○ | ○ | ○ |
| 4-1-20-11 | ○ | ○ | x | 4-1-20-24 | ⊚ | ⊚ | ⊚ |

TABLE 4-4B-continued

| Sample No. | Sensitivity | Image resolution | Contrast | Sample No. | Sensitivity | Image resolution | Contrast |
|---|---|---|---|---|---|---|---|
| 4-1-20-12 | o | o | x | 4-1-20-25 | ◉ | ◉ | ◉ |
| 4-1-20-13 | o | o | o | | ◉ | ◉ | ◉ |

EXAMPLE 4-21

According to the same procedure as in Example 4-20 except for using a diacetylene derivative compound represented by $C_8H_{17}$—C≡C—C≡C—$C_2H_4$—COOH in place of the diacetylene derivative compound represented by $C_{12}H_{25}$—C≡C—C≡C—$C_8H_{16}$—COOH in the coating solution B4, 25 kinds of recording media of samples 4-1-22-1 to 4-1-22-25 as shown in Table 4-5A were used to carry out the experiments.

The results are shown in Table 4-5B.

EXAMPLE 4-22

According to the same procedure as in Example 4-21 except for using a croconic methine dye represented by the formula 4-1-6 in place of the croconic methine dye represented by the formula 4-1-25 in the coating liquid A4, 25 kinds of recording media of samples 4-1-22-1 to 4-1-22-25 as shown in Table 4-6A were prepared.

The results are shown in Table 4-6B.

TABLE 4-5A

| Sample No. | Film thickness of layer containing DA compound (Å) | Film thickness of layer containing croconic methine dye (Å) | Sample No. | Film thickness of layer containing DA compound (Å) | Film thickness of layer containing croconic methine dye (Å) |
|---|---|---|---|---|---|
| 4-1-21-1 | 100 | 100 | 4-1-21-14 | 1000 | 3000 |
| 4-1-21-2 | 100 | 200 | 4-1-21-15 | 1000 | 6000 |
| 4-1-21-3 | 100 | 1000 | 4-1-21-16 | 3000 | 100 |
| 4-1-21-4 | 100 | 3000 | 4-1-21-17 | 3000 | 200 |
| 4-1-21-5 | 100 | 6000 | 4-1-21-18 | 3000 | 1000 |
| 4-1-21-6 | 200 | 100 | 4-1-21-19 | 3000 | 3000 |
| 4-1-21-7 | 200 | 200 | 4-1-21-20 | 3000 | 6000 |
| 4-1-21-8 | 200 | 1000 | 4-1-21-21 | 6000 | 100 |
| 4-1-21-9 | 200 | 3000 | 4-1-21-22 | 6000 | 200 |
| 4-1-21-10 | 200 | 6000 | 4-1-21-23 | 6000 | 1000 |
| 4-1-21-11 | 1000 | 100 | 4-1-21-24 | 6000 | 3000 |
| 4-1-21-12 | 1000 | 200 | 4-1-21-25 | 6000 | 6000 |
| 4-1-21-13 | 1000 | 1000 | | | |

TABLE 4-5B

| Sample No. | Sensitivity | Image resolution | Contrast | Sample No. | Sensitivity | Image resolution | Contrast |
|---|---|---|---|---|---|---|---|
| 4-1-21-1 | ◉ | ◉ | x | 4-1-21-14 | o | ◉ | o |
| 4-1-21-2 | ◉ | ◉ | x | 4-1-21-15 | ◉ | ◉ | ◉ |
| 4-1-21-3 | ◉ | ◉ | x | 4-1-21-16 | x | x | x |
| 4-1-21-4 | ◉ | ◉ | x | 4-1-21-17 | x | x | x |
| 4-1-21-5 | ◉ | ◉ | x | 4-1-21-18 | o | o | o |
| 4-1-21-6 | ◉ | ◉ | x | 4-1-21-19 | ● | ● | ◉ |
| 4-1-21-7 | ◉ | ◉ | x | 4-1-21-20 | ● | ● | ◉ |
| 4-1-21-8 | ◉ | ◉ | x | 4-1-21-21 | x | x | x |
| 4-1-21-9 | ◉ | ◉ | x | 4-1-21-22 | x | x | x |
| 4-1-21-10 | ◉ | ◉ | x | 4-1-21-23 | o | o | o |
| 4-1-21-11 | o | o | x | 4-1-21-24 | o | o | o |
| 4-1-21-12 | o | o | x | 4-1-21-25 | ● | ◉ | ◉ |
| 4-1-21-13 | ◉ | ◉ | ◉ | | | | |

TABLE 4-6A

| Sample No. | Film thickness of layer containing DA compound (Å) | Film thickness of layer containing croconic methine dye (Å) | Sample No. | Film thickness of layer containing DA compound (Å) | Film thickness of layer containing croconic methine dye (Å) |
|---|---|---|---|---|---|
| 4-1-22-1 | 100 | 100 | 4-1-22-14 | 1000 | 3000 |
| 4-1-22-2 | 100 | 200 | 4-1-22-15 | 1000 | 6000 |
| 4-1-22-3 | 100 | 1000 | 4-1-22-16 | 3000 | 100 |
| 4-1-22-4 | 100 | 3000 | 4-1-22-17 | 3000 | 200 |
| 4-1-22-5 | 100 | 6000 | 4-1-22-18 | 3000 | 1000 |
| 4-1-22-6 | 200 | 100 | 4-1-22-19 | 3000 | 3000 |
| 4-1-22-7 | 200 | 200 | 4-1-22-20 | 3000 | 6000 |
| 4-1-22-8 | 200 | 1000 | 4-1-22-21 | 6000 | 100 |
| 4-1-22-9 | 200 | 3000 | 4-1-22-22 | 6000 | 200 |
| 4-1-22-10 | 200 | 6000 | 4-1-22-23 | 6000 | 1000 |
| 4-1-22-11 | 1000 | 100 | 4-1-22-24 | 6000 | 3000 |
| 4-1-22-12 | 1000 | 200 | 4-1-22-25 | 6000 | 6000 |

TABLE 4-6A-continued

| Sample No. | Film thickness of layer containing DA compound (Å) | Film thickness of layer containing croconic methine dye (Å) | Sample No. | Film thickness of layer containing DA compound (Å) | Film thickness of layer containing croconic methine dye (Å) |
|---|---|---|---|---|---|
| 4-1-22-13 | 1000 | 1000 | | | |

TABLE 4-6B

| Sample No. | Sensitivity | Image resolution | Contrast | Sample No. | Sensitivity | Image resolution | Contrast |
|---|---|---|---|---|---|---|---|
| 4-1-22-1 | ⊚ | o | x | 4-1-22-14 | ⊚ | ⊚ | ⊚ |
| 4-1-22-2 | ⊚ | o | x | 4-1-22-15 | ⊚ | ⊚ | ⊚ |
| 4-1-22-3 | ⊚ | o | x | 4-1-22-16 | x | x | x |
| 4-1-22-4 | ⊚ | o | x | 4-1-22-17 | x | x | x |
| 4-1-22-5 | ⊚ | o | x | 4-1-22-18 | ⊚ | ⊚ | ⊚ |
| 4-1-22-6 | ⊚ | o | x | 4-1-22-19 | ⊚ | ⊚ | ⊚ |
| 4-1-22-7 | ⊚ | o | x | 4-1-22-20 | ⊚ | ⊚ | ⊚ |
| 4-1-22-8 | ⊚ | ⊚ | x | 4-1-22-21 | x | x | x |
| 4-1-22-9 | ⊚ | ⊚ | x | 4-1-22-22 | x | x | x |
| 4-1-22-10 | ⊚ | ⊚ | x | 4-1-22-23 | o | o | o |
| 4-1-22-11 | o | o | x | 4-1-22-24 | ⊚ | ⊚ | ⊚ |
| 4-1-22-12 | o | o | x | 4-1-22-25 | ⊚ | ⊚ | ⊚ |
| 4-1-22-13 | o | o | o | | | | |

EXAMPLE 4-23

According to the same procedure as in Example 4-21 except for using a croconic methine dye represented by the formula 4-1-39 in place of the croconic methine dye represented by the formula 4-1-25 in the coating liquid A4, 25 kinds of recording media of samples 4-1-23-1 to 4-1-23-25 as shown in Table 4-7A were prepared.

The results are shown in Table 4-7B.

EXAMPLE 5-1

One part by weight of fine crystalline powder of a diacetylene derivative represented by the formula $C_{12}H_{25}-C\equiv C-C\equiv C-C_8C_{16}-COOH$ and 15 parts by weight of the polymethine compound represented by the above formula 5-1-1 were added to 30 parts by weight of methylene chloride, followed by thorough stirring, to prepare a coating solution.

TABLE 4-7A

| Sample No. | Film thickness of layer containing DA compound (Å) | Film thickness of layer containing croconic methine dye (Å) | Sample No. | Film thickness of layer containing DA compound (Å) | Film thickness of layer containing croconic methine dye (Å) |
|---|---|---|---|---|---|
| 4-1-23-1 | 100 | 100 | 4-1-23-14 | 1000 | 3000 |
| 4-1-23-2 | 100 | 200 | 4-1-23-15 | 1000 | 6000 |
| 4-1-23-3 | 100 | 1000 | 4-1-23-16 | 3000 | 100 |
| 4-1-23-4 | 100 | 3000 | 4-1-23-17 | 3000 | 200 |
| 4-1-23-5 | 100 | 6000 | 4-1-23-18 | 3000 | 1000 |
| 4-1-23-6 | 200 | 100 | 4-1-23-19 | 3000 | 3000 |
| 4-1-23-7 | 200 | 200 | 4-1-23-20 | 3000 | 6000 |
| 4-1-23-8 | 200 | 1000 | 4-1-23-21 | 6000 | 100 |
| 4-1-23-9 | 200 | 3000 | 4-1-23-22 | 6000 | 200 |
| 4-1-23-10 | 200 | 6000 | 4-1-23-23 | 6000 | 1000 |
| 4-1-23-11 | 1000 | 100 | 4-1-23-24 | 6000 | 3000 |
| 4-1-23-12 | 1000 | 200 | 4-1-23-25 | 6000 | 6000 |
| 4-1-23-13 | 1000 | 1000 | | | |

TABLE 4-7B

| Sample No. | Sensitivity | Image resolution | Contrast | Sample No. | Sensitivity | Image resolution | Contrast |
|---|---|---|---|---|---|---|---|
| 4-1-23-1 | ⊚ | o | x | 4-1-23-14 | ⊚ | ⊚ | ⊚ |
| 4-1-23-2 | ⊚ | o | x | 4-1-23-15 | ⊚ | ⊚ | ⊚ |
| 4-1-23-3 | ⊚ | o | x | 4-1-23-16 | x | x | x |
| 4-1-23-4 | ⊚ | o | x | 4-1-23-17 | x | x | x |
| 4-1-23-5 | ⊚ | o | x | 4-1-23-18 | ⊚ | ⊚ | ⊚ |
| 4-1-23-6 | ⊚ | o | x | 4-1-23-19 | ⊚ | ⊚ | ⊚ |
| 4-1-23-7 | ⊚ | o | x | 4-1-23-20 | ⊚ | ⊚ | ⊚ |
| 4-1-23-8 | ⊚ | o | x | 4-1-23-21 | x | x | x |
| 4-1-23-9 | ⊚ | ⊚ | x | 4-1-23-22 | x | x | x |
| 4-1-23-10 | ⊚ | ⊚ | x | 4-1-23-23 | o | o | o |
| 4-1-23-11 | o | o | x | 4-1-23-24 | ⊚ | ⊚ | ⊚ |
| 4-1-23-12 | o | o | x | 4-1-23-25 | ⊚ | ⊚ | ⊚ |
| 4-1-23-13 | o | o | o | | | | |

Following subsequently the same procedure as in Example 1-1, experiments were conducted.

EXAMPLE 5-2

By use of a mixed solution containing 1 part by weight of the diacetylene derivative compound, 10 parts by weight of the polymethine compound and 20 parts by weight of methylene chloride as the coating solution, experiments were conducted according to the sample method as in Example 5-1.

EXAMPLE 5-3

By use of a mixed solution containing 1 part by weight of the diacetylene derivative compound, 5 parts by weight of the polymethine compound and 12 parts by weight of methylene chloride as the coating solution, experiments were conducted according to the same method as in Example 5-1.

EXAMPLE 5-4

By use of a mixed solution containing 1 part by weight of the diacetylene derivative compound, 1 part by weight of the polymethine compound and 4 parts by weight of methylene chloride as the coating solution, experiments were conducted according to the same method as in Example 5-1.

EXAMPLE 5-5

By use of a mixed solution containing 5 parts by weight of the diacetylene derivative compound, 1 part by weight of the polymethine compound and 12 parts by weight of methylene chloride as the coating solution, experiments were conducted according to the same method as in Example 5-1.

EXAMPLE 5-6

By use of a mixed solution containing 10 parts by weight of the diacetylene derivative compound, 1 part by weight of the polymethine compound and 20 parts by weight of methylene chloride as the coating solution, experiments were conducted according to the same method as in Example 5-1.

EXAMPLE 5-7

By use of a mixed solution containing 15 parts by weight of the diacetylene derivative compound, 1 part by weight of the polymethine compound and 30 parts by weight of methylene chloride as the coating solution, experiments were conducted according to the same method as in Example 5-1.

The evaluation results of Examples 5-1 to 5-7 are shown in Table 5-1.

TABLE 5-1

| Optical recording medium | Film thickness | Sensitivity | Image resolution | Contrast |
|---|---|---|---|---|
| Example 5-1 | 500Å | ● | ○ | x |
|  | 1000Å | ● | ○ | x |
|  | 2000Å | ◎ | ○ | x |
| Example 5-2 | 500Å | ● | ○ | x |
|  | 1000Å | ◎ | ○ | x |
|  | 2000Å | ● | ○ | ○ |
| Example 5-3 | 500Å | ◎ | ● | x |
|  | 1000Å | ◎ | ● | ○ |
|  | 2000Å | ◎ | ● | ● |
| Example 5-4 | 500Å | ◎ | ● | ◎ |
|  | 1000Å | ◎ | ● | ◎ |
|  | 2000Å | ◎ | ● | ◎ |
| Example 5-5 | 500Å | ● | ● | ● |
|  | 1000Å | ● | ◎ | ◎ |
| Example 5-6 | 500Å | x | x | x |
|  | 1000Å | ○ | ○ | ○ |
|  | 2000Å | ○ | ○ | ○ |
| Example 5-7 | 500Å | x | x | x |
|  | 1000Å | x | x | x |
|  | 2000Å | ○ | ○ | ○ |

EXAMPLES 5-8 TO 5-14

As for the steps of optical recording and visualization of negative images, Examples 5-1 to 5-7 were repeated, and thereafter, each of the recording media was heated to about 80° C. to obtain the negative images in which the blue color of the back ground was changed to red color. For these negative images, evaluation was performed according to the same standars as in Example 5-1 to obtain the results shown in table 5-2.

TABLE 5-2

| Optical recording medium | Film thickness | Sensitivity | Image resolution | Contrast |
|---|---|---|---|---|
| Example 5-8 | 500Å | ◎ | ○ | x |
|  | 1000Å | ● | ○ | x |
|  | 2000Å | ◎ | ○ | x |
| Example 5-9 | 500Å | ◎ | ○ | x |
|  | 1000Å | ◎ | ○ | x |
|  | 2000Å | ◎ | ○ | ○ |
| Example 5-10 | 500Å | ◎ | ◎ | x |
|  | 1000Å | ◎ | ● | ○ |
|  | 2000Å | ◎ | ◎ | ◎ |
| Example 5-11 | 500Å | ● | ● | ◎ |
|  | 1000Å | ◎ | ◎ | ◎ |
|  | 2000Å | ● | ◎ | ◎ |
| Example 5-12 | 500Å | ● | ◎ | ◎ |
|  | 1000Å | ● | ◎ | ◎ |
|  | 2000Å | ◎ | ◎ | ◎ |
| Example 5-13 | 500Å | x | x | x |
|  | 1000Å | ○ | ○ | ○ |
|  | 2000Å | ○ | ○ | ○ |
| Example 5-14 | 500Å | x | x | x |
|  | 1000Å | x | x | x |
|  | 2000Å | ○ | ○ | ○ |

EXAMPLE 5-15

Experiments were conducted according to the same procedure as in Example 5-4 except for using a diacetylene derivative compound represented by $C_8H_{17}-C\equiv C-C\equiv C-C_2H_5-COOH$ in place of the diacetylene derivative compound represented by $C_{12}H_{25}-C\equiv C-C\equiv C-C_8H_{16}-COOH$. The results are shown in Table 5-3.

EXAMPLE 5-16 TO 5-20

According to the same procedure as in Example 5-15 except for using the polymethine compounds represented by the formulae 5-1-4, 5-1-8, 5-1-20, 5-1-30 and 5-1-36, respectively, in place of the polymethine compound represented by the formula 5-11, experiments were conducted in the same manner. The results are shown in Table 5-3.

TABLE 5-3

| Optical recording medium | Film thickness | Sensitivity | Image resolution | Contrast |
|---|---|---|---|---|
| Example | 500Å | ○ | ○ | ○ |

TABLE 5-3-continued

| Optical recording medium | Film thickness | Sensitivity | Image resolution | Contrast |
|---|---|---|---|---|
| 5-15 | 1000Å | ○ | ○ | ○ |
|  | 2000Å | ◎ | ◎ | ◎ |
| Example 5-16 | 500Å | ◎ | ○ | ○ |
|  | 1000Å | ◎ | ◎ | ◎ |
|  | 2000Å | ◎ | ◎ | ◎ |
| Example 5-17 | 500Å | ◎ | ○ | ○ |
|  | 1000Å | ● | ◎ | ◎ |
|  | 2000Å | ● | ◎ | ◎ |
| Example 5-18 | 500Å | ◎ | ○ | ○ |
|  | 1000Å | ◎ | ● | ◎ |
|  | 2000Å | ● | ◎ | ◎ |
| Example | 500Å | ● | ● | ○ |
| 5-19 | 1000Å | ◎ | ◎ | ◎ |
|  | 2000Å | ◎ | ◎ | ◎ |
| Example 5-20 | 500Å | ◎ | ◎ | ○ |
|  | 1000Å | ◎ | ◎ | ◎ |
|  | 2000Å | ◎ | ◎ | ◎ |

EXAMPLE 5-21

One part by weight of a polymethine compound represented by the formula 5-1-5 was dissolved in 10 parts by weight of acetonitrile to provide a coating solution A5.

Separately, 1 part by weight of fine crystal powder of a diacetylene derivative compound represented by $C_{12}H_{25}-C\equiv C-C\equiv C-C_8H_{16}-COOH$ was added into 10 parts by weight of benzene and stirred thoroughly to provide a coating solution B5.

By use of the coating solutions A5 and B5 in place of A1 and B1 in Example 1-20, respectively, experiments were conducted in the same manner as in Example 1-20.

However, by varying the film thicknesses of the layer containing the polymethine compound and of the layer containing the DA compound variously, 25 kinds of recording media of samples 5-1-21-1 to 5-1-21-25 were used.

Subsequently, the experiments were conducted in the same manner as in Example 5-1. The results are shown in Table 5-4B.

TABLE 5-4A

| Sample No. | Film thickness of layer containing DA compound (Å) | Film thickness of layer containing polymethine compound (Å) | Sample No. | Film thickness of layer containing DA compound (Å) | Film thickness of layer containing polymethine compound (Å) |
|---|---|---|---|---|---|
| 5-1-21-1 | 100 | 100 | 5-1-21-14 | 1000 | 3000 |
| 5-1-21-2 | 100 | 200 | 5-1-21-15 | 1000 | 6000 |
| 5-1-21-3 | 100 | 1000 | 5-1-21-16 | 3000 | 100 |
| 5-1-21-4 | 100 | 3000 | 5-1-21-17 | 3000 | 200 |
| 5-1-21-5 | 100 | 6000 | 5-1-21-18 | 3000 | 1000 |
| 5-1-21-6 | 200 | 100 | 5-1-21-19 | 3000 | 3000 |
| 5-1-21-7 | 200 | 200 | 5-1-21-20 | 3000 | 6000 |
| 5-1-21-8 | 200 | 1000 | 5-1-21-21 | 6000 | 100 |
| 5-1-21-9 | 200 | 3000 | 5-1-21-22 | 6000 | 200 |
| 5-1-21-10 | 200 | 6000 | 5-1-21-23 | 6000 | 1000 |
| 5-1-21-11 | 1000 | 100 | 5-1-21-24 | 6000 | 3000 |
| 5-1-21-12 | 1000 | 200 | 5-1-21-25 | 6000 | 6000 |
| 5-1-21-13 | 1000 | 1000 |  |  |  |

TABLE 5-4B

| Sample No. | Sensitivity | Image resolution | Contrast | Sample No. | Sensitivity | Image resolution | Contrast |
|---|---|---|---|---|---|---|---|
| 5-1-21-1 | ● | ○ | × | 5-1-21-14 | ◎ | ◎ | ◎ |
| 5-1-21-2 | ● | ○ | × | 5-1-21-15 | ◎ | ◎ | ◎ |
| 5-1-21-3 | ● | ○ | × | 5-1-21-16 | × | × | × |
| 5-1-21-4 | ● | ○ | × | 5-1-21-17 | × | × | × |
| 5-1-21-5 | ● | ○ | × | 5-1-21-18 | ● | ◎ | ◎ |
| 5-1-21-6 | ● | ○ | × | 5-1-21-19 | ● | ◎ | ◎ |
| 5-1-21-7 | ● | ○ | × | 5-1-21-20 | ● | ◎ | ◎ |
| 5-1-21-8 | ● | ○ | ○ | 5-1-21-21 | × | × | × |
| 5-1-21-9 | ● | ○ | ○ | 5-1-21-22 | × | × | × |
| 5-1-21-10 | ● | ○ | ○ | 5-1-21-23 | ○ | ○ | ○ |
| 5-1-21-11 | ○ | ○ | × | 5-1-21-24 | ● | ◎ | ◎ |
| 5-1-21-12 | ○ | ○ | × | 5-1-21-25 | ● | ◎ | ◎ |
| 5-1-21-13 | ● | ● | ● |  |  |  |  |

EXAMPLE 5-22

According to the same procedure as in Example 5-21 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$ in the coating solution B5, 25 kinds of recording media of samples 5-1-22-1 to 5-1-2225 -as shown in Table 5-5A were used to carry out the experiments.

Subsequently, the experiments were conducted in the same manner as in Example 5-1. The results are shown in Table 5-5B.

TABLE 5-5A

| Sample No. | Film thickness of layer containing DA compound (Å) | Film thickness of layer containing polymethine compound (Å) | Sample No. | Film thickness of layer containing DA compound (Å) | Film thickness of layer containing polymethine compound (Å) |
|---|---|---|---|---|---|
| 5-1-22-1 | 100 | 100 | 5-1-22-14 | 1000 | 3000 |

TABLE 5-5A-continued

| Sample No. | Film thickness of layer containing DA compound (Å) | Film thickness of layer containing polymethine compound (Å) | Sample No. | Film thickness of layer containing DA compound (Å) | Film thickness of layer containing polymethine compound (Å) |
| --- | --- | --- | --- | --- | --- |
| 5-1-22-2 | 100 | 200 | 5-1-22-15 | 1000 | 6000 |
| 5-1-22-3 | 100 | 1000 | 5-1-22-16 | 3000 | 100 |
| 5-1-22-4 | 100 | 3000 | 5-1-22-17 | 3000 | 200 |
| 5-1-22-5 | 100 | 6000 | 5-1-22-18 | 3000 | 1000 |
| 5-1-22-6 | 200 | 100 | 5-1-22-19 | 3000 | 3000 |
| 5-1-22-7 | 200 | 200 | 5-1-22-20 | 3000 | 6000 |
| 5-1-22-8 | 200 | 1000 | 5-1-22-21 | 6000 | 100 |
| 5-1-22-9 | 200 | 3000 | 5-1-22-22 | 6000 | 200 |
| 5-1-22-10 | 200 | 6000 | 5-1-22-23 | 6000 | 1000 |
| 5-1-22-11 | 1000 | 100 | 5-1-22-24 | 6000 | 3000 |
| 5-1-22-12 | 1000 | 200 | 5-1-22-25 | 6000 | 6000 |
| 5-1-22-13 | 1000 | 1000 | | | |

TABLE 5-5B

| Sample No. | Sensitivity | Image resolution | Contrast | Sample No. | Sensitivity | Image resolution | Contrast |
| --- | --- | --- | --- | --- | --- | --- | --- |
| 5-1-22-1 | ⊚ | o | x | 5-1-22-14 | o | ⊚ | o |
| 5-1-22-2 | ⊚ | o | x | 5-1-22-15 | ⊚ | ⊚ | ⊚ |
| 5-1-22-3 | ⊚ | o | x | 5-1-22-16 | ⊚ | ⊚ | ⊚ |
| 5-1-22-4 | ⊚ | o | x | 5-1-22-17 | x | x | x |
| 5-1-22-5 | ⊚ | o | x | 5-1-22-18 | x | x | x |
| 5-1-22-6 | ⊚ | o | x | 5-1-22-19 | ⊚ | ⊚ | ⊚ |
| 5-1-22-7 | ⊚ | o | x | 5-1-22-20 | ⊚ | ⊚ | ⊚ |
| 5-1-22-8 | ⊚ | ⊚ | x | 5-1-22-21 | x | x | x |
| 5-1-22-9 | ⊚ | ⊚ | x | 5-1-22-22 | x | x | x |
| 5-1-22-10 | ⊚ | ⊚ | x | 5-1-22-23 | o | o | o |
| 5-1-22-11 | o | o | x | 5-1-22-24 | ⊚ | ⊚ | ⊚ |
| 5-1-22-12 | o | o | x | 5-1-22-25 | ⊚ | ⊚ | ⊚ |
| 5-1-22-13 | ⊚ | ⊚ | ● | | | | |

EXAMPLES 5-23 AND 5-24

According to the same procedure as in Example 5-21 except for using a polymethine compound represented by the formula 5-1-15 in Example 5-23 and represented by the formula 5-1-2 in Example 5-24 in place of the polymethine compound represented by the formula 5-1-25 in the coating liquid A5, 25 kinds of recording media of samples 5-1-22-1 to 5-1-22-25 as shown in Table 5-6A and 25 kinds of recording media of samples 5-1-24-1 to 5-1-24-25 as shown in Table 5-7A were prepared. Subsequently, experiments were conducted in the same manner as in Example 5-1.

The results are shown in Table 5-6B and 5-7B.

TABLE 5-6A

| Sample No. | Film thickness of layer containing DA compound (Å) | Film thickness of layer containing polymethine compound (Å) | Sample No. | Film thickness of layer containing DA compound (Å) | Film thickness of layer containing polymethine compound (Å) |
| --- | --- | --- | --- | --- | --- |
| 5-1-23-1 | 100 | 100 | 5-1-23-14 | 1000 | 3000 |
| 5-1-23-2 | 100 | 200 | 5-1-23-15 | 1000 | 6000 |
| 5-1-23-3 | 100 | 1000 | 5-1-23-16 | 3000 | 100 |
| 5-1-23-4 | 100 | 3000 | 5-1-23-17 | 3000 | 200 |
| 5-1-23-5 | 100 | 6000 | 5-1-23-18 | 3000 | 1000 |
| 5-1-23-6 | 200 | 100 | 5-1-23-19 | 3000 | 3000 |
| 5-1-23-7 | 200 | 200 | 5-1-23-20 | 3000 | 6000 |
| 5-1-23-8 | 200 | 1000 | 5-1-23-21 | 6000 | 100 |
| 5-1-23-9 | 200 | 3000 | 5-1-23-22 | 6000 | 200 |
| 5-1-23-10 | 200 | 6000 | 5-1-23-23 | 6000 | 1000 |
| 5-1-23-11 | 1000 | 100 | 5-1-23-24 | 6000 | 3000 |
| 5-1-23-12 | 1000 | 200 | 5-1-23-25 | 6000 | 6000 |
| 5-1-23-13 | 1000 | 1000 | | | |

TABLE 5-6B

| Sample No. | Sensitivity | Image resolution | Contrast | Sample No. | Sensitivity | Image resolution | Contrast |
| --- | --- | --- | --- | --- | --- | --- | --- |
| 5-1-23-1 | ⊚ | ⊚ | x | 5-1-23-14 | ⊚ | ⊚ | ⊚ |
| 5-1-23-2 | ⊚ | ⊚ | x | 5-1-23-15 | ⊚ | ⊚ | ⊚ |
| 5-1-23-3 | ⊚ | ● | x | 5-1-23-16 | x | x | x |
| 5-1-23-4 | ⊚ | ⊚ | x | 5-1-23-17 | x | x | x |
| 5-1-23-5 | ⊚ | ⊚ | x | 5-1-23-18 | ⊚ | ⊚ | ⊚ |
| 5-1-23-6 | ⊚ | ⊚ | x | 5-1-23-19 | ⊚ | ⊚ | ⊚ |
| 5-1-23-7 | ⊚ | ⊚ | x | 5-1-23-20 | ⊚ | ⊚ | ⊚ |
| 5-1-23-8 | ⊚ | ⊚ | x | 5-1-23-21 | x | x | x |

TABLE 5-6B-continued

| Sample No. | Sensitivity | Image resolution | Contrast | Sample No. | Sensitivity | Image resolution | Contrast |
| --- | --- | --- | --- | --- | --- | --- | --- |
| 5-1-23-9 | ◉ | ◉ | x | 5-1-23-22 | x | x | x |
| 5-1-23-10 | ◉ | ◉ | x | 5-1-23-23 | o | o | o |
| 5-1-23-11 | ◉ | o | x | 5-1-23-24 | ◉ | ◉ | ◉ |
| 5-1-23-12 | o | o | x | 5-1-23-25 | ◉ | ◉ | ◉ |
| 5-1-23-13 | o | o | o | | | | |

TABLE 5-7A

| Sample No. | Film thickness of layer containing DA compound (Å) | Film thickness of layer containing polymethine compound (Å) | Sample No. | Film thickness of layer containing DA compound (Å) | Film thickness of layer containing polymethine compound (Å) |
| --- | --- | --- | --- | --- | --- |
| 5-1-24-1 | 100 | 100 | 5-1-24-14 | 1000 | 3000 |
| 5-1-24-2 | 100 | 200 | 5-1-24-15 | 1000 | 6000 |
| 5-1-24-3 | 100 | 1000 | 5-1-24-16 | 3000 | 100 |
| 5-1-24-4 | 100 | 3000 | 5-1-24-17 | 3000 | 200 |
| 5-1-24-5 | 100 | 6000 | 5-1-24-18 | 3000 | 1000 |
| 5-1-24-6 | 200 | 100 | 5-1-24-19 | 3000 | 3000 |
| 5-1-24-7 | 200 | 200 | 5-1-24-20 | 3000 | 6000 |
| 5-1-24-8 | 200 | 1000 | 5-1-24-21 | 6000 | 100 |
| 5-1-24-9 | 200 | 3000 | 5-1-24-22 | 6000 | 200 |
| 5-1-24-10 | 200 | 6000 | 5-1-24-23 | 6000 | 1000 |
| 5-1-24-11 | 1000 | 100 | 5-1-24-24 | 6000 | 3000 |
| 5-1-24-12 | 1000 | 200 | 5-1-24-25 | 6000 | 6000 |
| 5-1-24-13 | 1000 | 1000 | | | |

TABLE 5-7B

| Sample No. | Sensitivity | Image resolution | Contrast | Sample No. | Sensitivity | Image resolution | Contrast |
| --- | --- | --- | --- | --- | --- | --- | --- |
| 5-1-24-1 | ● | ● | x | 5-1-24-14 | ◉ | ● | ◉ |
| 5-1-24-2 | ● | ● | x | 5-1-24-15 | ● | ◉ | ◉ |
| 5-1-24-3 | ● | ● | x | 5-1-24-16 | x | x | x |
| 5-1-24-4 | ● | ● | x | 5-1-24-17 | x | x | x |
| 5-1-24-5 | ● | ● | x | 5-1-24-18 | ◉ | ◉ | ◉ |
| 5-1-24-6 | ◉ | ◉ | x | 5-1-24-19 | ● | ◉ | ◉ |
| 5-1-24-7 | ● | ◉ | x | 5-1-24-20 | ◉ | ◉ | ● |
| 5-1-24-8 | ◉ | ● | x | 5-1-24-21 | x | x | x |
| 5-1-24-9 | ◉ | ◉ | x | 5-1-24-22 | x | x | x |
| 5-1-24-10 | ◉ | ● | x | 5-1-24-23 | o | o | o |
| 5-1-24-11 | o | o | x | 5-1-24-24 | ● | ● | ● |
| 5-1-24-12 | o | o | x | 5-1-24-25 | ● | ● | ● |
| 5-1-24-13 | o | o | o | | | | |

EXAMPLE 6-1

A solution of 1 part by weight of a diacetylene derivative represented by $C_{12}H_{25}$—C≡C—C≡C—$C_8H_{16}$—COOH and 15 parts by weight of an AZ compound represented by the above formula 1-1-1 dissolved at a concentration of $3 \times 10^{-3}$ mole/liter in chloroform was spread on an aqueous phase with pH 6.5 and a cadmium chloride concentration of $1 \times 10^{-3}$ mole/liter. After removal of the solvent chloroform, at a surface pressure maintained constantly, a glass substrate having a hydrophilic surface was moved vertically up and down in the direction transversing the water surface gently at a speed of 1.0 cm/min. to have a mixed monomolecular film of the DA compound and the AZ compound transferred onto the substrate. Thus, optical recording media having a mixed monomolecular film and mixed monomolecular built-up films built up in 5 layers, 21 layers, 41 layers, 101 layers and 201 layers formed o the substrate, respectively, were prepared.

By use of the recording media thus obtained, the optical recording method of the present invention was practiced as discribed below.

First, each of the above recording media was irradiated with a semiconductor laser of 830 nm (laser beam diameter: 1 μm, irradiation time: 200 ns/1 dot, output 3 mW) following an input information to form a latent image. During this operation, no apparent change was recognized at the light irradiated portion of the recording medium.

Next, after completion of writing by use of this semiconductor laser, the recording medium were irradiated uniformly and sufficiently with UV-rays of 254 nm. As the result, portions other than those irradiated with the semiconductor laser during previous writing onto the recording layer of the recording medium were changed in color to blue, whereby the latent image formed previously, namely the negative image with the portion irradiated with the semiconductor laser being left colorless, was visualized.

EXAMPLE 6-2

Experiments were conducted according to the same procedure as in Example 6-1 except that the amount of the diacetylene derivative compound used was 1 part by weight and the amount of the AZ compound 10 parts by weight.

EXAMPLE 6-3

Experiments were conducted according to the same procedure as in Example 6-1 except that the amount of the diacetylene derivative compound used was 1 part by weight and the amount of the AZ compound 5 parts by weight.

EXAMPLE 6-4

Experiments were conducted according to the same procedure as in Example 6-1 except that the amount of the diacetylene derivative compound used was 1 part by weight and the amount of the AZ compound 1 part by weight.

EXAMPLE 6-5

Experiments were conducted according to the same procedure as in Example 6-1 except that the amount of the diacetylene derivative compound used was 5 parts by weight and the amount of the AZ compound 1 part by weight.

EXAMPLE 6-6

Experiments were conducted according to the same procedure as in Example 6-1 except that the amount of the diacetylene derivative compound used was 10 part by weight and the amount of the AZ compound 1 part by weight.

EXAMPLE 6-7

Experiments were conducted according to the same procedure as in Example 6-1 except that the amount of the diacetylene derivative compound used was 15 parts by weight and the amount of the AZ compound 1 part by weight.

The results of Examples 6-1 to 6-4 are shown in Table 6-1A and the results of Examples 6-5 to 6-7 in Table 6-1B.

TABLE 6-1A

| Recording medium | Built-up number of monomolecular film | Sensitivity | Image resolution | Contrast |
|---|---|---|---|---|
| Example 6-1 | 1 | ● | ⊚ | x |
|  | 5 | ● | ⊚ | x |
|  | 21 | ● | ⊚ | x |
|  | 41 | ● | ○ | ○ |
|  | 101 | ● | ○ | ○ |
|  | 201 | ● | ○ | ○ |
| Example 6-2 | 1 | ⊚ | ⊚ | x |
|  | 5 | ⊚ | ⊚ | x |
|  | 21 | ⊚ | ⊚ | ○ |
|  | 41 | ⊚ | ⊚ | ○ |
|  | 101 | ⊚ | ⊚ | ● |
|  | 201 | ⊚ | ⊚ | ● |
| Example 6-3 | 1 | ⊚ | ● | x |
|  | 5 | ⊚ | ● | x |
|  | 21 | ⊚ | ● | ● |
|  | 41 | ⊚ | ● | ● |
|  | 101 | ⊚ | ● | ● |
|  | 201 | ⊚ | ● | ● |
| Example 6-4 | 1 | ⊚ | ● | x |
|  | 5 | ⊚ | ● | x |
|  | 21 | ⊚ | ● | ● |
|  | 41 | ⊚ | ● | ● |
|  | 101 | ⊚ | ● | ● |
|  | 201 | ● | ⊚ | ● |

TABLE 6-1B

| Recording medium | Built-up number of monomolecular film | Sensitivity | Image resolution | Contrast |
|---|---|---|---|---|
| Example 6-5 | 1 | ● | ⊚ | x |
|  | 5 | ● | ● | ○ |
|  | 21 | ⊚ | ⊚ | ● |
|  | 41 | ⊚ | ⊚ | ⊚ |
|  | 101 | ⊚ | ⊚ | ● |
|  | 201 | ● | ● | ● |
| Example 6-6 | 1 | x | x | x |
|  | 5 | x | x | x |
|  | 21 | ○ | ○ | ○ |
|  | 41 | ○ | ○ | ○ |
|  | 101 | ⊚ | ⊚ | ● |
|  | 201 | ⊚ | ● | ⊚ |
| Example 6-7 | 1 | x | x | x |
|  | 5 | x | x | x |
|  | 21 | x | x | x |
|  | 41 | ○ | ○ | ○ |
|  | 101 | ○ | ○ | ○ |
|  | 201 | ○ | ○ | ○ |

EXAMPLES 6-8 TO 6-14

As for the steps of optical recording and visualization of negative images, Examples 6-1 to 6-7 were repeated, and thereafter, each of the recording media was heated to about 80° C. to obtain the negative images in which the blue color of the back ground was changed to red color. For these negative images, evaluation was performed according to the same standards as in Example 6-1 to obtain the results shown in Table 6-2A and Table 6-2B.

TABLE 6-2A

| Recording medium | Built-up number of monomolecular film | Sensitivity | Image resolution | Contrast |
|---|---|---|---|---|
| Example 6-8 | 1 | ⊚ | ⊚ | x |
|  | 5 | ⊚ | ● | x |
|  | 21 | ⊚ | ⊚ | x |
|  | 41 | ⊚ | ○ | ○ |
|  | 101 | ⊚ | ○ | ○ |
|  | 201 | ⊚ | ○ | ○ |
| Example 6-9 | 1 | ⊚ | ⊚ | x |
|  | 5 | ⊚ | ⊚ | x |
|  | 21 | ⊚ | ⊚ | ○ |
|  | 41 | ⊚ | ⊚ | ○ |
|  | 101 | ⊚ | ⊚ | ⊚ |
|  | 201 | ⊚ | ⊚ | ● |
| Example 6-10 | 1 | ⊚ | ⊚ | x |
|  | 5 | ⊚ | ⊚ | x |
|  | 21 | ● | ⊚ | ● |
|  | 41 | ⊚ | ● | ● |
|  | 101 | ⊚ | ● | ● |
|  | 201 | ⊚ | ● | ● |
| Example 6-11 | 1 | ⊚ | ● | x |
|  | 5 | ⊚ | ● | x |
|  | 21 | ⊚ | ● | ⊚ |
|  | 41 | ⊚ | ● | ⊚ |
|  | 101 | ⊚ | ● | ● |
|  | 201 | ⊚ | ⊚ | ● |

TABLE 6-2B

| Recording medium | Built-up number of monomolecular film | Sensitivity | Image resolution | Contrast |
|---|---|---|---|---|
| Example 6-12 | 1 | ● | ● | x |
|  | 5 | ● | ● | ○ |
|  | 21 | ● | ● | ⊚ |
|  | 41 | ● | ● | ⊚ |
|  | 101 | ● | ● | ● |

TABLE 6-2B-continued

| Recording medium | Built-up number of monomolecular film | Sensitivity | Image resolution | Contrast |
|---|---|---|---|---|
| | 201 | ◉ | ● | ● |
| Example 6-13 | 1 | x | x | x |
| | 5 | x | x | x |
| | 21 | o | o | o |
| | 41 | o | o | o |
| | 101 | ◉ | ◉ | ◉ |
| | 201 | ● | o | ◉ |
| Example 6-14 | 1 | x | x | x |
| | 5 | x | x | x |
| | 21 | x | x | x |
| | 41 | o | o | o |
| | 101 | o | o | o |
| | 201 | o | o | o |

EXAMPLE 6-15

According to the same procedure as in Example 6-4 except for using a diacetylene derivative compound represented by $C_8H_{17}—C≡C—C≡C—C_2H_4—COOH$ in place of the diacetylene derivative compound represented by $C_{12}H_{25}—C≡C—C≡C—C_8H_{16}—COOH$, experiments were conducted in the same manner as in Example 6-4.

EXAMPLE 6-16 TO 6-19

According to the same procedure as in Example 6-15 except for using the AZ compounds represented by the formulae 1-1-6, 1-1-8, 1-1-16 and 1-1-12, respectively, in place of the AZ compound represented by the formula 1-1-1, experiments were conducted in the same manner as in Example 6-15.

The results of Examples 6-15 to 6-17 are shown in Table 6-3A, and those of Examples 6-18 and 6-19 in Table 6-3B.

TABLE 6-3A

| Recording medium | Built-up number of monomolecular film | Sensitivity | Image resolution | Contrast |
|---|---|---|---|---|
| Example 6-15 | 1 | ● | ◉ | x |
| | 5 | ● | ◉ | x |
| | 21 | ● | ◉ | ◉ |
| | 41 | ● | ◉ | ● |
| | 101 | ◉ | ◉ | ◉ |
| | 201 | ● | ◉ | ◉ |
| Example 6-16 | 1 | ● | ◉ | x |
| | 5 | ● | ◉ | x |
| | 21 | ◉ | ● | ◉ |
| | 41 | ◉ | ● | ◉ |
| | 101 | ◉ | ● | ◉ |
| | 201 | ● | ● | ● |
| Example 6-17 | 1 | ● | ◉ | x |
| | 5 | ◉ | ◉ | x |
| | 21 | ◉ | ◉ | ◉ |
| | 41 | ◉ | ● | ◉ |
| | 101 | ◉ | ◉ | ◉ |
| | 201 | ● | o | ◉ |

TABLE 6-3B

| Recording medium | Built-up number of monomolecular film | Sensitivity | Image resolution | Contrast |
|---|---|---|---|---|
| Example 6-18 | 1 | ● | ◉ | x |
| | 5 | ● | ◉ | x |
| | 21 | ● | ● | ◉ |
| | 41 | ◉ | ● | ◉ |
| | 101 | ● | o | o |
| | 201 | ◉ | o | o |
| Example 6-19 | 1 | ● | ◉ | x |
| | 5 | ◉ | ● | x |
| | 21 | ◉ | ◉ | ◉ |
| | 41 | ◉ | ◉ | o |
| | 101 | ● | ● | o |
| | 201 | ● | o | o |

EXAMPLE 6-20

Ten (10) parts by weight of the AZ compound represented by the above formula 1-1-1 were dissolved in 20 parts by weight of methylene chloride to prepare a coating solution.

Next, a disc substrate made of a glass (thickness 1.5 mm, diameter 20 mm) was mounted on a spinner coating machine, and a small amount of the above coating solution was added dropwise at the center of the disc substrate and thereafter the spinner was rotated at a predetermined rotational number for a predetermined time to effect coating, followed by drying at room temperature, to prepare a layer containing the AZ compound on the substrate.

After the layer containing the AZ compound was thus formed, a solution of a DA compound represented by $C_{12}H_{25}—C≡C—C≡C—C_8H_{16}—COOH$ dissolved at a concentration of $3 \times 10^{-3}$ mole/liter in chloroform was spread on an aqueous phase with pH 6.5 and a cadmium chloride concentration of $1 \times 10^{-3}$ mole/liter. After removal of the solvent chloroform, at a surface pressure maintained constantly, a glass substrate having a sufficiently clean surface with the layer containing the AZ compound formed thereon was moved vertically up and down in the direction transversing the water surface gently at a speed of 1.0 cm/min. to have a monomolecular film of the DA compound transferred onto the surface of the layer containing the AZ compound. Thus, optical recording media having a monomolecular film of the DA compound or mixed monomolecular built-up films built up in desired number of layers on the layer containing the AZ compound, respectively, were prepared.

By varying the film thickness of the layer containing the AZ compound and the built-up number of the above monomolecular films variously as shown in Table 6-4A, 25 kinds of recording media of samples 6-1-20-1 to 6-1-20-25 were obtained.

After optical recording was practiced on the recording media thus obtained in the same manner as in Example 6-1, they were irradiated uniformly and sufficiently with UV-rays of 254 nm to visualize the negative images, which were then evaluated. The results are shown in Table 6-4B.

TABLE 6-4A

| Sample No. | Built-up number of DA compound monomolecular film | Film thickness of layer containing AZ compound (Å) | Sample No. | Built-up number of DA compound monomolecular film | Film thickness of layer containing AZ compound (Å) |
|---|---|---|---|---|---|
| 6-1-20-1 | 1 | 100 | 6-1-20-14 | 41 | 3000 |
| 6-1-20-2 | " | 200 | 6-1-20-15 | " | 6000 |
| 6-1-20-3 | " | 1000 | 6-1-20-16 | 101 | 100 |
| 6-1-20-4 | " | 3000 | 6-1-20-17 | " | 200 |
| 6-1-20-5 | " | 6000 | 6-1-20-18 | " | 1000 |
| 6-1-20-6 | 7 | 100 | 6-1-20-19 | " | 3000 |
| 6-1-20-7 | " | 200 | 6-1-20-20 | " | 6000 |
| 6-1-20-8 | " | 1000 | 6-1-20-21 | 201 | 100 |
| 6-1-20-9 | " | 3000 | 6-1-20-22 | " | 200 |
| 6-1-20-10 | " | 6000 | 6-1-20-23 | " | 1000 |
| 6-1-20-11 | 41 | 100 | 6-1-20-24 | " | 3000 |
| 6-1-20-12 | " | 200 | 6-1-20-25 | " | 6000 |
| 6-1-20-13 | " | 1000 | | | |

TABLE 6-4B

| Sample No. | Sensitivity | Image resolution | Contrast | Sample No. | Sensitivity | Image resolution | Contrast |
|---|---|---|---|---|---|---|---|
| 6-1-20-1 | ● | ◉ | x | 6-1-20-14 | ◉ | ◉ | ● |
| 6-1-20-2 | ◉ | ◉ | x | 6-1-20-15 | ◉ | ● | ● |
| 6-1-20-3 | ◉ | ● | x | 6-1-20-16 | x | x | x |
| 6-1-20-4 | ◉ | ◉ | x | 6-1-20-17 | x | x | x |
| 6-1-20-5 | ◉ | ● | x | 6-1-20-18 | ◉ | ◉ | ● |
| 6-1-20-6 | ● | ● | x | 6-1-20-19 | ◉ | ◉ | ● |
| 6-1-20-7 | ◉ | ● | x | 6-1-20-20 | ◉ | ◉ | ◉ |
| 6-1-20-8 | ◉ | ● | x | 6-1-20-21 | x | x | x |
| 6-1-20-9 | ◉ | ● | x | 6-1-20-22 | x | x | x |
| 6-1-20-10 | ◉ | ◉ | x | 6-1-20-23 | o | ◉ | o |
| 6-1-20-11 | o | ● | x | 6-1-20-24 | ◉ | ◉ | ● |
| 6-1-20-12 | o | ● | x | 6-1-20-25 | ◉ | ● | ● |
| 6-1-20-13 | ◉ | ● | ◉ | | | | |

EXAMPLE 6-21

According to the same procedure as in Example 6-20 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$, 25 kinds of recording media of samples 6-1-21-1 to 6-1-21-25 as shown in Table 6-5A were obtained.

One each of the recording media thus obtained were irradiated uniformly and sufficiently with UV-rays of 254 nm to visualize the nega images, which were then evaluated. The results are shown in Table 6-4B.

TABLE 6-5A

| Sample No. | Built-up number of DA compound monomolecular film | Film thickness of layer containing AZ compound (Å) | Sample No. | Built-up number of DA compound monomolecular film | Film thickness of layer containing AZ compound (Å) |
|---|---|---|---|---|---|
| 6-1-21-1 | 1 | 100 | 6-1-21-14 | 41 | 3000 |
| 6-1-21-2 | " | 200 | 6-1-21-15 | " | 6000 |
| 6-1-21-3 | " | 1000 | 6-1-21-16 | 101 | 100 |
| 6-1-21-4 | " | 3000 | 6-1-21-17 | " | 200 |
| 6-1-21-5 | " | 6000 | 6-1-21-18 | " | 1000 |
| 6-1-21-6 | 7 | 100 | 6-1-21-19 | " | 3000 |
| 6-1-21-7 | " | 200 | 6-1-21-20 | " | 6000 |
| 6-1-21-8 | " | 1000 | 6-1-21-21 | 201 | 100 |
| 6-1-21-9 | " | 3000 | 6-1-21-22 | " | 200 |
| 6-1-21-10 | " | 6000 | 6-1-21-23 | " | 1000 |
| 6-1-21-11 | 41 | 100 | 6-1-21-24 | " | 3000 |
| 6-1-21-12 | " | 200 | 6-1-21-25 | " | 6000 |
| 6-1-21-13 | " | 1000 | | | |

TABLE 6-5B

| Sample No. | Sensitivity | Image resolution | Contrast | Sample No. | Sensitivity | Image resolution | Contrast |
|---|---|---|---|---|---|---|---|
| 6-1-21-1 | ● | ● | x | 6-1-21-14 | ◉ | ◉ | ◉ |
| 6-1-21-2 | ● | ● | x | 6-1-21-15 | ◉ | ◉ | ● |
| 6-1-21-3 | ● | ● | x | 6-1-21-16 | x | x | x |
| 6-1-21-4 | ● | ● | x | 6-1-21-17 | o | ◉ | o |
| 6-1-21-5 | ● | ● | x | 6-1-21-18 | ◉ | ● | ● |
| 6-1-21-6 | ◉ | ● | x | 6-1-21-19 | ◉ | ◉ | ● |
| 6-1-21-7 | ● | ● | x | 6-1-21-20 | ◉ | ● | ● |

TABLE 6-5B-continued

| Sample No. | Sensitivity | Image resolution | Contrast | Sample No. | Sensitivity | Image resolution | Contrast |
|---|---|---|---|---|---|---|---|
| 6-1-21-8 | ● | ● | x | 6-1-21-21 | x | x | x |
| 6-1-21-9 | ◉ | ● | x | 6-1-21-22 | x | x | x |
| 6-1-21-10 | ◉ | ● | x | 6-1-21-23 | ● | ◉ | ◉ |
| 6-1-21-11 | ○ | ◉ | x | 6-1-21-24 | ● | ◉ | ● |
| 6-1-21-12 | ○ | ● | ● | 6-1-21-25 | ● | ◉ | ◉ |
| 6-1-21-13 | ● | ● | ● | | | | |

EXAMPLES 6-22 AND 6-23

Example 6-21 was repeated except that the AZ compound in the coating solution for formation of the layer containing the AZ compound was replaced with the AZ compound represented by the formula 1-1-18 and the formula 1-1-6, respectively.

The samples used in Example 6-22 are as shown in Table 6-6A, and those in Example 6-23 as shown in Table 6-7A.

The results of Example 6-22 are shown in Table 6-6B and those of Example 6-23 in Table 6-7B.

TABLE 6-6A

| Sample No. | Built-up number of DA compound monomolecular film | Film thickness of layer containing AZ compound (Å) | Sample No. | Built-up number of DA compound monomolecular film | Film thickness of layer containing AZ compound (Å) |
|---|---|---|---|---|---|
| 6-1-22-1 | 1 | 100 | 6-1-22-14 | 41 | 3000 |
| 6-1-22-2 | " | 200 | 6-1-22-15 | " | 6000 |
| 6-1-22-3 | " | 1000 | 6-1-22-16 | 101 | 100 |
| 6-1-22-4 | " | 3000 | 6-1-22-17 | " | 200 |
| 6-1-22-5 | " | 6000 | 6-1-22-18 | " | 1000 |
| 6-1-22-6 | 7 | 100 | 6-1-22-19 | " | 3000 |
| 6-1-22-7 | " | 200 | 6-1-22-20 | " | 6000 |
| 6-1-22-8 | " | 1000 | 6-1-22-21 | 201 | 100 |
| 6-1-22-9 | " | 3000 | 6-1-22-22 | " | 200 |
| 6-1-22-10 | " | 6000 | 6-1-22-23 | " | 1000 |
| 6-1-22-11 | 41 | 100 | 6-1-22-24 | " | 3000 |
| 6-1-22-12 | " | 200 | 6-1-22-25 | " | 6000 |
| 6-1-22-13 | " | 1000 | | | |

TABLE 6-6B

| Sample No. | Sensitivity | Image resolution | Contrast | Sample No. | Sensitivity | Image resolution | Contrast |
|---|---|---|---|---|---|---|---|
| 6-1-22-1 | ● | ◉ | x | 6-1-22-14 | ○ | ◉ | ○ |
| 6-1-22-2 | ◉ | ◉ | x | 6-1-22-15 | ◉ | ◉ | ◉ |
| 6-1-22-3 | ◉ | ◉ | x | 6-1-22-16 | x | x | x |
| 6-1-22-4 | ◉ | ◉ | x | 6-1-22-17 | x | x | x |
| 6-1-22-5 | ◉ | ● | x | 6-1-22-18 | ○ | ◉ | ○ |
| 6-1-22-6 | ● | ◉ | x | 6-1-22-19 | ○ | ◉ | ○ |
| 6-1-22-7 | ● | ● | x | 6-1-22-20 | ◉ | ◉ | ◉ |
| 6-1-22-8 | ◉ | ● | x | 6-1-22-21 | x | x | x |
| 6-1-22-9 | ● | ● | x | 6-1-22-22 | x | x | x |
| 6-1-22-10 | ● | ◉ | x | 6-1-22-23 | ○ | ● | ○ |
| 6-1-22-11 | x | x | x | 6-1-22-24 | ○ | ● | ○ |
| 6-1-22-12 | x | x | x | 6-1-22-25 | ◉ | ● | ● |
| 6-1-22-13 | ○ | ● | ○ | | | | |

TABLE 6-7A

| Sample No. | Built-up number of DA compound monomolecular film | Film thickness of layer containing AZ compound (Å) | Sample No. | Built-up number of DA compound monomolecular film | Film thickness of layer containing AZ compound (Å) |
|---|---|---|---|---|---|
| 6-1-23-1 | 1 | 100 | 6-1-23-14 | 41 | 3000 |
| 6-1-23-2 | " | 200 | 6-1-23-15 | " | 6000 |
| 6-1-23-3 | " | 1000 | 6-1-23-16 | 101 | 100 |
| 6-1-23-4 | " | 3000 | 6-1-23-17 | " | 200 |
| 6-1-23-5 | " | 6000 | 6-1-23-18 | " | 1000 |
| 6-1-23-6 | 7 | 100 | 6-1-23-19 | " | 3000 |
| 6-1-23-7 | " | 200 | 6-1-23-20 | " | 6000 |
| 6-1-23-8 | " | 1000 | 6-1-23-21 | 201 | 100 |
| 6-1-23-9 | " | 3000 | 6-1-23-22 | " | 200 |
| 6-1-23-10 | " | 6000 | 6-1-23-23 | " | 1000 |
| 6-1-23-11 | 41 | 100 | 6-1-23-24 | " | 3000 |
| 6-1-23-12 | " | 200 | 6-1-23-25 | " | 6000 |

TABLE 6-7A-continued

| Sample No. | Built-up number of DA compound monomolecular film | Film thickness of layer containing AZ compound (Å) | Sample No. | Built-up number of DA compound monomolecular film | Film thickness of layer containing AZ compound (Å) |
| --- | --- | --- | --- | --- | --- |
| 6-1-23-13 | " | 1000 | | | |

TABLE 6-7B

| Sample No. | Sensitivity | Image resolution | Contrast | Sample No. | Sensitivity | Image resolution | Contrast |
| --- | --- | --- | --- | --- | --- | --- | --- |
| 6-1-23-1  | ● | ● | x | 6-1-23-14 | ◉ | ◉ | ● |
| 6-1-23-2  | ● | ● | x | 6-1-23-15 | ◉ | ◉ | ◉ |
| 6-1-23-3  | ● | ● | x | 6-1-23-16 | x | x | x |
| 6-1-23-4  | ◉ | ◉ | x | 6-1-23-17 | x | x | x |
| 6-1-23-5  | ◉ | ◉ | x | 6-1-23-18 | o | ● | o |
| 6-1-23-6  | ◉ | ◉ | x | 6-1-23-19 | ● | ◉ | ● |
| 6-1-23-7  | ● | ◉ | x | 6-1-23-20 | ◉ | ◉ | ● |
| 6-1-23-8  | ◉ | ◉ | x | 6-1-23-21 | x | x | x |
| 6-1-23-9  | ● | ● | x | 6-1-23-22 | x | x | x |
| 6-1-23-10 | ● | ● | x | 6-1-23-23 | o | ◉ | o |
| 6-1-23-11 | o | ◉ | x | 6-1-23-24 | o | ● | o |
| 6-1-23-12 | o | ◉ | x | 6-1-23-25 | ◉ | ◉ | ◉ |
| 6-1-23-13 | o | ◉ | o | | | | |

EXAMPLE 7-1

The same experiments were conducted in the same manner as in Example 6-1 except for using 15 parts by weight of the pyrylium dye represented by the formula 2-1-5 in place of the AZ compound.

The evaluation results are shown in Table 7-1A.

EXAMPLES 7-2 TO 7-7

Examples 6-2 to 6-7 were repeated except that the AZ compound used in Examples 6-2 to 6-7 was replaced with the pyrylium dye represented by the formula 2-1-5.

The results of Examples 7-1 to 7-4 are shown in Table 7-1A. The results of Examples 7-5 to 7-7 are shown in Table 7-1B.

TABLE 7-1A

| Optical recording medium | Built-up number of monomolecular film | Sensitivity | Image resolution | Contrast |
| --- | --- | --- | --- | --- |
| Example 7-1 | 1   | ● | ◉ | x |
|             | 5   | ● | ◉ | x |
|             | 21  | ● | o | x |
|             | 41  | ◉ | o | o |
|             | 101 | ◉ | o | o |
|             | 201 | ◉ | o | o |
| Example 7-2 | 1   | ◉ | ● | x |
|             | 5   | ◉ | ● | x |
|             | 21  | ◉ | o | o |
|             | 41  | ◉ | ◉ | o |
|             | 101 | ◉ | ● | ◉ |
|             | 201 | ◉ | o | ● |
| Example 7-3 | 1   | ◉ | ● | x |
|             | 5   | ◉ | ● | x |
|             | 21  | ◉ | ● | ◉ |
|             | 41  | ◉ | ● | ◉ |
|             | 101 | ● | ● | ◉ |
|             | 201 | ● | o | ◉ |
| Example 7-4 | 1   | ◉ | ◉ | x |
|             | 5   | ● | ● | x |
|             | 21  | ● | ● | ◉ |
|             | 41  | ● | ● | ◉ |
|             | 101 | ● | ● | ◉ |
|             | 201 | ● | o | ◉ |

TABLE 7-1B

| Optical recording medium | Built-up number of monomolecular film | Sensitivity | Image resolution | Contrast |
| --- | --- | --- | --- | --- |
| Example 7-5 | 1   | ● | ● | x |
|             | 5   | ● | ◉ | o |
|             | 21  | ● | ◉ | ◉ |
|             | 41  | ◉ | ● | ◉ |
|             | 101 | ● | ● | ◉ |
|             | 201 | ◉ | o | ● |
| Example 7-6 | 1   | x | x | x |
|             | 5   | x | x | x |
|             | 21  | o | o | o |
|             | 41  | o | o | o |
|             | 101 | ◉ | ◉ | ◉ |
|             | 201 | ● | o | ◉ |
| Example 7-7 | 1   | x | x | x |
|             | 5   | x | x | x |
|             | 21  | x | x | x |
|             | 41  | o | o | o |
|             | 101 | o | o | o |
|             | 201 | o | o | o |

EXAMPLES 7-8 TO 7-14

As for the steps of optical recording and visualization of negative images, Examples 7-1 to 7-7 were repeated, and thereafter, each of the recording media was heated to about 80° C. to obtain the negative images in which the blue color of the background was changed to red color. For these negative images, evaluation was performed according to the same standards as in Example 7-1 to obtain the results shown in Table 7-2A and Table 7-2B.

TABLE 7-2A

| Optical recording medium | Built-up number of monomolecular film | Sensitivity | Image resolution | Contrast |
| --- | --- | --- | --- | --- |
| Example 7-8 | 1   | ● | ◉ | x |
|             | 5   | ◉ | ◉ | x |
|             | 21  | ◉ | o | x |
|             | 41  | ◉ | o | o |
|             | 201 | ◉ | o | o |
| Example    | 1   | ◉ | ● | x |

TABLE 7-2A-continued

| Optical recording medium | Built-up number of monomolecular film | Sensitivity | Image resolution | Contrast |
|---|---|---|---|---|
| 7-9 | 5 | ⊚ | ⊚ | x |
|  | 21 | ⊚ | o | o |
|  | 41 | ⊚ | ⊚ | o |
|  | 101 | ⊚ | ⊚ | ⊚ |
|  | 201 | ⊚ | o | ● |
| Example 7-10 | 1 | ⊚ | ● | x |
|  | 5 | ⊚ | ● | x |
|  | 21 | ⊚ | ⊚ | ● |
|  | 41 | ⊚ | ⊚ | ● |
|  | 101 | ⊚ | ⊚ | ● |
|  | 201 | ⊚ | o | ● |
| Example 7-11 | 1 | ⊚ | ● | x |
|  | 5 | ⊚ | ● | x |
|  | 21 | ⊚ | ⊚ | ● |
|  | 41 | ⊚ | ⊚ | ● |
|  | 101 | ● | ⊚ | ● |
|  | 201 | ● | o | ● |

TABLE 7-2B

| Optical recording medium | Built-up number of monomolecular film | Sensitivity | Image resolution | Contrast |
|---|---|---|---|---|
| Example 7-12 | 1 | ● | ● | x |
|  | 5 | ● | ● | o |
|  | 21 | ● | ● | ⊚ |
|  | 41 | ● | ⊚ | ● |
|  | 101 | ● | ⊚ | ⊚ |
|  | 201 | ⊚ | o | ⊚ |
| Example 7-13 | 1 | x | x | x |
|  | 5 | x | x | x |
|  | 21 | o | o | o |
|  | 41 | o | o | o |
|  | 101 | ● | ● | ⊚ |
|  | 201 | ⊚ | o | ⊚ |
| Example 7-14 | 1 | x | x | x |
|  | 5 | x | x | x |
|  | 21 | x | x | x |
|  | 41 | o | o | o |
|  | 101 | o | o | o |
|  | 201 | o | o | b |

EXAMPLE 7-15

According to the same procedure as in Example 7-4 except for using a diacetylene derivative compound represented by $C_8H_{17}$—C≡C—C≡C—$C_2H_4$—COOH in place of the diacetylene derivative compound represented by $C_{12}H_{25}$—C≡C—C≡C—$C_8H_{16}$—COOH, experiments were conducted in the same manner as in Example 7-4.

EXAMPLE 7-16 TO 7-19

According to the same procedure as in Example 7-15 except for using the pyrylium dyes represented by the formulae 2-1-6, 2-1-7, 2-1-14 and 2-1-16, respectively, in place of the pyrylium dye used in Example 7-15, experiments were conducted in the same manner as in Example 7-15.

The results of Examples 7-15 to 7-17 are shown in Table 7-3A, and those of Examples 7-18 and 7-19 in Table 7-3B.

TABLE 7-3A

| Optical recording medium | Built-up number of monomolecular film | Sensitivity | Image resolution | Contrast |
|---|---|---|---|---|
| Example 7-15 | 1 | ⊚ | ⊚ | x |
|  | 5 | ⊚ | ⊚ | x |
|  | 21 | ⊚ | ⊚ | ● |
|  | 41 | ⊚ | ⊚ | ● |
|  | 101 | ⊚ | ⊚ | ● |
|  | 201 | ⊚ | o | ● |
| Example 7-16 | 1 | ⊚ | ⊚ | x |
|  | 5 | ⊚ | ⊚ | x |
|  | 21 | ⊚ | ⊚ | ● |
|  | 41 | ● | ⊚ | ⊚ |
|  | 101 | ● | o | ● |
|  | 201 | ⊚ | o | ● |
| Example 7-17 | 1 | ⊚ | ⊚ | x |
|  | 5 | ⊚ | ⊚ | x |
|  | 21 | ● | ⊚ | ⊚ |
|  | 41 | ⊚ | ⊚ | ● |
|  | 101 | ⊚ | o | ⊚ |
|  | 201 | ⊚ | o | ● |

TABLE 73B

| Optical recording medium | Built-up number of monomolecular film | Sensitivity | Image resolution | Contrast |
|---|---|---|---|---|
| Example 7-18 | 1 | ⊚ | ● | x |
|  | 5 | ⊚ | ● | x |
|  | 21 | ⊚ | ● | o |
|  | 41 | ⊚ | ● | o |
|  | 101 | ⊚ | o | o |
|  | 201 | ● | o | o |
| Example 7-19 | 1 | ⊚ | ⊚ | x |
|  | 5 | ⊚ | ● | x |
|  | 21 | ⊚ | ● | o |
|  | 41 | ⊚ | ⊚ | o |
|  | 101 | ⊚ | o | o |
|  | 201 | ⊚ | o | o |

EXAMPLES 7-20 AND 7-21

The same experiments as in Examples 6-20 and 6-21 were conducted, respectively, except that the AZ compound was replaced with 10 part by weight of the pyrylium dye represented by the formula 2-1-5.

Samples employed in Examples 7-20 and 7-21 are shown in Table 7-4A and 7-5A, and the results shown in Table 7-4B and 7-5B, respectively.

TABLE 7-4A

| Sample No. | Built-up number of DA compound monomolecular film | Film thickness of layer containing pyrylium dye (Å) | Sample No. | Built-up number of DA compound monomolecular film | Film thickness of layer containing pyrylium dye (Å) |
|---|---|---|---|---|---|
| 7-1-20-1 | 1 | 100 | 7-1-20-14 | 41 | 3000 |
| 7-1-20-2 | " | 200 | 7-1-20-15 | " | 6000 |
| 7-1-20-3 | " | 1000 | 7-1-20-16 | 101 | 100 |
| 7-1-20-4 | " | 3000 | 7-1-20-17 | " | 200 |
| 7-1-20-5 | " | 6000 | 7-1-20-18 | " | 1000 |
| 7-1-20-6 | 7 | 100 | 7-1-20-19 | " | 3000 |
| 7-1-20-7 | " | 200 | 7-1-20-20 | " | 6000 |
| 7-1-20-8 | " | 1000 | 7-1-20-21 | 201 | 100 |
| 7-1-20-9 | " | 3000 | 7-1-20-22 | " | 200 |

TABLE 7-4A-continued

| Sample No. | Built-up number of DA compound monomolecular film | Film thickness of layer containing pyrylium dye (Å) | Sample No. | Built-up number of DA compound monomolecular film | Film thickness of layer containing pyrylium dye (Å) |
|---|---|---|---|---|---|
| 7-1-20-10 | " | 6000 | 7-1-20-23 | " | 1000 |
| 7-1-20-11 | 41 | 100 | 7-1-20-24 | " | 3000 |
| 7-1-20-12 | " | 200 | 7-1-20-25 | " | 6000 |
| 7-1-20-13 | " | 1000 | | | |

TABLE 7-4B

| Sample No. | Sensitivity | Image resolution | Contrast | Sample No. | Sensitivity | Image resolution | Contrast |
|---|---|---|---|---|---|---|---|
| 7-1-20-1 | ● | ● | x | 7-1-20-14 | ● | ● | ◉ |
| 7-1-20-2 | ● | ● | x | 7-1-20-15 | ● | ◉ | ◉ |
| 7-1-20-3 | ◉ | ◉ | x | 7-1-20-16 | x | x | x |
| 7-1-20-4 | ● | ● | x | 7-1-20-17 | x | x | x |
| 7-1-20-5 | ◉ | ◉ | x | 7-1-20-18 | ● | ◉ | ◉ |
| 7-1-20-6 | ● | ◉ | x | 7-1-20-19 | ● | ◉ | ● |
| 7-1-20-7 | ● | ◉ | x | 7-1-20-20 | ● | ◉ | ● |
| 7-1-20-8 | ◉ | ◉ | x | 7-1-20-21 | x | x | x |
| 7-1-20-9 | ● | ● | x | 7-1-20-22 | x | x | x |
| 7-1-20-10 | ● | ● | x | 7-1-20-23 | o | o | o |
| 7-1-20-11 | o | o | x | 7-1-20-24 | ● | ● | ● |
| 7-1-20-12 | o | o | x | 7-1-20-25 | ◉ | ● | ● |
| 7-1-20-13 | ● | ◉ | ● | | | | |

TABLE 7-5A

| Sample No. | Built-up number of DA compound monomolecular film | Film thickness of layer containing pyrylium dye (Å) | Sample No. | Built-up number of DA compound monomolecular film | Film thickness of layer containing pyrylium dye (Å) |
|---|---|---|---|---|---|
| 7-1-21-1 | 1 | 100 | 7-1-21-14 | 41 | 3000 |
| 7-1-21-2 | " | 200 | 7-1-21-15 | " | 6000 |
| 7-1-21-3 | " | 1000 | 7-1-21-16 | 101 | 100 |
| 7-1-21-4 | " | 3000 | 7-1-21-17 | " | 200 |
| 7-1-21-5 | " | 6000 | 7-1-21-18 | " | 1000 |
| 7-1-21-6 | 7 | 100 | 7-1-21-19 | " | 3000 |
| 7-1-21-7 | " | 200 | 7-1-21-20 | " | 6000 |
| 7-1-21-8 | " | 1000 | 7-1-21-21 | 201 | 100 |
| 7-1-21-9 | " | 3000 | 7-1-21-22 | " | 200 |
| 7-1-21-10 | " | 6000 | 7-1-21-23 | " | 1000 |
| 7-1-21-11 | 41 | 100 | 7-1-21-24 | " | 3000 |
| 7-1-21-12 | " | 200 | 7-1-21-25 | " | 6000 |
| 7-1-21-13 | " | 1000 | | | |

TABLE 7-5B

| Sample No. | Sensitivity | Image resolution | Contrast | Sample No. | Sensitivity | Image resolution | Contrast |
|---|---|---|---|---|---|---|---|
| 7-1-21-1 | ● | ● | x | 7-1-21-14 | ● | ● | ● |
| 7-1-21-2 | ● | ● | x | 7-1-21-15 | ● | ● | ● |
| 7-1-21-3 | ● | ● | x | 7-1-21-16 | x | x | x |
| 7-1-21-4 | ● | ● | x | 7-1-21-17 | o | o | o |
| 7-1-21-5 | ● | ● | x | 7-1-21-18 | ● | ● | ● |
| 7-1-21-6 | ● | ● | x | 7-1-21-19 | ● | ● | ● |
| 7-1-21-7 | ● | ● | x | 7-1-21-20 | ● | ● | ● |
| 7-1-21-8 | ● | ● | x | 7-1-21-21 | x | x | x |
| 7-1-21-9 | ● | ● | x | 7-1-21-22 | x | x | x |
| 7-1-21-10 | ● | ● | x | 7-1-21-23 | ● | ● | ● |
| 7-1-21-11 | o | o | x | 7-1-21-24 | ● | ● | ● |
| 7-1-21-12 | o | o | o | 7-1-21-25 | ● | ● | ● |
| 7-1-21-13 | ● | ● | ● | | | | |

EXAMPLES 7-22 AND 7-23

Example 7-21 was repeated except that the pyrylium dye was changed to those represented by the formulae 2-1-1 and 2-1-6, respectively.

Samples employed in Examples 7-22 and 7-23 are shown in Table 7-6A and 7-7A, and the results shown in Table 7-6B and 7-7B, respectively.

TABLE 7-6A

| Sample No. | Built-up number of DA compound monomolecular film | Film thickness of layer containing pyrylium dye (Å) | Sample No. | Built-up number of DA compound monomolecular film | Film thickness of layer containing pyrylium dye (Å) |
|---|---|---|---|---|---|
| 7-1-22-1 | 1 | 100 | 7-1-22-14 | 41 | 3000 |
| 7-1-22-2 | " | 200 | 7-1-22-15 | " | 6000 |
| 7-1-22-3 | " | 1000 | 7-1-22-16 | 101 | 100 |
| 7-1-22-4 | " | 3000 | 7-1-22-17 | " | 200 |
| 7-1-22-5 | " | 6000 | 7-1-22-18 | " | 1000 |
| 7-1-22-6 | 7 | 100 | 7-1-22-19 | " | 3000 |
| 7-1-22-7 | " | 200 | 7-1-22-20 | " | 6000 |
| 7-1-22-8 | " | 1000 | 7-1-22-21 | 201 | 100 |
| 7-1-22-9 | " | 3000 | 7-1-22-22 | " | 200 |
| 7-1-22-10 | " | 6000 | 7-1-22-23 | " | 1000 |
| 7-1-22-11 | 41 | 100 | 7-1-22-24 | " | 3000 |
| 7-1-22-12 | " | 200 | 7-1-22-25 | " | 6000 |
| 7-1-22-13 | " | 1000 | | | |

TABLE 7-6B

| Sample No. | Sensitivity | Image resolution | Contrast | Sample No. | Sensitivity | Image resolution | Contrast |
|---|---|---|---|---|---|---|---|
| 7-1-22-1 | ⊚ | ⊚ | x | 7-1-22-14 | ○ | ○ | ○ |
| 7-1-22-2 | ⊚ | ⊚ | x | 7-1-22-15 | ⊚ | ⊚ | ⊚ |
| 7-1-22-3 | ⊚ | ⊚ | x | 7-1-22-16 | x | x | x |
| 7-1-22-4 | ⊚ | ⊚ | x | 7-1-22-17 | x | x | x |
| 7-1-22-5 | ● | ● | x | 7-1-22-18 | ○ | ○ | ○ |
| 7-1-22-6 | ⊚ | ⊚ | x | 7-1-22-19 | ○ | ○ | ○ |
| 7-1-22-7 | ⊚ | ⊚ | x | 7-1-22-20 | ⊚ | ⊚ | ⊚ |
| 7-1-22-8 | ⊚ | ⊚ | x | 7-1-22-21 | x | x | x |
| 7-1-22-9 | ⊚ | ● | x | 7-1-22-22 | x | x | x |
| 7-1-22-10 | ⊚ | ⊚ | x | 7-1-22-23 | ○ | ○ | ○ |
| 7-1-22-11 | x | x | x | 7-1-22-24 | ○ | ○ | ○ |
| 7-1-22-12 | x | x | x | 7-1-22-25 | | | |
| 7-1-22-13 | ○ | ○ | ○ | | | | |

TABLE 7-7A

| Sample No. | Built-up number of DA compound monomolecular film | Film thickness of layer containing pyrylium dye (Å) | Sample No. | Built-up number of DA compound monomolecular film | Film thickness of layer containing pyrylium dye (Å) |
|---|---|---|---|---|---|
| 7-1-23-1 | 1 | 100 | 7-1-23-14 | 41 | 3000 |
| 7-1-23-2 | " | 200 | 7-1-23-15 | " | 6000 |
| 7-1-23-3 | " | 1000 | 7-1-23-16 | 101 | 100 |
| 7-1-23-4 | " | 3000 | 7-1-23-17 | " | 200 |
| 7-1-23-5 | " | 6000 | 7-1-23-18 | " | 1000 |
| 7-1-23-6 | 7 | 100 | 7-1-23-19 | " | 3000 |
| 7-1-23-7 | " | 200 | 7-1-23-20 | " | 6000 |
| 7-1-23-8 | " | 1000 | 7-1-23-21 | 201 | 100 |
| 7-1-23-9 | " | 3000 | 7-1-23-22 | " | 200 |
| 7-1-23-10 | " | 6000 | 7-1-23-23 | " | 1000 |
| 7-1-23-11 | 41 | 100 | 7-1-23-24 | " | 3000 |
| 7-1-23-12 | " | 200 | 7-1-23-25 | " | 6000 |
| 7-1-23-13 | " | 1000 | | | |

TABLE 7-7B

| Sample No. | Sensitivity | Image resolution | Contrast | Sample No. | Sensitivity | Image resolution | Contrast |
|---|---|---|---|---|---|---|---|
| 7-1-23-1 | ⊚ | ⊚ | x | 7-1-23-14 | ⊚ | ⊚ | ⊚ |
| 7-1-23-2 | ● | ⊚ | x | 7-1-23-15 | ⊚ | ⊚ | ⊚ |
| 7-1-23-3 | ⊚ | ⊚ | x | 7-1-23-16 | x | x | x |
| 7-1-23-4 | ⊚ | ⊚ | x | 7-1-23-17 | x | x | x |
| 7-1-23-5 | ⊚ | ⊚ | x | 7-1-23-18 | ○ | ⊚ | ○ |
| 7-1-23-6 | ● | ⊚ | x | 7-1-23-19 | ● | ⊚ | ⊚ |
| 7-1-23-7 | ⊚ | ⊚ | x | 7-1-23-20 | ● | ⊚ | ● |
| 7-1-23-8 | ⊚ | ⊚ | x | 7-1-23-21 | x | x | x |
| 7-1-23-9 | ⊚ | ⊚ | x | 7-1-23-22 | x | x | x |
| 7-1-23-10 | ⊚ | ⊚ | x | 7-1-23-23 | ○ | ○ | ○ |
| 7-1-23-11 | ○ | ○ | x | 7-1-23-24 | ○ | ○ | ○ |
| 7-1-23-12 | ○ | ○ | x | 7-1-23-25 | ⊚ | ⊚ | ⊚ |
| 7-1-23-13 | ● | ○ | ○ | | | | |

EXAMPLE 8-1

The same experiments were conducted in the same manner as in Example 6-1 except for using 15 parts by weight of the croconic methine dye represented by the formula 4-1-6 in place of the AZ compound.
The evaluation results are shown in Table 8-1A.

EXAMPLES 8-2 TO 8-7

Examples 6-2 to 6-7 were repeated except that the AZ compound used in Examples 6-2 to 6-7 was replaced with the croconic methine dye represented by the formula 4-1-6.
The results of Examples 8-1 to 8-4 are shown in Table 8-1A.
The results of Examples 8-5 to 8-7 are shown in Table 8-1B.

TABLE 8-1A

| Optical recording medium | Built-up number of monomolecular film | Sensitivity | Image resolution | Contrast |
|---|---|---|---|---|
| Example 8-1 | 1 | ◎ | ○ | x |
|  | 5 | ◎ | ○ | x |
|  | 21 | ◎ | ○ | x |
|  | 41 | ◎ | ○ | x |
|  | 101 | ◎ | x | ○ |
|  | 201 | ● | x | ○ |
| Example 8-2 | 1 | ◎ | ○ | x |
|  | 5 | ◎ | ○ | x |
|  | 21 | ◎ | ○ | x |
|  | 41 | ◎ | ○ | ○ |
|  | 101 | ◎ | ○ | ○ |
|  | 201 | ◎ | x | ○ |
| Example 8-3 | 1 | ◎ | ● | x |
|  | 5 | ◎ | ● | x |
|  | 21 | ◎ | ● | ○ |
|  | 41 | ◎ | ● | ● |
|  | 101 | ◎ | ● | ● |
|  | 201 | ◎ | ● | ● |
| Example 8-4 | 1 | ● | ● | x |
|  | 5 | ● | ● | x |
|  | 21 | ● | ● | ● |
|  | 41 | ● | ● | ● |
|  | 101 | ● | ● | ● |
|  | 201 | ● | ● | ● |

TABLE 8-1B

| Optical recording medium | Built-up number of monomolecular film | Sensitivity | Image resolution | Contrast |
|---|---|---|---|---|
| Example 8-5 | 1 | ● | ◎ | x |
|  | 5 | ● | ◎ | x |
|  | 21 | ● | ◎ | ● |
|  | 41 | ● | ● | ● |
|  | 101 | ● | ● | ◎ |
|  | 201 | ● | ● | ◎ |
| Example 8-6 | 1 | x | ● | x |
|  | 5 | x | ● | x |
|  | 21 | x | ○ | ○ |
|  | 41 | ○ | ○ | ○ |
|  | 101 | ○ | ○ | ○ |
|  | 201 | ● | ○ | ○ |
| Example 8-7 | 1 | x | ◎ | x |
|  | 5 | x | ◎ | x |
|  | 21 | x | ○ | x |
|  | 41 | x | ○ | ○ |
|  | 101 | ○ | ○ | ○ |
|  | 201 | ○ | ○ | ○ |

EXAMPLES 8-8 to 8-14

As for the steps of optical recording and visualization of negative images, Examples 8-1 to 8-7 were repeated, and thereafter, each of the recording media was heated to about 80° C. to obtain the negative images in which the blue color of the background was changed to red color. For these negative images, evaluation was performed according to the same standards as in Example 8-1 to obtain the results shown in Table 8-2A and Table 8-2B.

TABLE 8-2A

| Optical recording medium | Built-up number of monomolecular film | Sensitivity | Image resolution | Contrast |
|---|---|---|---|---|
| Example 8-8 | 1 | ● | ○ | x |
|  | 5 | ● | ○ | x |
|  | 21 | ◎ | ○ | x |
|  | 41 | ● | ○ | x |
|  | 101 | ● | x | ○ |
|  | 201 | ◎ | x | ○ |
| Example 8-9 | 1 | ◎ | ○ | x |
|  | 5 | ● | ○ | x |
|  | 21 | ● | ○ | x |
|  | 41 | ● | ○ | ○ |
|  | 101 | ◎ | ○ | ○ |
|  | 201 | ◎ | x | ○ |
| Example 8-10 | 1 | ● | ● | x |
|  | 5 | ● | ◎ | x |
|  | 21 | ● | ◎ | ○ |
|  | 41 | ● | ◎ | ● |
|  | 101 | ● | ◎ | ● |
|  | 201 | ◎ | ◎ | ● |
| Example 8-11 | 1 | ● | ◎ | x |
|  | 5 | ● | ◎ | x |
|  | 21 | ● | ◎ | ● |
|  | 41 | ● | ◎ | ● |
|  | 101 | ● | ◎ | ● |
|  | 201 | ● | ◎ | ● |

TABLE 8-2B

| Optical recording medium | Built-up number of monomolecular film | Sensitivity | Image resolution | Contrast |
|---|---|---|---|---|
| Example 8-12 | 1 | ◎ | ◎ | x |
|  | 5 | ◎ | ◎ | x |
|  | 21 | ◎ | ◎ | ● |
|  | 41 | ◎ | ◎ | ● |
|  | 101 | ◎ | ◎ | ● |
|  | 201 | ◎ | ● | ◎ |
| Example 8-13 | 1 | ◎ | ◎ | x |
|  | 5 | ◎ | ◎ | x |
|  | 21 | x | ○ | ○ |
|  | 41 | ○ | ○ | ○ |
|  | 101 | ○ | ○ | ○ |
|  | 201 | ● | ○ | ○ |
| Example 8-14 | 1 | x | ◎ | x |
|  | 5 | x | ◎ | x |
|  | 21 | x | ○ | x |
|  | 41 | x | ○ | ○ |
|  | 101 | ○ | ○ | ○ |
|  | 201 | ○ | ○ | ○ |

EXAMPLE 8-15

According to the same procedure as in Example 8-4 except for using a diacetylene derivative compound represented by $C_8H_{17}-C{\equiv}C-C{\equiv}C-C_2H_4-COOH$ in place of the diacetylene derivative compound represented by $C_{12}H_{25}-C{\equiv}C-C{\equiv}C-C_8H_{16}-COOH$, experiments were conducted in the same manner as in Example 8-4. The results are shown in Table 8-3A.

EXAMPLE 8-16 TO 8-19

According to the same procedure as in Example 8-15 except for using the croconic methine dye represented by the formulae 4-1-14, 4-1-24, 4-1-35 and 4-1-39, respectively, in place of the croconic methine dye represented by the formula 4-1-6, experiments were conducted in the same manner as in Example 8-15.

The results are shown in Tables 8-3A and 8-3B.

TABLE 8-3A

| Optical recording medium | Built-up number of monomolecular film | Sensitivity | Image resolution | Contrast |
|---|---|---|---|---|
| Example 8-15 | 1 | ⊚ | ● | x |
|  | 5 | ⊚ | ● | x |
|  | 21 | ⊚ | ● | ⊚ |
|  | 41 | ⊚ | ● | ⊚ |
|  | 101 | ⊚ | ⊚ | ⊚ |
|  | 201 | ● | ⊚ | ● |
| Example 8-16 | 1 | ● | ⊚ | x |
|  | 5 | ⊚ | ⊚ | x |
|  | 21 | ⊚ | ● | ● |
|  | 41 | ⊚ | ● | ● |
|  | 101 | ⊚ | ⊚ | ⊚ |
|  | 201 | ⊚ | ● | ⊚ |
| Example 8-17 | 1 | ○ | ○ | x |
|  | 5 | ○ | ○ | x |
|  | 21 | ○ | ○ | ○ |
|  | 41 | ○ | ○ | ○ |
|  | 101 | ⊚ | ⊚ | ⊚ |
|  | 201 | ● | ⊚ | ● |

TABLE 8-3B

| Optical recording medium | Built-up number of monomolecular film | Sensitivity | Image resolution | Contrast |
|---|---|---|---|---|
| Example 8-18 | 1 | ⊚ | ⊚ | x |
|  | 5 | ⊚ | ● | x |
|  | 21 | ● | ● | ● |
|  | 41 | ● | ● | ● |
|  | 101 | ⊚ | ⊚ | ⊚ |
|  | 201 | ⊚ | ○ | ● |
| Example 8-19 | 1 | ○ | ○ | x |
|  | 5 | ○ | ○ | x |
|  | 21 | ○ | ○ | x |
|  | 41 | ⊚ | ○ | ● |
|  | 101 | ⊚ | ○ | ⊚ |
|  | 201 | ● | ○ | ⊚ |

EXAMPLES 8-20 AND 8-21

The same experiments as in Examples 6-20 and 6-21 were conducted, respectively, except that the AZ compound was replaced with 10 parts by weight of the croconic methine dye represented by the formula 4-1-6.

Samples employed in Examples 8-20 and 8-21 are shown in Table 8-4A and 8-5A, and the results shown in Table 8-4B and 8-5B, respectively.

TABLE 8-4A

| Sample No. | Built-up number of DA compound monomolecular film | Film thickness of layer containing croconic methine dye (Å) |
|---|---|---|
| 8-1-20-1 | 1 | 100 |
| 8-1-20-2 | " | 200 |
| 8-1-20-3 | " | 1000 |
| 8-1-20-4 | " | 3000 |
| 8-1-20-5 | " | 6000 |
| 8-1-20-6 | 7 | 100 |
| 8-1-20-7 | " | 200 |
| 8-1-20-8 | " | 1000 |
| 8-1-20-9 | " | 3000 |
| 8-1-20-10 | " | 6000 |
| 8-1-20-11 | 41 | 100 |
| 8-1-20-12 | " | 200 |
| 8-1-20-13 | " | 1000 |
| 8-1-20-14 | " | 3000 |
| 8-1-20-15 | " | 6000 |
| 8-1-20-16 | 101 | 100 |
| 8-1-20-17 | " | 200 |
| 8-1-20-18 | " | 1000 |
| 8-1-20-19 | " | 3000 |
| 8-1-20-20 | " | 6000 |
| 8-1-20-21 | 201 | 100 |
| 8-1-20-22 | " | 200 |
| 8-1-20-23 | " | 1000 |
| 8-1-20-24 | " | 3000 |
| 8-1-20-25 | " | 6000 |

TABLE 8-4B

| Sample No. | Sensitivity | Image resolution | Contrast |
|---|---|---|---|
| 8-1-20-1 | ⊚ | ⊚ | x |
| 8-1-20-2 | ⊚ | ⊚ | x |
| 8-1-20-3 | ⊚ | ⊚ | x |
| 8-1-20-4 | ⊚ | ⊚ | x |
| 8-1-20-5 | ⊚ | ⊚ | x |
| 8-1-20-6 | ⊚ | ⊚ | x |
| 8-1-20-7 | ⊚ | ⊚ | x |
| 8-1-20-8 | ⊚ | ⊚ | x |
| 8-1-20-9 | ⊚ | ⊚ | x |
| 8-1-20-10 | ⊚ | ● | x |
| 8-1-20-11 | ○ | ○ | x |
| 8-1-20-12 | ○ | ○ | x |
| 8-1-20-13 | ⊚ | ⊚ | ○ |
| 8-1-20-14 | ⊚ | ⊚ | ● |
| 8-1-20-15 | ⊚ | ⊚ | ● |
| 8-1-20-16 | x | x | x |
| 8-1-20-17 | x | x | x |
| 8-1-20-18 | ⊚ | ⊚ | ● |
| 8-1-20-19 | ⊚ | ⊚ | ⊚ |
| 8-1-20-20 | ⊚ | ⊚ | ⊚ |
| 8-1-20-21 | x | x | x |
| 8-1-20-22 | x | x | x |
| 8-1-20-23 | ○ | ○ | ○ |
| 8-1-20-24 | ⊚ | ⊚ | ⊚ |
| 8-1-20-25 | ⊚ | ⊚ | ⊚ |

TABLE 8-5A

| Sample No. | Built-up number of DA compound monomolecular film | Film thickness of layer containing croconic methine dye (Å) |
|---|---|---|
| 8-1-21-1 | 1 | 100 |
| 8-1-21-2 | " | 200 |
| 8-1-21-3 | " | 1000 |
| 8-1-21-4 | " | 3000 |
| 8-1-21-5 | " | 6000 |
| 8-1-21-6 | 7 | 100 |
| 8-1-21-7 | " | 200 |
| 8-1-21-8 | " | 1000 |
| 8-1-21-9 | " | 3000 |
| 8-1-21-10 | " | 6000 |
| 8-1-21-11 | 41 | 100 |
| 8-1-21-12 | " | 200 |
| 8-1-21-13 | " | 1000 |
| 8-1-21-14 | " | 3000 |
| 8-1-21-15 | " | 6000 |
| 8-1-21-16 | 101 | 100 |
| 8-1-21-17 | " | 200 |
| 8-1-21-18 | " | 1000 |
| 8-1-21-19 | " | 3000 |
| 8-1-21-20 | " | 6000 |
| 8-1-21-21 | 201 | 100 |
| 8-1-21-22 | " | 200 |
| 8-1-21-23 | " | 1000 |
| 8-1-21-24 | " | 3000 |
| 8-1-21-25 | " | 6000 |

TABLE 8-5B

| Sample No. | Sensitivity | Image resolution | Contrast |
|---|---|---|---|
| 8-1-21-1 | ⊚ | ⊚ | x |
| 8-1-21-2 | ⊚ | ⊚ | x |
| 8-1-21-3 | ⊚ | ⊚ | x |
| 8-1-21-4 | ⊚ | ⊚ | x |
| 8-1-21-5 | ⊚ | ⊚ | x |
| 8-1-21-6 | ⊚ | ⊚ | x |
| 8-1-21-7 | ⊚ | ⊚ | x |
| 8-1-21-8 | ⊚ | ⊚ | x |
| 8-1-21-9 | ⊚ | ⊚ | x |
| 8-1-21-10 | ⊚ | ⊚ | x |
| 8-1-21-11 | o | o | x |
| 8-1-21-12 | o | o | x |
| 8-1-21-13 | ⊚ | o | o |
| 8-1-21-14 | ⊚ | ⊚ | ⊚ |
| 8-1-21-15 | ⊚ | ⊚ | ⊚ |
| 8-1-21-16 | x | x | x |
| 8-1-21-17 | x | x | x |
| 8-1-21-18 | o | ⊚ | o |
| 8-1-21-19 | ⊚ | ⊚ | ⊚ |
| 8-1-21-20 | ⊚ | ⊚ | ⊚ |
| 8-1-21-21 | x | x | x |
| 8-1-21-22 | x | x | x |
| 8-1-21-23 | o | o | o |
| 8-1-21-24 | o | o | o |
| 8-1-21-25 | ⊚ | ⊚ | ⊚ |

EXAMPLES 8-22 AND 8-23

Example 8-21 was repeated except that the croconic methine dye was changed to those represented by the formulae 4-1-2 and 4-129, respectively.

Samples employed in Examples 8-22 and 8-23 are shown in Table 8-6A and 8-7A, and the results shown in Table 8-6B and 8-7B, respectively.

TABLE 8-6A

| Sample No. | Built-up number of DA compound monomolecular film | Film thickness of layer containing croconic methine dye (Å) |
|---|---|---|
| 8-1-22-1 | 1 | 100 |
| 8-1-22-2 | " | 200 |
| 8-1-22-3 | " | 1000 |
| 8-1-22-4 | " | 3000 |
| 8-1-22-5 | " | 6000 |
| 8-1-22-6 | 7 | 100 |
| 8-1-22-7 | " | 200 |
| 8-1-22-8 | " | 1000 |
| 8-1-22-9 | " | 3000 |
| 8-1-22-10 | " | 6000 |
| 8-1-22-11 | 41 | 100 |
| 8-1-22-12 | " | 200 |
| 8-1-22-13 | " | 1000 |
| 8-1-22-14 | " | 3000 |
| 8-1-22-15 | " | 6000 |
| 8-1-22-16 | 101 | 100 |
| 8-1-22-17 | " | 200 |
| 8-1-22-18 | " | 1000 |
| 8-1-22-19 | " | 3000 |
| 8-1-22-20 | " | 6000 |
| 8-1-22-21 | 201 | 100 |
| 8-1-22-22 | " | 200 |
| 8-1-22-23 | " | 1000 |
| 8-1-22-24 | " | 3000 |
| 8-1-22-25 | " | 6000 |

TABLE 8-6B

| Sample No. | Sensitivity | Image resolution | Contrast |
|---|---|---|---|
| 8-1-22-1 | ⊚ | ⊚ | x |
| 8-1-22-2 | ⊚ | ⊚ | x |
| 8-1-22-3 | ⊚ | ⊚ | x |
| 8-1-22-4 | ⊚ | ⊚ | x |
| 8-1-22-5 | ⊚ | ⊚ | x |
| 8-1-22-6 | ⊚ | ⊚ | x |
| 8-1-22-7 | ⊚ | ⊚ | x |
| 8-1-22-8 | ⊚ | ⊚ | x |
| 8-1-22-9 | ⊚ | ⊚ | x |
| 8-1-22-10 | ⊚ | ⊚ | x |
| 8-1-22-11 | x | x | x |
| 8-1-22-12 | o | o | o |
| 8-1-22-13 | o | o | o |
| 8-1-22-14 | o | o | o |
| 8-1-22-15 | ⊚ | ⊚ | ⊚ |
| 8-1-22-16 | x | x | x |
| 8-1-22-17 | x | x | x |
| 8-1-22-18 | o | o | o |
| 8-1-22-19 | o | o | o |
| 8-1-22-20 | ⊚ | ⊚ | ⊚ |
| 8-1-22-21 | x | x | x |
| 8-1-22-22 | x | x | x |
| 8-1-22-23 | o | o | o |
| 8-1-22-24 | o | o | o |
| 8-1-22-25 | ⊚ | ⊚ | ⊚ |

TABLE 8-7A

| Sample No. | Built-up number of DA compound monomolecular film | Film thickness of layer containing croconic methine dye (Å) |
|---|---|---|
| 8-1-23-1 | 1 | 100 |
| 8-1-23-2 | " | 200 |
| 8-1-23-3 | " | 1000 |
| 8-1-23-4 | " | 3000 |
| 8-1-23-5 | " | 6000 |
| 8-1-23-6 | 7 | 100 |
| 8-1-23-7 | " | 200 |
| 8-1-23-8 | " | 1000 |
| 8-1-23-9 | " | 3000 |
| 8-1-23-10 | " | 6000 |
| 8-1-23-11 | 41 | 100 |
| 8-1-23-12 | " | 200 |
| 8-1-23-13 | " | 1000 |
| 8-1-23-14 | " | 3000 |
| 8-1-23-15 | " | 6000 |
| 8-1-23-16 | 101 | 100 |
| 8-1-23-17 | " | 200 |
| 8-1-23-18 | " | 1000 |
| 8-1-23-19 | " | 3000 |
| 8-1-23-20 | " | 6000 |
| 8-1-23-21 | 201 | 100 |
| 8-1-23-22 | " | 200 |
| 8-1-23-23 | " | 1000 |
| 8-1-23-24 | " | 3000 |
| 8-1-23-25 | " | 6000 |

TABLE 8-7B

| Sample No. | Sensitivity | Image resolution | Contrast |
|---|---|---|---|
| 8-1-23-1 | ⊚ | ⊚ | x |
| 8-1-23-2 | ⊚ | ⊚ | x |
| 8-1-23-3 | ⊚ | ⊚ | x |
| 8-1-23-4 | ⊚ | ⊚ | x |
| 8-1-23-5 | ⊚ | ⊚ | x |
| 8-1-23-6 | ⊚ | ⊚ | x |
| 8-1-23-7 | ⊚ | ⊚ | x |
| 8-1-23-8 | ⊚ | ⊚ | x |
| 8-1-23-9 | ⊚ | ⊚ | x |
| 8-1-23-10 | ⊚ | ⊚ | x |
| 8-1-23-11 | o | o | x |
| 8-1-23-12 | o | o | o |
| 8-1-23-13 | ⊚ | ⊚ | ⊚ |
| 8-1-23-14 | ⊚ | ⊚ | ⊚ |
| 8-1-23-15 | ⊚ | ⊚ | ⊚ |
| 8-1-23-16 | x | x | x |
| 8-1-23-17 | o | o | o |
| 8-1-23-18 | ⊚ | ⊚ | ⊚ |
| 8-1-23-19 | ⊚ | ⊚ | ⊚ |
| 8-1-23-20 | ⊚ | ⊚ | ⊚ |
| 8-1-23-21 | x | x | x |
| 8-1-23-22 | x | x | x |

TABLE 8-7B-continued

| Sample No. | Sensitivity | Image resolution | Contrast |
|---|---|---|---|
| 8-1-23-23 | ⊚ | ⊚ | ⊚ |
| 8-1-23-24 | ● | ⊚ | ⊚ |
| 8-1-23-25 | ⊚ | ⊚ | ● |

EXAMPLE 9-1

The same experiments were conducted in the same manner as in Example 6-1 except for using 15 parts by weight of the diene compound salt represented by the formula 3-1-1 in place in the AZ compound.

The evaluation results are shown in Table 9-1A.

EXAMPLE 9-2 TO 9-7

Examples 6-2 tp 6-7 were repeated except that the AZ compound used in Examples 6-2 to 6-7 was replaced with the diene compound salt represented by the formula 3-1-1.

The results of Examples 9-1 to 9-4 are shown in Table 9-1A.

The results of Examples 9-5 to 9-7 are shown in Table 9-1B.

TABLE 9-1A

| Optical recording medium | Built-up number of monomolecular film | Sensitivity | Image resolution | Contrast |
|---|---|---|---|---|
| Example 9-1 | 1 | ● | o | x |
|  | 5 | ● | o | x |
|  | 21 | ● | o | x |
|  | 41 | ⊚ | o | x |
|  | 101 | ● | o | o |
|  | 201 | ● | o | o |
| Example 9-2 | 1 | ● | o | x |
|  | 5 | ● | o | x |
|  | 21 | ● | o | x |
|  | 41 | ● | o | o |
|  | 101 | ● | o | o |
|  | 201 | ● | o | o |
| Example 9-3 | 1 | ● | ● | x |
|  | 5 | ● | ● | x |
|  | 21 | ⊚ | ● | o |
|  | 41 | ● | ● | ● |
|  | 101 | ● | ● | ⊚ |
|  | 201 | ● | ● | ● |
| Example 9-4 | 1 | ● | ● | x |
|  | 5 | ● | ● | x |
|  | 21 | ● | ● | ● |
|  | 41 | ● | ● | ● |
|  | 101 | ● | ● | ⊚ |
|  | 201 | ● | ● | ● |

TABLE 9-1B

| Optical recording medium | Built-up number of monomolecular film | Sensitivity | Image resolution | Contrast |
|---|---|---|---|---|
| Example 9-5 | 1 | ⊚ | ● | x |
|  | 5 | ● | ● | x |
|  | 21 | ● | ● | ● |
|  | 41 | ● | ● | ● |
|  | 101 | ● | ● | ● |
|  | 201 | ⊚ | ● | ● |
| Example 9-6 | 1 | x | ● | x |
|  | 5 | x | ● | x |
|  | 21 | o | o | o |
|  | 41 | o | o | o |
|  | 101 | ⊚ | o | o |
|  | 201 | ● | o | o |
| Example 9-7 | 1 | x | ⊚ | x |
|  | 5 | x | ⊚ | x |

TABLE 9-1B-continued

| Optical recording medium | Built-up number of monomolecular film | Sensitivity | Image resolution | Contrast |
|---|---|---|---|---|
|  | 21 | x | o | x |
|  | 41 | o | o | o |
|  | 101 | o | o | o |
|  | 201 | o | o | o |

EXAMPLES 9-8 TO 9-14

As for the steps of optical recording and visualization of negative images, Examples 9-1 to 9-7 were repeated, and thereafter, each of the recording media was heated to about 80° C. to obtain the negative images in which the blue color of the background was changed to red color. For these negative images, evaluation was performed according to the same standards as in Example 9-1 to obtain the results shown in Table 9-2A and Table 9-2B.

TABLE 9-2A

| Optical recording medium | Built-up number of monomolecular film | Sensitivity | Image resolution | Contrast |
|---|---|---|---|---|
| Example 9-8 | 1 | ● | o | x |
|  | 5 | ● | o | x |
|  | 21 | ● | o | x |
|  | 41 | ● | o | x |
|  | 101 | ● | o | o |
|  | 201 | ● | o | o |
| Example 9-9 | 1 | ⊚ | o | x |
|  | 5 | ● | o | x |
|  | 21 | ● | o | x |
|  | 41 | ● | o | o |
|  | 101 | ● | o | o |
|  | 201 | ● | o | o |
| Example 9-10 | 1 | ⊚ | ● | x |
|  | 5 | ● | ● | x |
|  | 21 | ● | ● | o |
|  | 41 | ● | ● | ⊚ |
|  | 101 | ⊚ | ● | ⊚ |
|  | 201 | ● | ● | ⊚ |
| Example 9-11 | 1 | ● | ● | x |
|  | 5 | ● | ● | x |
|  | 21 | ● | ● | ⊚ |
|  | 41 | ● | ● | ⊚ |
|  | 101 | ● | ⊚ | ● |
|  | 201 | ● | ● | ● |

TABLE 9-2B

| Optical recording medium | Built-up number of monomolecular film | Sensitivity | Image resolution | Contrast |
|---|---|---|---|---|
| Example 9-12 | 1 | ⊚ | ● | x |
|  | 5 | ● | ● | x |
|  | 21 | ● | ● | ⊚ |
|  | 41 | ● | ● | ● |
|  | 101 | ● | ● | ● |
|  | 201 | ● | ● | ● |
| Example 9-13 | 1 | x | ● | x |
|  | 5 | x | ● | x |
|  | 21 | o | o | o |
|  | 41 | o | o | o |
|  | 101 | ⊚ | o | o |
|  | 201 | ⊚ | o | o |
| Example 9-14 | 1 | x | ⊚ | x |
|  | 5 | x | ● | x |
|  | 21 | x | o | x |
|  | 41 | o | o | o |
|  | 101 | o | o | o |

TABLE 9-2B-continued

| Optical recording medium | Built-up number of monomolecular film | Sensi- tivity | Image resolution | Contrast |
|---|---|---|---|---|
| | 201 | o | o | o |

EXAMPLE 9-15

According to the same procedure as in Example 9-4 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$, experiments were conducted in the same manner as in Examples 9-4. The results are shown in Table 9-3A.

EXAMPLE 9-16 TO 9-20

According to the same procedure as in Example 9-15 except for using the diene compound salts represented by the formulae 3-1-3, 3-1-8, 3-1-12, 3-1-15 and 3-1-20, respectively, in place of the diene compound salt represented by the formula 3-1-1, experiments were conducted in the same manner as in Example 9-15.

The results are shown in Tables 9-3A and 9-3B.

TABLE 9-3A

| Optical recording medium | Built-up number of monomolecular film | Sensi- tivity | Image resolution | Contrast |
|---|---|---|---|---|
| Example 9-15 | 1 | ● | ◉ | x |
| | 5 | ● | ◉ | x |
| | 21 | ◉ | ● | ◉ |
| | 41 | ◉ | ● | ● |
| | 101 | ◉ | o | ● |
| | 201 | ● | o | ◉ |
| Example 9-16 | 1 | ◉ | ◉ | x |
| | 5 | ◉ | ● | x |
| | 21 | ◉ | ● | ◉ |
| | 41 | ● | ● | ● |
| | 101 | ◉ | ◉ | ● |
| | 201 | ◉ | o | ● |

TABLE 9-3A-continued

| Optical recording medium | Built-up number of monomolecular film | Sensi- tivity | Image resolution | Contrast |
|---|---|---|---|---|
| Example 9-17 | 1 | ◉ | ◉ | x |
| | 5 | ● | ◉ | x |
| | 21 | ◉ | ● | ◉ |
| | 41 | ● | ● | ● |
| | 101 | ● | ◉ | ● |
| | 201 | ◉ | ◉ | ● |

TABLE 9-3B

| Optical recording medium | Built-up number of monomolecular film | Sensi- tivity | Image resolution | Contrast |
|---|---|---|---|---|
| Example 9-18 | 1 | o | o | x |
| | 5 | o | o | x |
| | 21 | o | o | o |
| | 41 | o | o | ◉ |
| | 101 | ◉ | o | ◉ |
| | 201 | ● | o | ◉ |
| Example 9-19 | 1 | ◉ | ◉ | x |
| | 5 | ◉ | ◉ | x |
| | 21 | ◉ | ● | ◉ |
| | 41 | ● | ● | ◉ |
| | 101 | ● | ● | ◉ |
| | 201 | ◉ | ◉ | ◉ |
| Example 9-20 | 1 | ● | ● | x |
| | 5 | ● | ● | x |
| | 21 | ● | ◉ | ◉ |
| | 41 | ● | ● | ● |
| | 101 | ● | ● | ● |
| | 201 | ◉ | ◉ | ● |

EXAMPLES 9-21 AND 9-22

The same experiments as in Examples 6-20 and 6-21 were conducted, respectively, except that the AZ compound was replaced with 10 parts by weight of the diene compound salt represented by the formula 3-1-1.

Samples employed in Examples 9-21 and 9-22 are shown in Table 9-4A and 9-5A, and the results shown in Table 9-4B and 9-5B, respectively.

TABLE 9-4A

| Sample No. | Built-up number of DA compound monomolecular film | Film thickness of layer containing diene compound salt (Å) | Sample No. | Built-up number of DA compound monomolecular film | Film thickness of layer containing diene compound salt (Å) |
|---|---|---|---|---|---|
| 9-1-21-1 | 1 | 100 | 9-1-21-14 | 41 | 3000 |
| 9-1-21-2 | " | 200 | 9-1-21-15 | " | 6000 |
| 9-1-21-3 | " | 1000 | 9-1-21-16 | 101 | 100 |
| 9-1-21-4 | " | 3000 | 9-1-21-17 | " | 200 |
| 9-1-21-5 | " | 6000 | 9-1-21-18 | " | 1000 |
| 9-1-21-6 | 7 | 100 | 9-1-21-19 | " | 3000 |
| 9-1-21-7 | " | 200 | 9-1-21-20 | " | 6000 |
| 9-1-21-8 | " | 1000 | 9-1-21-21 | 201 | 100 |
| 9-1-21-9 | " | 3000 | 9-1-21-22 | " | 200 |
| 9-1-21-10 | " | 6000 | 9-1-21-23 | " | 1000 |
| 9-1-21-11 | 41 | 100 | 9-1-21-24 | " | 3000 |
| 9-1-21-12 | " | 200 | 9-1-21-25 | " | 6000 |
| 9-1-21-13 | " | 1000 | | | |

TABLE 9-4B

| Sample No. | Sensi- tivity | Image resolution | Contrast | Sample No. | Sensi- tivity | Image resolution | Contrast |
|---|---|---|---|---|---|---|---|
| 9-1-21-1 | ● | ● | x | 9-1-21-14 | ◉ | ◉ | ● |
| 9-1-21-2 | ● | ◉ | x | 9-1-21-15 | ◉ | ◉ | ◉ |
| 9-1-21-3 | ● | ◉ | x | 9-1-21-16 | x | x | x |
| 9-1-21-4 | ◉ | ◉ | x | 9-1-21-17 | x | x | x |
| 9-1-21-5 | ● | ● | x | 9-1-21-18 | o | ◉ | o |

TABLE 9-4B-continued

| Sample No. | Sensitivity | Image resolution | Contrast | Sample No. | Sensitivity | Image resolution | Contrast |
|---|---|---|---|---|---|---|---|
| 9-1-21-6 | ◉ | ● | x | 9-1-21-19 | ● | ● | ● |
| 9-1-21-7 | ● | ◉ | x | 9-1-21-20 | ● | ◉ | ● |
| 9-1-21-8 | ◉ | ● | x | 9-1-21-21 | x | x | x |
| 9-1-21-9 | ● | ● | x | 9-1-21-22 | x | x | x |
| 9-1-21-10 | ● | ◉ | x | 9-1-21-23 | o | o | o |
| 9-1-21-11 | o | o | x | 9-1-21-24 | o | o | o |
| 9-1-21-12 | o | o | x | 9-1-21-25 | ◉ | ● | ● |
| 9-1-21-13 | o | o | o | | | | |

TABLE 9-5A

| Sample No. | Built-up number of DA compound monomolecular film | Film thickness of layer containing diene compound salt (Å) | Sample No. | Built-up number of DA compound monomolecular film | Film thickness of layer containing diene compound salt (Å) |
|---|---|---|---|---|---|
| 9-1-22-1 | 1 | 100 | 9-1-22-14 | 41 | 3000 |
| 9-1-22-2 | " | 2000 | 9-1-22-15 | " | 6000 |
| 9-1-22-3 | " | 1000 | 9-1-22-16 | 101 | 100 |
| 9-1-22-4 | " | 3000 | 9-1-22-17 | " | 200 |
| 9-1-22-5 | " | 6000 | 9-1-22-18 | " | 1000 |
| 9-1-22-6 | 7 | 100 | 9-1-22-19 | " | 3000 |
| 9-1-22-7 | " | 200 | 9-1-22-20 | " | 6000 |
| 9-1-22-8 | " | 1000 | 9-1-22-21 | 201 | 100 |
| 9-1-22-9 | " | 3000 | 9-1-22-22 | " | 200 |
| 9-1-22-10 | " | 6000 | 9-1-22-23 | " | 1000 |
| 9-1-22-11 | " | 100 | 9-1-22-24 | " | 3000 |
| 9-1-22-12 | " | 200 | 9-1-22-25 | " | 6000 |
| 9-1-22-13 | " | 1000 | | | |

TABLE 9-5B

| Sample No. | Sensitivity | Image resolution | Contrast | Sample No. | Sensitivity | Image resolution | Contrast |
|---|---|---|---|---|---|---|---|
| 9-1-22-1 | ● | ● | x | 9-1-22-14 | o | o | o |
| 9-1-22-2 | ● | ● | x | 9-1-22-15 | ◉ | ● | ◉ |
| 9-1-22-3 | ● | ● | x | 9-1-22-16 | x | x | x |
| 9-1-22-4 | ● | ◉ | x | 9-1-22-17 | x | x | x |
| 9-1-22-5 | ● | ◉ | x | 9-1-22-18 | o | o | o |
| 9-1-22-6 | ◉ | ● | x | 9-1-22-19 | o | o | o |
| 9-1-22-7 | ● | ◉ | x | 9-1-22-20 | ● | ● | ● |
| 9-1-22-8 | ◉ | ● | x | 9-1-22-21 | x | x | x |
| 9-1-22-9 | ● | ● | x | 9-1-22-22 | x | x | x |
| 9-1-22-10 | ◉ | ● | x | 9-1-22-23 | o | o | o |
| 9-1-22-11 | x | x | x | 9-1-22-24 | o | o | o |
| 9-1-22-12 | o | o | o | 9-1-22-25 | ● | ◉ | ◉ |
| 9-1-22-13 | o | o | o | | | | |

EXAMPLES 9-23 AND 9-24

Example 9-22 was repeated except that the diene compound salt was changed to those represented by the formulae 3-1-5 and 3-1-10, respectively.

Samples employed in Examples 9-23 and 9-24 are shown in Table 9-6A and 9-7A, and the results shown in Table 9-6B and 9-7B, respectively.

TABLE 9-6A

| Sample No. | Built-up number of DA compound monomolecular film | Film thickness of layer containing diene compound salt (Å) | Sample No. | Built-up number of DA compound monomolecular film | Film thickness of layer containing diene compound salt (Å) |
|---|---|---|---|---|---|
| 9-1-23-1 | 1 | 100 | 9-1-23-14 | 41 | 3000 |
| 9-1-23-2 | " | 200 | 9-1-23-15 | " | 6000 |
| 9-1-23-3 | " | 1000 | 9-1-23-16 | 101 | 100 |
| 9-1-23-4 | " | 3000 | 9-1-23-17 | " | 200 |
| 9-1-23-5 | " | 6000 | 9-1-23-18 | " | 1000 |
| 9-1-23-6 | 7 | 100 | 9-1-23-19 | " | 3000 |
| 9-1-23-7 | " | 200 | 9-1-23-20 | " | 6000 |
| 9-1-23-8 | " | 1000 | 9-1-23-21 | 201 | 100 |
| 9-1-23-9 | " | 3000 | 9-1-23-22 | " | 200 |
| 9-1-23-10 | " | 6000 | 9-1-23-23 | " | 1000 |
| 9-1-23-11 | 41 | 100 | 9-1-23-24 | " | 3000 |
| 9-1-23-12 | " | 200 | 9-1-23-25 | " | 6000 |
| 9-1-23-13 | " | 1000 | | | |

TABLE 9-6B

| Sample No. | Sensitivity | Image resolution | Contrast | Sample No. | Sensitivity | Image resolution | Contrast |
|---|---|---|---|---|---|---|---|
| 9-1-23-1 | ⊚ | ● | x | 9-1-23-14 | ⊚ | ⊚ | ⊚ |
| 9-1-23-2 | ⊚ | ● | x | 9-1-23-15 | ⊚ | ⊚ | ⊚ |
| 9-1-23-3 | ⊚ | ⊚ | x | 9-1-23-16 | x | x | x |
| 9-1-23-4 | ● | ⊚ | x | 9-1-23-17 | o | o | o |
| 9-1-23-5 | ⊚ | ⊚ | x | 9-1-23-18 | ⊚ | ⊚ | o |
| 9-1-23-6 | ⊚ | ● | x | 9-1-23-19 | ⊚ | ⊚ | ⊚ |
| 9-1-23-7 | ⊚ | ● | x | 9-1-23-20 | ⊚ | ⊚ | ⊚ |
| 9-1-23-8 | ⊚ | ⊚ | x | 9-1-23-21 | x | x | x |
| 9-1-23-9 | ● | ⊚ | x | 9-1-23-22 | x | x | x |
| 9-1-23-10 | ⊚ | ⊚ | x | 9-1-23-23 | ⊚ | ⊚ | ⊚ |
| 9-1-23-11 | o | o | x | 9-1-23-24 | ⊚ | ⊚ | ⊚ |
| 9-1-23-12 | o | o | x | 9-1-23-25 | ⊚ | ⊚ | ⊚ |
| 9-1-23-13 | ⊚ | ● | o | | | | |

TABLE 9-7A

| Sample No. | Built-up number of DA compound monomolecular film | Film thickness of layer containing diene compound salt (Å) | Sample No. | Built-up number of DA compound monomolecular film | Film thickness of layer containing diene compound salt (Å) |
|---|---|---|---|---|---|
| 9-1-24-1 | 1 | 100 | 9-1-24-14 | 41 | 3000 |
| 9-1-24-2 | " | 200 | 9-1-24-15 | " | 6000 |
| 9-1-24-3 | " | 1000 | 9-1-24-16 | 101 | 100 |
| 9-1-24-4 | " | 3000 | 9-1-24-17 | " | 200 |
| 9-1-24-5 | " | 6000 | 9-1-24-18 | " | 1000 |
| 9-1-24-6 | 7 | 100 | 9-1-24-19 | " | 3000 |
| 9-1-24-7 | " | 200 | 9-1-24-20 | " | 6000 |
| 9-1-24-8 | " | 1000 | 9-1-24-21 | 201 | 100 |
| 9-1-24-9 | " | 3000 | 9-1-24-22 | " | 200 |
| 9-1-24-10 | " | 6000 | 9-1-24-23 | " | 1000 |
| 9-1-24-11 | 41 | 100 | 9-1-24-24 | " | 3000 |
| 9-1-24-12 | " | 200 | 9-1-24-25 | " | 6000 |
| 9-1-24-13 | " | 1000 | | | |

TABLE 9-7B

| Sample No. | Sensitivity | Image resolution | Contrast | Sample No. | Sensitivity | Image resolution | Contrast |
|---|---|---|---|---|---|---|---|
| 9-1-24-1 | | | x | 9-1-24-14 | ⊚ | ⊚ | ⊚ |
| 9-1-24-2 | | | x | 9-1-24-15 | ⊚ | ⊚ | ● |
| 9-1-24-3 | | | x | 9-1-24-16 | x | x | x |
| 9-1-24-4 | | | x | 9-1-24-17 | x | x | x |
| 9-1-24-5 | | | x | 9-1-24-18 | ⊚ | ⊚ | ⊚ |
| 9-1-24-6 | | | x | 9-1-24-19 | ⊚ | ⊚ | ⊚ |
| 9-1-24-7 | | | x | 9-1-24-20 | ⊚ | ⊚ | ⊚ |
| 9-1-24-8 | | | x | 9-1-24-21 | x | x | x |
| 9-1-24-9 | | | x | 9-1-24-22 | x | x | x |
| 9-1-24-10 | | | x | 9-1-24-23 | o | o | o |
| 9-1-24-11 | o | o | x | 9-1-24-24 | ⊚ | ● | ⊚ |
| 9-1-24-12 | o | o | x | 9-1-24-25 | ⊚ | ⊚ | ⊚ |
| 9-1-24-13 | | | o | | | | |

EXAMPLE 10-1

The same experiments were conducted in the same manner as in Example 6-1 except for using 15 parts by weight of the polymethine compound represented by the formula 5-1-3 in place of the AZ compound.

The evaluation results are shown in Table 10-1A.

EXAMPLE 10-2 TO 10-7

Examples 6-2 tp 6-7 were repeated except that the AZ compound used in Examples 6-2 to 6-7 was replaced with the polymethine compound represented by the formula 5-1-3.

The results of Examples 10-1 to 10-4 are shown in Table 10-1A.

The results of Examples 10-5 to 10-7 are shown in Table 10-1B.

TABLE 10-1A

| Optical recording medium | Built-up number of monomolecular film | Sensitivity | Image resolution | Contrast |
|---|---|---|---|---|
| Example 10-1 | 1 | ⊚ | ⊚ | x |
| | 5 | ⊚ | ⊚ | x |
| | 21 | ⊚ | o | x |
| | 41 | ⊚ | o | o |
| | 101 | ⊚ | o | o |
| | 201 | ⊚ | o | o |
| Example 10-2 | 1 | ⊚ | o | x |
| | 5 | ⊚ | o | x |
| | 21 | ⊚ | o | x |
| | 41 | ⊚ | o | o |
| | 101 | ⊚ | o | o |
| | 201 | ⊚ | x | o |
| Example 10-3 | 1 | ⊚ | ⊚ | x |
| | 5 | ⊚ | ● | x |
| | 21 | ⊚ | ⊚ | ⊚ |
| | 41 | ⊚ | ⊚ | ⊚ |

TABLE 10-1A-continued

| Optical recording medium | Built-up number of monomolecular film | Sensitivity | Image resolution | Contrast |
|---|---|---|---|---|
| | 101 | ⊚ | ⊚ | ⊚ |
| | 201 | ⊚ | ○ | ⊚ |
| Example 10-4 | 1 | ⊚ | ⊚ | x |
| | 5 | ⊚ | ⊚ | x |
| | 21 | ⊚ | ⊚ | ⊚ |
| | 41 | ⊚ | ⊚ | ⊚ |
| | 101 | ⊚ | ⊚ | ⊚ |
| | 201 | ⊚ | ⊚ | ⊚ |

TABLE 10-1B

| Optical recoding medium | Built-up number of monomolecular film | Sensitivity | Image resolution | Contrast |
|---|---|---|---|---|
| Example 10-5 | 1 | ⊚ | ⊚ | x |
| | 5 | ⊚ | ⊚ | ○ |
| | 21 | ⊚ | ⊚ | ⊚ |
| | 41 | ⊚ | ⊚ | ⊚ |
| | 101 | ⊚ | ⊚ | ⊚ |
| | 201 | ⊚ | ⊚ | ⊚ |
| Example 10-6 | 1 | x | ⊚ | x |
| | 5 | x | ⊚ | x |
| | 21 | x | ○ | ○ |
| | 41 | ○ | ○ | ○ |
| | 101 | ○ | ○ | ○ |
| | 201 | ⊚ | ○ | ○ |
| Example 10-7 | 1 | x | x | x |
| | 5 | x | x | x |
| | 21 | x | x | x |
| | 41 | ○ | ○ | ○ |
| | 101 | ○ | ○ | ○ |
| | 201 | ○ | ○ | ○ |

EXAMPLES 10-8 TO 10-14

As for the steps of optical recording and visualization of negative images, Examples 10-1 to 10-7 were repeated, and thereafter, each of the recording media was heated to about 80° C. to obtain the negative images in which the blue color of the background was changed to red color. For these negative images, evaluation was performed according to the same standards as in Example 10-1 to obtain the results shown in Table 10-2A and Table 10-2B.

TABLE 10-2A

| Optical recording medium | Built-up number of monomolecular film | Sensitivity | Image resolution | Contrast |
|---|---|---|---|---|
| Example 10-8 | 1 | | ⊚ | x |
| | 5 | | ⊚ | x |
| | 21 | | ○ | x |
| | 41 | | ○ | ○ |
| | 101 | | ○ | ○ |
| | 201 | | ○ | ○ |
| Example 10-9 | 1 | | ○ | x |
| | 5 | | ○ | x |
| | 21 | | ○ | x |
| | 41 | | ○ | ○ |
| | 101 | | ○ | ○ |
| | 201 | | x | ○ |
| Example 10-10 | 1 | | ⊚ | x |
| | 5 | | ⊚ | x |
| | 21 | | ⊚ | ● |
| | 41 | | ● | ● |
| | 101 | | ⊚ | ● |
| | 201 | | ○ | ● |
| Example 10-11 | 1 | | ⊚ | x |
| | 5 | | ⊚ | x |
| | 21 | | ⊚ | ⊚ |

TABLE 10-2A-continued

| Optical recording medium | Built-up number of monomolecular film | Sensitivity | Image resolution | Contrast |
|---|---|---|---|---|
| | 41 | ⊚ | ⊚ | ⊚ |
| | 101 | ⊚ | ⊚ | ⊚ |
| | 201 | ⊚ | ⊚ | ⊚ |

TABLE 10-2B

| Optical recoding medium | Built-up number of monomolecular film | Sensitivity | Image resolution | Contrast |
|---|---|---|---|---|
| Example 10-12 | 1 | ⊚ | ⊚ | x |
| | 5 | ⊚ | ⊚ | ○ |
| | 21 | ⊚ | ⊚ | ● |
| | 41 | ⊚ | ⊚ | ● |
| | 101 | ⊚ | ⊚ | ● |
| | 201 | ⊚ | ○ | ⊚ |
| Example 10-13 | 1 | x | ⊚ | x |
| | 5 | x | ⊚ | x |
| | 21 | x | ○ | ○ |
| | 41 | ○ | ○ | ○ |
| | 101 | ○ | ○ | ○ |
| | 201 | ⊚ | ○ | ○ |
| Example 10-14 | 1 | x | x | x |
| | 5 | x | x | x |
| | 21 | x | x | x |
| | 41 | ○ | ○ | ○ |
| | 101 | ○ | ○ | ○ |
| | 201 | ○ | ○ | ○ |

EXAMPLE 10-15

According to the same procedure as in Example 10-4 except for using a diacetylene derivative compound represented by $C_8H_{16}-C\equiv C-C\equiv C-C_2H_4-COOH$ in place of the diacetylene derivative compound represented by $C_{12}H_{25}-C\equiv C-C\equiv C-C_8H_{16}-COOH$, experiments were conducted in the same manner as in Example 10-4. The results are shown in Table 10-3A.

EXAMPLE 10-16 TO 10-20

According to the same procecure as in Example 10-15 except for using the polymethine compounds represented by the formulae 5-1-9, 5-1-17, 5-1-23, 5-1-27 and 5-1-33, respectively, in place of the polymethine compound represented by the formula 5-1-3, experiments were conducted in the same manner as in Example 10-15.

The results are shown in Tables 10-3A and 10-3B.

TABLE 10-3A

| Optical recording medium | Built-up number of monomolecular film | Sensitivity | Image resolution | Contrast |
|---|---|---|---|---|
| Example 10-15 | 1 | ○ | ○ | x |
| | 5 | ○ | ○ | x |
| | 21 | ○ | ○ | ○ |
| | 41 | ○ | ○ | ○ |
| | 101 | ⊚ | ⊚ | ⊚ |
| | 201 | ⊚ | ⊚ | ⊚ |
| Example 10-16 | 1 | ⊚ | ⊚ | x |
| | 5 | ⊚ | ⊚ | x |
| | 21 | ⊚ | ⊚ | ⊚ |
| | 41 | ⊚ | ⊚ | ⊚ |
| | 101 | ⊚ | ○ | ⊚ |
| | 201 | ⊚ | ○ | ● |
| Example 10-17 | 1 | ⊚ | ⊚ | x |
| | 5 | ⊚ | ⊚ | x |
| | 21 | ⊚ | ⊚ | ⊚ |
| | 41 | ⊚ | ⊚ | ⊚ |

TABLE 10-3A-continued

| Optical recording medium | Built-up number of monomolecular film | Sensitivity | Image resolution | Contrast |
|---|---|---|---|---|
| | 101 | ⊚ | ⊚ | ⊚ |
| | 201 | ⊚ | ⊚ | ⊚ |

TABLE 10-3B

| Optical recording medium | Built-up number of monomolecular film | Sensitivity | Image resolution | Contrast |
|---|---|---|---|---|
| Example 10-18 | 1 | ⊚ | ● | x |
| | 5 | ⊚ | ● | x |
| | 21 | ⊚ | ● | o |
| | 41 | ⊚ | ⊚ | o |
| | 101 | ⊚ | o | o |
| | 201 | ⊚ | o | o |
| Example 10-19 | 1 | ⊚ | ⊚ | x |
| | 5 | ⊚ | ⊚ | x |
| | 21 | ⊚ | ⊚ | o |
| | 41 | ⊚ | ⊚ | o |
| | 101 | ⊚ | o | o |
| | 201 | ⊚ | o | o |
| Example 10-20 | 1 | ⊚ | ⊚ | x |
| | 5 | ⊚ | ⊚ | x |
| | 21 | ⊚ | ⊚ | ⊚ |
| | 41 | ⊚ | ⊚ | ⊚ |
| | 101 | ⊚ | o | ⊚ |
| | 201 | ⊚ | o | ⊚ |

EXAMPLES 10-21 AND 10-22

The same experiments as in Example 6-20 and 6-21 were conducted, respectively, except that the AZ compound was replaced with 10 parts by weight of the polymethine compound represented by the formula 5-1-2.

Samples employed in Examples 10-21 and 10-22 are shown in Table 10-4A and 10-5A, and the results shown in Table 10-4B and 10-5B, respectively.

TABLE 10-4A

| Sample No. | Built-up number of DA compound monomolecular film | Film thickness of layer containing polymethine compound (Å) | Sample No. | Built-up number of DA compound monomolecular film | Film thickness of layer containing polymethine compound (Å) |
|---|---|---|---|---|---|
| 10-1-21-1 | 1 | 100 | 10-1-21-14 | 41 | 3000 |
| 10-1-21-2 | " | 200 | 10-1-21-15 | " | 6000 |
| 10-1-21-3 | " | 1000 | 10-1-21-16 | 101 | 100 |
| 10-1-21-4 | " | 3000 | 10-1-21-17 | " | 200 |
| 10-1-21-5 | " | 6000 | 10-1-21-18 | " | 1000 |
| 10-1-21-6 | 7 | 100 | 10-1-21-19 | " | 3000 |
| 10-1-21-7 | " | 200 | 10-1-21-20 | " | 6000 |
| 10-1-21-8 | " | 1000 | 10-1-21-21 | 201 | 100 |
| 10-1-21-9 | " | 3000 | 10-1-21-22 | " | 200 |
| 10-1-21-10 | " | 6000 | 10-1-21-23 | " | 1000 |
| 10-1-21-11 | 41 | 100 | 10-1-21-24 | " | 3000 |
| 10-1-21-12 | " | 200 | 10-1-21-25 | " | 6000 |
| 10-1-21-13 | " | 1000 | | | |

TABLE 10-4B

| Sample No. | Sensitivity | Image resolution | Contrast | Sample No. | Sensitivity | Image resolution | Contrast |
|---|---|---|---|---|---|---|---|
| 10-1-21-1 | ⊚ | ⊚ | x | 10-1-21-14 | ⊚ | ⊚ | ⊚ |
| 10-1-21-2 | ⊚ | ⊚ | x | 10-1-21-15 | ⊚ | ⊚ | ⊚ |
| 10-1-21-3 | ⊚ | ⊚ | x | 10-1-21-16 | x | x | x |
| 10-1-21-4 | ⊚ | ⊚ | x | 10-1-21-17 | x | x | x |
| 10-1-21-5 | ⊚ | ⊚ | x | 10-1-21-18 | o | ⊚ | o |
| 10-1-21-6 | ⊚ | ⊚ | x | 10-1-21-19 | ● | ⊚ | ⊚ |
| 10-1-21-7 | ⊚ | ⊚ | x | 10-1-21-20 | ● | ⊚ | ● |
| 10-1-21-8 | ⊚ | ⊚ | x | 10-1-21-21 | x | x | x |
| 10-1-21-9 | ⊚ | ⊚ | x | 10-1-21-22 | x | x | x |
| 10-1-21-10 | ⊚ | ⊚ | x | 10-1-21-23 | o | o | o |
| 10-1-21-11 | o | o | x | 10-1-21-24 | o | o | o |
| 10-1-21-12 | o | o | x | 10-1-21-25 | ● | ⊚ | ⊚ |
| 10-1-21-13 | ⊚ | o | o | | | | |

TABLE 10-5A

| Sample No. | Built-up number of DA compound monomolecular film | Film thickness of layer containing polymethine compound (Å) | Sample No. | Built-up number of DA compound monomolecular film | Film thickness of layer containing polymethine compound (Å) |
|---|---|---|---|---|---|
| 10-1-22-1 | 1 | 100 | 10-1-22-14 | 41 | 3000 |
| 10-1-22-2 | " | 200 | 10-1-22-15 | " | 6000 |
| 10-1-22-3 | " | 1000 | 10-1-22-16 | 101 | 100 |
| 10-1-22-4 | " | 3000 | 10-1-22-17 | " | 200 |
| 10-1-22-5 | " | 6000 | 10-1-22-18 | " | 1000 |
| 10-1-22-6 | 7 | 100 | 10-1-22-19 | " | 3000 |

TABLE 10-5A-continued

| Sample No. | Built-up number of DA compound monomolecular film | Film thickness of layer containing polymethine compound (Å) | Sample No. | Built-up number of DA compound monomolecular film | Film thickness of layer containing polymethine compound (Å) |
|---|---|---|---|---|---|
| 10-1-22-7 | " | 200 | 10-1-22-20 | " | 6000 |
| 10-1-22-8 | " | 1000 | 10-1-22-21 | 201 | 100 |
| 10-1-22-9 | " | 3000 | 10-1-22-22 | " | 200 |
| 10-1-22-10 | " | 6000 | 10-1-22-23 | " | 1000 |
| 10-1-22-11 | 41 | 100 | 10-1-22-24 | " | 3000 |
| 10-1-22-12 | " | 200 | 10-1-22-25 | " | 6000 |
| 10-1-22-13 | " | 1000 | | | |

TABLE 10-5B

| Sample No. | Sensitivity | Image resolution | Contrast | Sample No. | Sensitivity | Image resolution | Contrast |
|---|---|---|---|---|---|---|---|
| 10-1-22-1 | ◉ | ◉ | x | 10-1-22-14 | ◉ | ◉ | ◉ |
| 10-1-22-2 | ◉ | ◉ | x | 10-1-22-15 | ◉ | ◉ | ◉ |
| 10-1-22-3 | ◉ | ◉ | x | 10-1-22-16 | x | x | x |
| 10-1-22-4 | ◉ | ◉ | x | 10-1-22-17 | o | o | o |
| 10-1-22-5 | ◉ | ● | x | 10-1-22-18 | ◉ | ◉ | ◉ |
| 10-1-22-6 | ◉ | ◉ | x | 10-1-22-19 | ◉ | ◉ | ◉ |
| 10-1-22-7 | ◉ | ◉ | x | 10-1-22-20 | ◉ | ● | ◉ |
| 10-1-22-8 | ◉ | ◉ | x | 10-1-22-21 | x | x | x |
| 10-1-22-9 | ◉ | ● | x | 10-1-22-22 | x | x | x |
| 10-1-22-10 | ◉ | ● | x | 10-1-22-23 | ◉ | ● | ● |
| 10-1-22-11 | o | o | x | 10-1-22-24 | ◉ | ◉ | ● |
| 10-1-22-12 | o | o | o | 10-1-22-25 | ◉ | ◉ | ● |
| 10-1-22-13 | ● | ◉ | ◉ | | | | |

EXAMPLES 10-23 AND 10-24

Example 10-22 was repeated except that the polymethine compound was changed to those represented by the formulae 5-1-5 and 5-1-10, respectively.

Samples employed in Examples 10-23 and 10-24 are shown in Table 10-6A and 10-7A, and the results shown in Table 10-6B and 10-7B, respectively.

TABLE 10-6A

| Sample No. | Built-up number of DA compound monomolecular film | Film thickness of layer containing polymethine compound (Å) | Sample No. | Built-up number of DA compound monomolecular film | Film thickness of layer containing polymethine compound (Å) |
|---|---|---|---|---|---|
| 10-1-23-1 | 1 | 100 | 10-1-23-14 | 41 | 3000 |
| 10-1-23-2 | " | 200 | 10-1-23-15 | " | 6000 |
| 10-1-23-3 | " | 1000 | 10-1-23-16 | 101 | 100 |
| 10-1-23-4 | " | 3000 | 10-1-23-17 | " | 200 |
| 10-1-23-5 | " | 6000 | 10-1-23-18 | " | 1000 |
| 10-1-23-6 | 7 | 100 | 10-1-23-19 | " | 3000 |
| 10-1-23-7 | " | 200 | 10-1-23-20 | " | 6000 |
| 10-1-23-8 | " | 1000 | 10-1-23-21 | 201 | 100 |
| 10-1-23-9 | " | 3000 | 10-1-23-22 | " | 200 |
| 10-1-23-10 | " | 6000 | 10-1-23-23 | " | 1000 |
| 10-1-23-11 | 41 | 100 | 10-1-23-24 | " | 3000 |
| 10-1-23-12 | " | 200 | 10-1-23-25 | " | 6000 |
| 10-1-23-13 | " | 1000 | | | |

TABLE 10-6B

| Sample No. | Sensitivity | Image resolution | Contrast | Sample No. | Sensitivity | Image resolution | Contrast |
|---|---|---|---|---|---|---|---|
| 10-1-23-1 | ◉ | ● | x | 10-1-23-14 | ◉ | ◉ | ◉ |
| 10-1-23-2 | ● | ● | x | 10-1-23-15 | ◉ | ◉ | ◉ |
| 10-1-23-3 | ◉ | ● | x | 10-1-23-16 | x | x | x |
| 10-1-23-4 | ● | ● | x | 10-1-23-17 | x | x | x |
| 10-1-23-5 | ◉ | ● | x | 10-1-23-18 | ◉ | ◉ | ◉ |
| 10-1-23-6 | ● | ◉ | x | 10-1-23-19 | ◉ | ◉ | ◉ |
| 10-1-23-7 | ● | ◉ | x | 10-1-23-20 | ◉ | ◉ | ◉ |
| 10-1-23-8 | ● | ◉ | x | 10-1-23-21 | x | x | x |
| 10-1-23-9 | ● | ◉ | x | 10-1-23-22 | x | x | x |
| 10-1-23-10 | ● | ◉ | x | 10-1-23-23 | o | o | o |
| 10-1-23-11 | o | o | x | 10-1-23-24 | ◉ | ◉ | ◉ |
| 10-1-23-12 | o | o | x | 10-1-23-25 | ◉ | ◉ | ● |
| 10-1-23-13 | ● | ● | ◉ | | | | |

TABLE 10-7A

| Sample No. | Built-up number of DA compound monomolecular film | Film thickness of layer containing polymethine compound (Å) | Sample No. | Built-up number of DA compound monomolecular film | Film thickness of layer containing polymethine compound (Å) |
| --- | --- | --- | --- | --- | --- |
| 10-1-24-1 | 1 | 100 | 10-1-24-14 | 41 | 3000 |
| 10-1-24-2 | " | 200 | 10-1-24-15 | " | 6000 |
| 10-1-24-3 | " | 1000 | 10-1-24-16 | 101 | 100 |
| 10-1-24-4 | " | 3000 | 10-1-24-17 | " | 200 |
| 10-1-24-5 | " | 6000 | 10-1-24-18 | " | 1000 |
| 10-1-24-6 | 7 | 100 | 10-1-24-19 | " | 3000 |
| 10-1-24-7 | " | 200 | 10-1-24-20 | " | 6000 |
| 10-1-24-8 | " | 1000 | 10-1-24-21 | 201 | 100 |
| 10-1-24-9 | " | 3000 | 10-1-24-22 | " | 200 |
| 10-1-24-10 | " | 6000 | 10-1-24-23 | " | 1000 |
| 10-1-24-11 | 41 | 100 | 10-1-24-24 | " | 3000 |
| 10-1-24-12 | " | 200 | 10-1-24-25 | " | 6000 |
| 10-1-24-13 | " | 1000 | | | |

TABLE 10-7B

| Sample No. | Sensitivity | Image resolution | Contrast | Sample No. | Sensitivity | Image resolution | Contrast |
| --- | --- | --- | --- | --- | --- | --- | --- |
| 10-1-24-1 | ◉ | ◉ | x | 10-1-24-14 | ◉ | ◉ | ◉ |
| 10-1-24-2 | ◉ | ◉ | x | 10-1-24-15 | ◉ | ◉ | ◉ |
| 10-1-24-3 | ◉ | ◉ | x | 10-1-24-16 | x | x | x |
| 10-1-24-4 | ◉ | ◉ | x | 10-1-24-17 | x | x | x |
| 10-1-24-5 | ◉ | ◉ | x | 10-1-24-18 | ◉ | ◉ | ◉ |
| 10-1-24-6 | ◉ | ◉ | x | 10-1-24-19 | ◉ | ◉ | ◉ |
| 10-1-24-7 | ◉ | ◉ | x | 10-1-24-20 | ◉ | ◉ | ◉ |
| 10-1-24-8 | ◉ | ◉ | x | 10-1-24-21 | x | x | x |
| 10-1-24-9 | ◉ | ◉ | x | 10-1-24-22 | x | x | x |
| 10-1-24-10 | ◉ | ◉ | x | 10-1-24-23 | o | o | o |
| 10-1-24-11 | o | o | x | 10-1-24-24 | ◉ | ◉ | ◉ |
| 10-1-24-12 | o | o | x | 10-1-24-25 | ◉ | ◉ | ◉ |
| 10-1-24-13 | ◉ | ◉ | o | | | | |

What is claimed is:

1. An optical recording method comprising the steps of:
   (A) irradiating with an optical signal to impart recorded information to an optical recording medium having a recording layer containing a diacetylene compound and at least one selected from the group B consisting of azulenium salt compounds, pyrylium dyes, diene compounds, croconic methine dyes and polymethine compounds, thereby forming a latent image; and
   (B) irradiating the recording medium having said latent image formed thereon to thereby visualize said latent image.

2. An optical recording method according to claim 1, wherein said diacetylene compound is represented by the formula (0):

$$R-C\equiv C-C\equiv C-R' \quad (0)$$

wherein R and R' each are a saturated aliphatic group substituted by a polar group; an olefinic hydrocarbon group substituted by a polar group; or an aromatic hydrocarbon substituted by a polar group.

3. An optical recording method according to claim 1, wherein the azulenium salt compounds of said group B are represented by the formula (1):

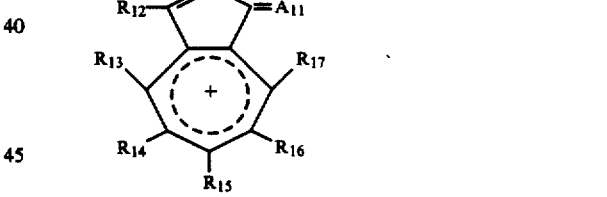

(1)

wherein $R_{11}$–$R_{17}$ each represent a hydrogen atom, a halogen atom or a monovalent organic radical and $A_{11}$ represents a bivalent organic radical which is bonded through a double bond.

4. An optical recording method according to claim 1, wherein the pyrylium dyes of said group B have the basic structure represented by the formula (2) shown below:

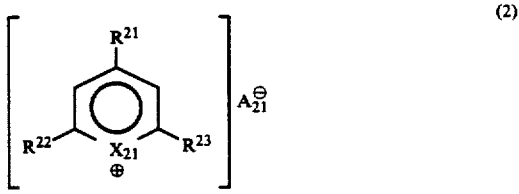

(2)

wherein $X_{21}$ represents an oxygen atom, a sulfur atom or a selenium atom, $R^{21}$, $R^{22}$ and $R^{23}$ represent an organic radical, and $A_{21}$ represents an anion.

5. An optical recording method according to claim 1, wherein the diene compounds of said group B are represented by the formula (3-1) or 3-2) shown below:

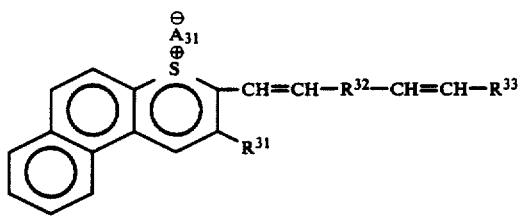
(3-1)

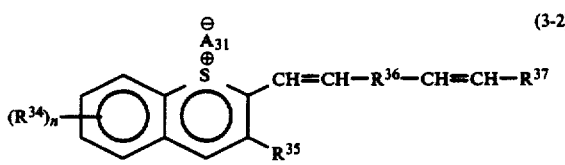
(3-2)

wherein $R^{31}$ represents an optionally substituted alkyl group, phenyl group or styryl group; $R^{32}$ and $R^{36}$ represent optionally substituted arylene group and form a conjugated double bond system together with the two —C=CH— groups adjacent thereto; $R^{33}$ and $R^{37}$ represent an optionally substituted phenyl group or a naphthyl group; $R^{34}$ represents an alkoxy group; $R^{35}$ represents an alkyl group; and $A_{31}$ represents an anion radical.

6. An optical recording method according to claim 1, wherein croconic methine dyes of said group B have the basic structure represented by the formula (4) shown below:

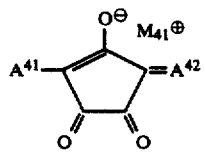
(4)

wherein $M_{41}^{\oplus}$ represents metal ion, $A^{41}$ and $A^{42}$ represent substituents containing an aromatic ring and/or a heterocyclic ring.

7. An optical recording method according to claim 1, wherein polymethine compounds of said group B are reepresented by the formula (5-1) or (5-2) shown below:

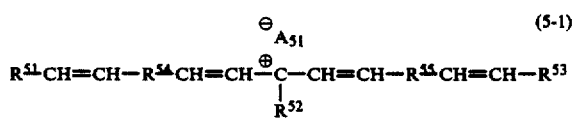
(5-1)

(5-2)

wherein $R^{51}$, $R^{52}$ and $R^{53}$ are independently represent an optionally substituted aryl group; $R^{54}$ and $R^{55}$ represent an optionally substituted arylene group and form a conjugated double bond system together with the two —CH=CH— groups adjacent thereto; $R^{56}$ represents hydrogen or an optionally substituted aryl group; and $A_{51}$ represents an anion radical.

8. An optical recording method according to claim 1, wherein said radiation in the step A is an infrared radiation.

9. An optical recording method according to claim 1, wherein said radiation in the step B is a ultraviolet.

10. An optical recording method according to claim 8, wherein an radiation IR-ray of 800–900 nm is used as said infrared radiation.

11. An optical recording method according to claim 1, wherein the recording layer containing said diacetylene compound and at least one selected from the group B has the a Langmuir-Blodgett film structure.

12. An optical recording method according to claim 1, wherein said recording layer is formed by coating of the compound selected from the group B or the diacetylene compound.

13. An optical recording method comprising the steps of:
(A) irradiating with an optical signal to impart recorded information to an optical recording medium having a recording layer containing a diacetylene compound and at least one selected from the group B consisting of azulenium salt compound, pyrylium dyes, diene compounds, croconic methine dyes and polymethine compounds, thereby forming a latent image;
(B) irradiating the recording medium having said latent image formed thereon to thereby visualize said latent image; and
(C) heating said recording medium to thereby further visualize said latent image.

14. An optical recording method according to claim 13, wherein said diacetylene compound is represented by the formula (0):

(0)

wherein R and R' each are a saturated aliphatic group substituted by a polar group; an olefinic hydrocarbon group substituted by a polar group; or an aromatic hydrocarbon substituted by a polar group.

15. An optical recording method according to claim 13, wherein the azulenium salt compounds of said group B are represented by the formula (1):

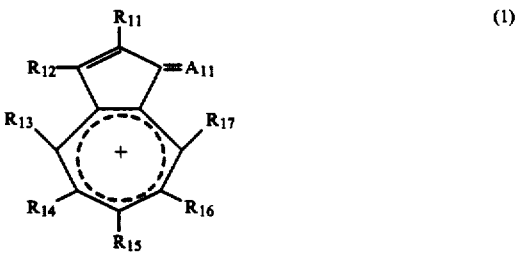
(1)

wherein $R_{11}$–$R_{17}$ each represent a hydrogen atom, a halogen atom or a monovalent organic radical and $A_{11}$ represents a bivalent organic radical which is bonded through a double bond.

16. An optical recording method according to claim 13, wherein the pyrylium dyes of said group B have the basic structure represented by the formula (2) shown below:

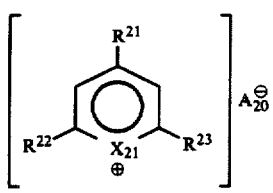
(2)

wherein $X_{21}$ represents an oxygen atom, a sulfur atom or a selenium atom, $R^{21}$, $R^{22}$ and $R^{23}$ represent an organic radical, and $A_{21}$ represents an anion.

17. An optical recording method according to claim 13, wherein the diene compounds of said group B are represented by the formula (3-1) or (3-2) shown below:

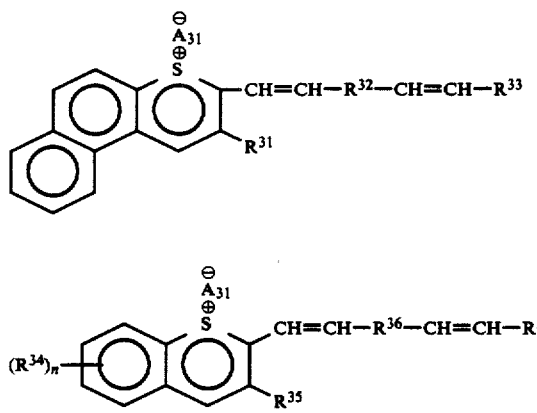

wherein $R^{31}$ represents an optionally substituted alkyl group, a phenyl group or a styryl group $R^{32}$ and $R^{36}$ represent an optionally substituted arylene group; and form a conjugated double bond system together with the two —CH=CH— groups adjacent thereto; $R^{33}$ and $R^{37}$ represent an optionally substituted phenyl group or a naphthyl group $R^{34}$ represents an alkoxy group; $R^{35}$ represents a alkyl group; and $A_{31}$ represents an anion radical.

18. An optical recording method according to claim 13, wherein croconic methine dyes of said group B have the basic structure represented by the formula (4) shown below:

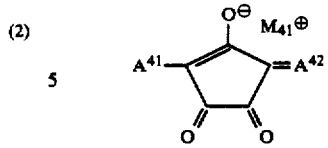

wherein $M_{41}\oplus$ represents a metal ion, $A^{41}$ and $A^{42}$ represent substituents containing an aromatic ring and/or a heterocyclic ring.

19. An optical recording method according to claim 13, wherein polymethine compounds of said group B are represented by the formula (5-1) or (5-2) shown below:

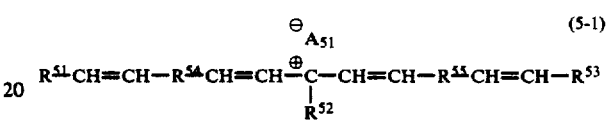

wherein $R^{51}$, $R^{52}$ and $R^{53}$ each independently represent an optionally substituted aryl group; $R^{54}$ and $R^{55}$ represent an optionally substituted arylene group and form a conjugated double bond system together with the two —CH=CH— groups adjacent thereto; $R^{56}$ represents hydrogen or an optionally substituted aryl group; and $A_{51}$ represents an anion radical.

20. An optical recording method according to claim 13, wherein said radiation in the step A is an infrared radiation.

21. An optical recording method according to claim 13, wherein said radiation in the step B is a ultraviolet radiation.

22. An optical recording method according to claim 20, wherein radiation of 800–900 nm is used as said infrared radiation.

23. An optical recording method according to claim 13, wherein the recording layer containing said diacetylene compound and at least one selected from the group B has a Langmuir-Blodgett film structure.

24. An optical recording method according to claim 13, wherein said recording layer is formed by coating of the compound selected from the group B or the diacetylene compound.

25. An optical recording method according to claim 13, wherein a heater or a radiation is used as the heating means in said step C.

26. An optical recording method according to claim 13, wherein heating in said step C is conducted at a temperature in the range from 50° to 120° C.

* * * * *

UNITED STATES PATENT AND TRADEMARK OFFICE
CERTIFICATE OF CORRECTION

PATENT NO. : 4,782,006
DATED : November 1, 1988
INVENTOR(S) : YUKUO NISHIMURA, ET AL.

It is certified that error appears in the above-identified patent and that said Letters Patent is hereby corrected as shown below:

TITLE PAGE:
AT [57] ABSTRACT

Line 13, "visualizing" should read --visualize--.

COLUMN 2

Line 20, "visualizing" should read --visualize--.
    Line 34, "visualizing" should read --visualize--.
    Line 57, "the thereby visualizing" should read
        --to thereby visualize--.

COLUMN 3

Line 12, "etc.:" should read --etc.--.
    Line 27, "A" should read --An--.

COLUMN 4

Line 41, "$R^{11}$ to $R^{17}$" should read --$R_{11}$ to $R_{17}$--.

COLUMN 16

Line 3, "$CH_{2-O-CH2}CH_2SO_3O$," should read
        --$CH_2-O-CH_2CH_2SO_3O$,--.

COLUMN 21

Line 27, "(4-1) to (4-2)." should read
        --(4-1) to (4-4).--.
    Line 38, "$\overset{\oplus}{N}R^{42}$" should read --$\overset{\oplus}{N}-R^{42}$--.

UNITED STATES PATENT AND TRADEMARK OFFICE
CERTIFICATE OF CORRECTION

PATENT NO. : 4,782,006
DATED : November 1, 1988
INVENTOR(S) : YUKUO NISHIMURA, ET AL.

It is certified that error appears in the above-identified patent and that said Letters Patent is hereby corrected as shown below:

COLUMN 22

Line 38, "thionaphtene" should read --thionaphthene--.

COLUMN 23

Line 5, "3,3-trimethylindolenine," should read
        --3,3,5-trimethylindolenine,--.
    Line 16, "1-ethyl-5-ethoxycarbonylbenzimidazole,"
        should read --1-ethyl-5-carboxybenzimidazole,
        1-ethyl-5-ethoxycarbonylbenzimidazole,--.
    Lines 19-20, "1-ethyl-5-ethylsulfonylbnzimidazole,"
        should read
        --1-ethyl-5-ethylsulfonylbenzimidazole,--.

COLUMN 24

Line 26, "(4-2)" should read --(4-2) are:--.

COLUMN 31

Formula (4-1-35),  should read .

COLUMN 35

Formula (5-1-12), "$ClO_4^{\ominus}$" should read --$CO\ell4^{\ominus}$--.

UNITED STATES PATENT AND TRADEMARK OFFICE
CERTIFICATE OF CORRECTION

PATENT NO. : 4,782,006
DATED : November 1, 1988
INVENTOR(S) : YUKUO NISHIMURA, ET AL.

It is certified that error appears in the above-identified patent and that said Letters Patent is hereby corrected as shown below:

COLUMN 37

Formula (5-1-21), "$\oplus C\ell O_4 C\ell O \ominus$" should read -- $\oplus C\ell O_4 {}^{\ominus}$ --.
$$\begin{array}{c} -C-CH=CH- \\ | \end{array} \qquad \begin{array}{c} -C-CH=CH- \\ | \end{array}$$

COLUMN 41

Line 53, "layer" should read --layers--.
Lines 60-61, "molecular" should read --molecule--.
Line 63, "(amphilphilic" should read --(amphiphilic--.
Line 64, "molecular" should read --molecule--.

COLUMN 45

Line 25, "two separated layer system," should read
--two layer separated system,--.
Line 30, "the" (second occurrence) should be deleted.

COLUMN 46

Line 32, "rotating" should read --rotated--.

COLUMN 48

Line 17, "through" should read --thorough--.
Line 51, "Table 1." should read --Table 1-1.--.

COLUMN 49

Line 24, "diacetyle" should read --diacetylene--.

UNITED STATES PATENT AND TRADEMARK OFFICE
CERTIFICATE OF CORRECTION

PATENT NO. : 4,782,006
DATED : November 1, 1988
INVENTOR(S) : YUKUO NISHIMURA, ET AL.

It is certified that error appears in the above-identified patent and that said Letters Patent is hereby corrected as shown below:

COLUMN 50

Line 54, "formulae" should read --formula--.
    Line 64, "formulae" should read --formula--.

COLUMN 51

Line 5, "formulae" should read --formula--.
    Line 6, "medius" should read --medium--.
    Line 14, "formulae" should read --formula--.
    Line 15, medius" should read --medium--.

COLUMN 52

Line 37, "AI," should read --Al,-- and
          "1-21" should read --1-1--.

COLUMN 55

Table 1-7B, for Sample No. 1-1-23-13, the test result
        --⊚-- should also appear in the Columns
        labelled "Image resolution" and "Contrast".

COLUMN 57

Line 9, "pyrilium" should read --pyrylium--.
    Line 44, "donducted" should read --conducted--.

COLUMN 58

Line 50, "EXAMPLE" should read --EXAMPLES--.

UNITED STATES PATENT AND TRADEMARK OFFICE
CERTIFICATE OF CORRECTION

PATENT NO. : 4,782,006
DATED : November 1, 1988
INVENTOR(S) : YUKUO NISHIMURA, ET AL.

It is certified that error appears in the above-identified patent and that said Letters Patent is hereby corrected as shown below:

COLUMN 61

Table 2-6B, Sample No. "2-1-22-2" should read --2-1-22-25--.

COLUMN 66

Line 10, "EXAMPLE" should read --EXAMPLES--.

COLUMN 67

Table 3-4B, for Sample No. 3-1-21-13, the "Contrast" test result should read --⊚--.

COLUMN 68

Table 3-5B, for Sample No. 3-1-22-9, the "Sensitivity" test result should read --○--.

COLUMN 69

Table 3-5B-Continued, for Sample No. 3-1-22-13, the "Sensitivity", "Image resolution" and "Contrast" test results should read -- ⊚ ⊚ ⊚ --.

UNITED STATES PATENT AND TRADEMARK OFFICE
CERTIFICATE OF CORRECTION

PATENT NO. : 4,782,006
DATED : November 1, 1988
INVENTOR(S) : YUKUO NISHIMURA, ET AL.

It is certified that error appears in the above-identified patent and that said Letters Patent is hereby corrected as shown below:

COLUMNS 69 AND 70

Table 3-7A, column headings

| Sample | Film thickness layer compound (Å) | Film thickness of layer containing pound salt (Å) | Sample No. | Film thickness containing DA compound (Å) | Film thickness of layer diene compound salt (Å) |
|---|---|---|---|---|---| should read

Table 3-7A

| Sample No. | Film thickness of layer containing DA compound (Å) | Film thickness of layer containing diene compound salt (Å) | Sample No. | Film thickness of layer containing DA compound (Å) | Film thickness of layer containing diene compound salt (Å) |
|---|---|---|---|---|---|

COLUMN 73

Line 24, "-C"C-" should read -- -C≡C- --.
    Line 30, "4'-15" should read --4-15--.

COLUMMS 75-76

Table 4-4B, for Sample No. 4-1-20-25, the "Sensitivity", "Image resolution" and "Contrast" test results should read -- ⊚ ⊚ ⊚ --.

COLUMN 75

Line 16, "4-1-22-1 to 4-1-22-25" should read --4-1-21-1 to 4-1-21-25--.

UNITED STATES PATENT AND TRADEMARK OFFICE
CERTIFICATE OF CORRECTION

PATENT NO. : 4,782,006
DATED : November 1, 1988
INVENTOR(S) : YUKUO NISHIMURA, ET AL.

It is certified that error appears in the above-identified patent and that said Letters Patent is hereby corrected as shown below:

COLUMN 80

Line 13, "58" should read --5-8--.
    Line 21, "standars" should read --standards--.
    Line 52, "≡C-C-C≡" should read --≡C-C≡--.
    Line 55, "EXAMPLE" should read --EXAMPLES--.
    Line 60, "5-11," should read --5-1-1,--.

COLUMN 82

Line 56, "5-1-2225 -as" should read --5-1-22-25 -as--.

COLUMN 84

Line 35, "5-1-22-1 to 5-1-22-25" should read
          --5-1-23-1 to 5-1-23-25--.

COLUMNS 85-86

Table 5-6B-continued, for Sample No. 5-1-23-25, the
          "Sensitivity", "Image resolution" and
          "Contrast" test results should read
          -- ⊚ ⊚ ⊚ --.

COLUMN 85

Line 61, "o" should read --on--.
    Line 65, "discribed" should read --described--.

COLUMN 87

Line 27, "10 part" should read --10 parts--.

UNITED STATES PATENT AND TRADEMARK OFFICE
CERTIFICATE OF CORRECTION

PATENT NO. : 4,782,006
DATED : November 1, 1988
INVENTOR(S) : YUKUO NISHIMURA, ET AL.

It is certified that error appears in the above-identified patent and that said Letters Patent is hereby corrected as shown below:

COLUMN 88

Table 6-1B, In Example 6-6 for "Built-up 201", the "Sensitivity", "Image resolution" and "Contrast" tests results should read -- ⓞ o ⓞ --.

Table 6-2A, In Example 6-9 for "Built-up 201" the "Sensitivity", "Image resolution" and "Contrast" test results should read -- ⓞ ⓞ ⓞ --.

COLUMN 89

Table 6-3A, "

TABLE 6-3A

| Recording medium | Built-up number of monomolecular film | Sensitivity | Image resolution | Contrast |
|---|---|---|---|---|
| Example 6-15 | 1 | ⊃ | ○ | ⊃ |
| | 5 | ⊃ | ⊃ | ⊃ |
| | 21 | ⊃ | ⊃ | ⊃ |
| | 41 | ○ | ⊃ | ⊃ |
| | 101 | ⊚ | ⊃ | ⊃ |
| | 201 | ⊃ | ⊃ | ⊃ |
| Example 6-16 | 1 | ○ | ⊃ | ⊃ |
| | 5 | ⊃ | ⊃ | ⊃ |
| | 21 | ⊃ | ⊃ | ⊃ |
| | 41 | ⊃ | ⊃ | ⊃ |
| | 101 | ⊃ | ⊃ | ⊃ |
| | 201 | ● | ⊃ | ⊃ |
| Example 6-17 | 1 | ● | ⊃ | ⊃ |
| | 5 | ⊃ | ⊃ | ⊃ |
| | 21 | ⊃ | ⊃ | ⊃ |
| | 41 | ⊃ | ⊃ | ⊃ |
| | 101 | ⊃ | ⊃ | ⊃ |
| | 201 | ⊃ | ○ | ⊃ |

"

UNITED STATES PATENT AND TRADEMARK OFFICE
CERTIFICATE OF CORRECTION

PATENT NO. : 4,782,006          Page 9 of 16
DATED : November 1, 1988
INVENTOR(S) : YUKUO NISHIMURA, ET AL.

It is certified that error appears in the above-identified patent and that said Letters Patent is hereby corrected as shown below:

COLUMN 89 (Continued)

should read --

Table 6-3A

| Recording medium | Built-up number of monomolecular film | Sensitivity | Image resolution | Contrast |
|---|---|---|---|---|
| Example 6-15 | 1 | ⊚ | ⊙ | ▪ |
| | 5 | ⊚ | ⊙ | ▪ |
| | 21 | ⊚ | ⊙ | ⊙ |
| | 41 | ⊙ | ⊙ | ⊙ |
| | 101 | ⊙ | ⊙ | ⊙ |
| | 201 | ⊙ | ⊙ | ⊙ |
| Example 6-16 | 1 | ⊚ | ⊙ | ▪ |
| | 5 | ⊚ | ⊙ | ▪ |
| | 21 | ⊙ | ⊙ | ⊙ |
| | 41 | ⊙ | ⊙ | ⊙ |
| | 101 | ⊙ | ⊙ | ⊙ |
| | 201 | ⊙ | ⊙ | ⊙ |
| Example 6-17 | 1 | ⊙ | ⊙ | ▪ |
| | 5 | ⊙ | ⊙ | ▪ |
| | 21 | ⊙ | ⊙ | ⊙ |
| | 41 | ⊙ | ⊙ | ⊙ |
| | 101 | ⊙ | ⊙ | ⊙ |
| | 201 | ⊙ | ○ | ⊙ |

--.

Line 32, "EXAMPLE" should read --EXAMPLES--.

COLUMN 92

Line 36, "were" should read --was--.
Line 38, "nega" should read --negative--.

UNITED STATES PATENT AND TRADEMARK OFFICE
CERTIFICATE OF CORRECTION

PATENT NO. : 4,782,006
DATED : November 1, 1988
INVENTOR(S) : YUKUO NISHIMURA, ET AL.

It is certified that error appears in the above-identified patent and that said Letters Patent is hereby corrected as shown below:

COLUMN 95

Table 7-1A, in Example 7-3 for "Built-up 41", the "Sensitivity", "Image resolution" and "Contrast" test results should read -- ⊚ ⊚ ⊚ --.

COLUMN 97

Line 51, "EXAMPLE" should read --EXAMPLES--.

COLUMN 98

Line 30, "TABLE 73B" should read --TABLE 7-3B--.
Line 49, "10 part" should read --10 parts--.

COLUMN 99

Table 7-4B, in Sample No. 7-1-20-19, the "Sensitivity", "Image resolution" and "Contrast" test results should read -- ⊚ ⊚ ⊚ --.

COLUMN 101

Table 7-6B, "in Sample No. 7-1-22-25, the "Sensitivity", "Image resolution" and "Contrast" test results should read -- ⊚ ⊚ ⊚ --.

UNITED STATES PATENT AND TRADEMARK OFFICE
CERTIFICATE OF CORRECTION

PATENT NO. : 4,782,006

DATED : November 1, 1988

INVENTOR(S) : YUKUO NISHIMURA, ET AL.

It is certified that error appears in the above-identified patent and that said Letters Patent is hereby corrected as shown below:

COLUMN 104

Table 8-2B, in Example 8-13, "Sensitivity" test results for "Built-up 1" and for "Built-up 5" should each be --X--.

Line 65, "EXAMPLE" should read --EXAMPLES--.

COLUMN 109

Line 16, "EXAMPLE" should read --EXAMPLES--.
Line 18, "tp" should read --to--.

COLUMN 110

Table 9-2A, in Example 9-10, for "Built-up 1", the "Sensitivity", "Image resolution" and "Contrast" test results should read -- ⊚ ⊚ X --.

COLUMN 112

Table 9-3B, the "Contrast" test result for "Built-up 41" should read --○--.

COLUMN 113

Table 9-5A, for Sample No. 9-1-22-2, the Film thickness "2000" should read --200-- and for Sample No. 9-1-22-11, the "Built-up" number should read --41--.

UNITED STATES PATENT AND TRADEMARK OFFICE
CERTIFICATE OF CORRECTION

PATENT NO. : 4,782,006

DATED : November 1, 1988

INVENTOR(S) : YUKUO NISHIMURA ET AL.

It is certified that error appears in the above-identified patent and that said Letters Patent is hereby corrected as shown below:

COLUMN 115

Table 9-7B, "

TABLE 9-7B

| Sample No. | Sensitivity | Image resolution | Contrast | Sample No. | Sensitivity | Image resolution | Contrast |
|---|---|---|---|---|---|---|---|
| 9-1-24-1 |   |   | x | 9-1-24-14 | ◉ | ◉ | ◉ |
| 9-1-24-2 |   |   | x | 9-1-24-15 | ◉ | ◉ | ◉ |
| 9-1-24-3 |   |   | x | 9-1-24-16 | x | x | x |
| 9-1-24-4 |   |   | x | 9-1-24-17 | x | x | x |
| 9-1-24-5 |   |   | x | 9-1-24-18 | ◉ | ◉ | ◉ |
| 9-1-24-6 |   |   | x | 9-1-24-19 | ◉ | ◉ | ◉ |
| 9-1-24-7 |   |   | x | 9-1-24-20 | ◉ | ◉ | ◉ |
| 9-1-24-8 |   |   | x | 9-1-24-21 | x | x | x |
| 9-1-24-9 |   |   | x | 9-1-24-22 | x | x | x |
| 9-1-24-10 |   |   | x | 9-1-24-23 | ○ | ○ | ○ |
| 9-1-24-11 | ○ | ○ | x | 9-1-24-24 | ◉ | ◉ | ◉ |
| 9-1-24-12 | ○ | ○ | x | 9-1-24-25 | ◉ | ◉ | ◉ |
| 9-1-24-13 |   |   | ○ |   |   |   |   |

"

should read

--

Table 9-7B

| Sample No. | Sensitivity | Image resolution | Contrast | Sample No. | Sensitivity | Image resolution | Contrast |
|---|---|---|---|---|---|---|---|
| 9-1-24-1 | ◉ | ◉ | x | 9-1-24-14 | ◉ | ◉ | ◉ |
| 9-1-24-2 | ◉ | ◉ | x | 9-1-24-15 | ◉ | ◉ | ◉ |
| 9-1-24-3 | ◉ | ◉ | x | 9-1-24-16 | x | x | x |
| 9-1-24-4 | ◉ | ◉ | x | 9-1-24-17 | x | x | x |
| 9-1-24-5 | ◉ | ◉ | x | 9-1-24-18 | ◉ | ◉ | ◉ |
| 9-1-24-6 | ◉ | ◉ | x | 9-1-24-19 | ◉ | ◉ | ◉ |
| 9-1-24-7 | ◉ | ◉ | x | 9-1-24-20 | ◉ | ◉ | ◉ |
| 9-1-24-8 | ◉ | ◉ | x | 9-1-24-21 | x | x | x |
| 9-1-24-9 | ◉ | ◉ | x | 9-1-24-22 | x | x | x |
| 9-1-24-10 | ◉ | ◉ | x | 9-1-24-23 | ○ | ○ | ○ |
| 9-1-24-11 | ○ | ○ | x | 9-1-24-24 | ◉ | ◉ | ◉ |
| 9-1-24-12 | ○ | ○ | x | 9-1-24-25 | ◉ | ◉ | ◉ |
| 9-1-24-13 | ◉ | ◉ | ○ |   |   |   |   |

--.

UNITED STATES PATENT AND TRADEMARK OFFICE
CERTIFICATE OF CORRECTION

PATENT NO. : 4,782,006

DATED : November 1, 1988

INVENTOR(S) : YUKUO NISHIMURA, ET AL.

It is certified that error appears in the above-identified patent and that said Letters Patent is hereby corrected as shown below:

COLUMN 115 (Continued)

Line 59, "EXAMPLE" should read --EXAMPLES--.
Line 61, "tp" should read --to--.

COLUMN 117

Table 10-1B, in Example 10-5, for "Built-up 201", the "Sensitivity", "Image resolution" and "Contrast" test results should read -- ⊙ ○ ⊚ --.

Table 10-2A, "

| Optical recording medium | Built-up number of monomolecular film | Sensitivity | Image resolution | Contrast |
|---|---|---|---|---|
| Example 10-8 | 1 | | ◐ | ● |
| | 5 | | ◉ | ● |
| | 21 | | ○ | ● |
| | 41 | | ○ | ○ |
| | 101 | | ○ | ○ |
| | 201 | | ○ | ○ |
| Example 10-9 | 1 | | ○ | ● |
| | 5 | | ○ | ● |
| | 21 | | ○ | ● |
| | 41 | | ○ | ○ |
| | 101 | | ○ | ○ |
| | 201 | | ● | ○ |
| Example 10-10 | 1 | | ◉ | ● |
| | 5 | | ◉ | ● |
| | 21 | | ◉ | ◉ |
| | 41 | | ◉ | ◉ |
| | 101 | | ◐ | ◉ |
| | 201 | | ○ | ◉ |
| Example 10-11 | 1 | | ◉ | ● |
| | 5 | | ◉ | ● |
| | 21 | | ◐ | ● |

"

UNITED STATES PATENT AND TRADEMARK OFFICE
CERTIFICATE OF CORRECTION

PATENT NO. : 4,782,006

DATED : November 1, 1988

INVENTOR(S) : YUKUO NISHIMURA ET AL.

It is certified that error appears in the above-identified patent and that said Letters Patent is hereby corrected as shown below:

COLUMN 117 CONTINUED should read

-- Table 10-2A

| Optical recording medium | Built-up number of monomolecular film | Sensi- tivity | Image resolution | Contrast |
|---|---|---|---|---|
| Example 10-8 | 1 | ◎ | ◎ | x |
| | 5 | ◎ | ◎ | x |
| | 21 | ◎ | o | x |
| | 41 | ◎ | o | o |
| | 101 | ◎ | o | o |
| | 201 | ◎ | o | o |
| Example 10-9 | 1 | ◎ | o | x |
| | 5 | ◎ | o | x |
| | 21 | ◎ | o | x |
| | 41 | ◎ | o | o |
| | 101 | ◎ | o | o |
| | 201 | ◎ | x | o |
| Example 10-10 | 1 | ◎ | ◎ | x |
| | 5 | ◎ | ◎ | x |
| | 21 | ◎ | ◎ | ◎ |
| | 41 | ◎ | ◎ | ◎ |
| | 101 | ◎ | ◎ | ◎ |
| | 201 | ◎ | o | ◎ |
| Example 10-11 | 1 | ◎ | ◎ | x |
| | 5 | ◎ | ◎ | x |
| | 21 | ◎ | ◎ | ◎ |
| | 41 | ◎ | ◎ | ◎ |
| | 101 | ◎ | ◎ | ◎ |
| | 201 | ◎ | ◎ | ◎ |

--.

UNITED STATES PATENT AND TRADEMARK OFFICE
CERTIFICATE OF CORRECTION

PATENT NO. : 4,782,006
DATED : November 1, 1988
INVENTOR(S) : YUKUO NISHIMURA ET AL.

It is certified that error appears in the above-identified patent and that said Letters Patent is hereby corrected as shown below:

COLUMN 118

Line 40, "EXAMPLE" should read --EXAMPLES--.

COLUMN 123

Line 60, "R-C≡C-C≡R'" should read --R-C≡C-C≡C-R'--.

COLUMN 125

Line 3, "3-2)" should read --(3-2)--.
    Line 25, "-C=CH-groups" should read -- -CH=CH-groups--.
    Line 48, "reepresented" should read --represented--.
    Line 30, "clain 1," should read --claim 1--.
    Line 62, "are" should read --each--.

COLUMN 126

Line 2, "an" should be deleted.
    Line 5, "a ultraviolet." should read
        --ultraviolet radiation.--.
    Line 7, "an radiation IR-ray" should read --radiation--.
    Line 12, "the" should be deleted.
    Line 24, "compound," should read --compounds,--.

COLUMN 127

Line 42, "group $R^{32}$" should read --group; $R^{32}$--.
    Line 44, "group;" should read --group--.
    Line 49, "group $R^{34}$" should read --group; $R^{34}$--.
    Line 51, "a" should read --an--.

UNITED STATES PATENT AND TRADEMARK OFFICE
CERTIFICATE OF CORRECTION

PATENT NO. : 4,782,006

DATED : November 1, 1988

INVENTOR(S) : YUKUO NISHIMURA ET AL.

It is certified that error appears in the above-identified patent and that said Letters Patent is hereby corrected as shown below:

COLUMN 128

Line 36, "an" should be deleted.

Line 39, "a" should be deleted.

Signed and Sealed this

Fifth Day of January, 1993

Attest:

DOUGLAS B. COMER

Attesting Officer

Acting Commissioner of Patents and Trademarks